US008232979B2

(12) United States Patent
Cohen et al.

(10) Patent No.: US 8,232,979 B2
(45) Date of Patent: Jul. 31, 2012

(54) PERFORMING AN ACTION WITH RESPECT TO HAND-FORMED EXPRESSION

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 991 days.

(21) Appl. No.: 11/137,694

(22) Filed: May 25, 2005

(65) Prior Publication Data

US 2006/0267964 A1    Nov. 30, 2006

(51) Int. Cl.
*G06F 3/033* (2006.01)

(52) U.S. Cl. .................................. 345/179; 178/18.01

(58) Field of Classification Search .................. 345/179, 345/180, 182, 183; 178/18.01, 18.03
See application file for complete search history.

(56) References Cited

U.S. PATENT DOCUMENTS

| | | | |
|---|---|---|---|
| 1,550,048 A | 8/1925 | Ruben | |
| 4,053,024 A | 10/1977 | Hoyt | |
| 4,384,196 A | 5/1983 | McCumber et al. | |
| 4,475,240 A | 10/1984 | Brogardh et al. | |
| 4,523,235 A | 6/1985 | Rajchman | |
| 4,685,142 A | 8/1987 | Ooi et al. | |
| 4,703,511 A | 10/1987 | Conoval | |
| 4,728,784 A | 3/1988 | Stewart | |
| 4,746,937 A | 5/1988 | Realis Luc et al. | |
| 4,799,560 A | 1/1989 | Kobayashi | |
| 4,829,431 A | 5/1989 | Ott et al. | |
| 4,839,634 A | 6/1989 | More et al. | |
| 4,864,618 A | 9/1989 | Wright et al. | |
| D306,316 S | 2/1990 | Shintani | |
| 4,927,766 A | 5/1990 | Auerbach et al. | |
| 5,064,280 A | 11/1991 | Ringens et al. | |
| 5,109,439 A | 4/1992 | Froessl | |

(Continued)

FOREIGN PATENT DOCUMENTS

JP    07334639 A    12/1995

OTHER PUBLICATIONS

"Pen-One, Inc. Announces Biometric Pen Developer's Kit at CARTES Worldwide Card and Security Conference"; Breaking News Nov. 2, 2004 Paris, France; Nov. 2, 2004; pp. 1-2; printed on Dec. 13, 2006; bearing dates of 2001-2004; located at http://pen-one.com/html/Informatica_SDK_110204.htm; Pen One.

(Continued)

*Primary Examiner* — Chanh Nguyen
*Assistant Examiner* — Pegeman Karimi

(57) ABSTRACT

Embodiments include an apparatus, device, system, computer-program product, and method. In an embodiment, a method is provided. The method includes receiving a signal originated by a handheld writing device and indicative of a handwriting on a surface. The method also includes receiving a signal indicative of a machine-distinguishable tag associated by a user with the handwriting. The machine-distinguishable tag selected from at least two machine-distinguishable defined tags. The method includes performing an action with respect to a representation of the handwriting in response to the machine-distinguishable tag.

14 Claims, 57 Drawing Sheets

U.S. PATENT DOCUMENTS

| | | | |
|---|---|---|---|
| 5,129,320 A | 7/1992 | Fadner | |
| 5,227,985 A | 7/1993 | DeMenthon | |
| 5,250,804 A | 10/1993 | Chin | |
| 5,303,312 A | 4/1994 | Comerford et al. | |
| 5,311,207 A | 5/1994 | Kusumoto et al. | |
| 5,331,137 A | 7/1994 | Swartz | |
| 5,339,412 A | 8/1994 | Fueki | |
| 5,339,734 A | 8/1994 | Mustafa et al. | |
| 5,434,371 A | 7/1995 | Brooks | |
| 5,454,046 A | 9/1995 | Carman, II | |
| 5,501,535 A | 3/1996 | Hastings et al. | |
| 5,509,966 A | 4/1996 | Sykes | |
| 5,513,278 A | 4/1996 | Hashizume et al. | |
| 5,521,722 A | 5/1996 | Colvill et al. | |
| 5,634,730 A | 6/1997 | Bobry | |
| 5,659,639 A | 8/1997 | Mahoney et al. | |
| 5,687,259 A | 11/1997 | Linford | |
| 5,729,618 A | 3/1998 | Fujisawa et al. | |
| 5,740,271 A | 4/1998 | Kunkler et al. | |
| 5,754,434 A | 5/1998 | Delfer et al. | |
| 5,758,574 A | 6/1998 | Bernardo et al. | |
| 5,779,482 A | 7/1998 | Fukumoto | |
| 5,793,397 A | 8/1998 | Barker et al. | |
| 5,823,572 A | 10/1998 | NakaMats | |
| 5,823,691 A | 10/1998 | Langner | |
| 5,828,783 A | 10/1998 | Ishigaki | |
| 5,860,754 A | 1/1999 | Garland et al. | |
| 5,864,635 A | 1/1999 | Zetts et al. | |
| 5,880,451 A | 3/1999 | Smith et al. | |
| 5,970,455 A | 10/1999 | Wilcox et al. | |
| 5,974,204 A | 10/1999 | Lin et al. | |
| 5,978,523 A | 11/1999 | Linford et al. | |
| 5,981,884 A | 11/1999 | Sato et al. | |
| 5,999,666 A | 12/1999 | Gobeli et al. | |
| 6,004,048 A | 12/1999 | Moh et al. | |
| 6,005,945 A | 12/1999 | Whitehouse | |
| 6,031,936 A | 2/2000 | Nakamura | |
| 6,044,165 A | 3/2000 | Perona et al. | |
| 6,050,490 A | 4/2000 | Leichner et al. | |
| 6,070,805 A | 6/2000 | Kaufman et al. | |
| 6,122,042 A | 9/2000 | Wunderman et al. | |
| 6,128,414 A | 10/2000 | Liu | |
| 6,181,836 B1 | 1/2001 | Delean | |
| 6,246,382 B1 | 6/2001 | Maguire, Jr. | |
| 6,259,043 B1 | 7/2001 | Clary et al. | |
| 6,262,804 B1 | 7/2001 | Friend et al. | |
| 6,310,615 B1 | 10/2001 | Davis et al. | |
| 6,330,057 B1 | 12/2001 | Lederer et al. | |
| 6,348,914 B1 | 2/2002 | Tuli | |
| 6,376,783 B1 | 4/2002 | Vaghi | |
| 6,377,249 B1 | 4/2002 | Mumford | |
| 6,395,234 B1 | 5/2002 | Hunnell et al. | |
| 6,408,092 B1 | 6/2002 | Sites | |
| 6,446,208 B1 | 9/2002 | Gujar et al. | |
| 6,452,683 B1 | 9/2002 | Kinrot et al. | |
| 6,454,482 B1 | 9/2002 | Silverbrook et al. | |
| 6,456,740 B1 | 9/2002 | Carini et al. | |
| 6,486,874 B1 | 11/2002 | Muthuswamy et al. | |
| 6,502,912 B1 | 1/2003 | Bernard et al. | |
| 6,509,893 B1 | 1/2003 | Akhlagi et al. | |
| 6,525,716 B1 | 2/2003 | Makino | |
| 6,550,685 B1 | 4/2003 | Kindberg | |
| 6,594,406 B1 | 7/2003 | Hecht | |
| 6,603,464 B1 * | 8/2003 | Rabin | 345/179 |
| 6,649,849 B2 | 11/2003 | Bass et al. | |
| 6,666,376 B1 | 12/2003 | Ericson | |
| 6,686,579 B2 | 2/2004 | Fagin et al. | |
| 6,686,910 B2 | 2/2004 | O'Donnell, Jr. | |
| 6,703,570 B1 * | 3/2004 | Russell et al. | 178/19.03 |
| 6,715,687 B2 | 4/2004 | Berson | |
| 6,741,335 B2 | 5/2004 | Kinrot et al. | |
| 6,752,316 B2 | 6/2004 | Mizoguchi | |
| 6,788,815 B2 | 9/2004 | Lui et al. | |
| 6,791,537 B1 | 9/2004 | Shim et al. | |
| 6,808,330 B1 | 10/2004 | Lapstun et al. | |
| 6,816,615 B2 | 11/2004 | Lui et al. | |
| 6,826,551 B1 | 11/2004 | Clary et al. | |
| 6,836,555 B2 | 12/2004 | Ericson et al. | |
| 6,839,453 B1 | 1/2005 | McWilliam et al. | |
| 6,864,880 B2 | 3/2005 | Hugosson et al. | |
| 6,885,759 B2 | 4/2005 | Cox et al. | |
| 6,897,853 B2 | 5/2005 | Keely et al. | |
| 6,917,722 B1 | 7/2005 | Bloomfield | |
| 6,921,223 B2 | 7/2005 | Marschand | |
| 6,925,565 B2 | 8/2005 | Black | |
| 6,931,153 B2 | 8/2005 | Nakao et al. | |
| RE38,884 E | 11/2005 | Kakii | |
| 6,980,704 B2 | 12/2005 | Kia et al. | |
| 6,982,808 B1 | 1/2006 | Ogg et al. | |
| 6,991,164 B2 | 1/2006 | Lemelson et al. | |
| 6,992,655 B2 | 1/2006 | Ericson et al. | |
| 7,002,712 B2 | 2/2006 | Barker et al. | |
| 7,015,950 B1 | 3/2006 | Pryor | |
| 7,043,056 B2 | 5/2006 | Edwards et al. | |
| 7,047,419 B2 | 5/2006 | Black | |
| 7,082,213 B2 | 7/2006 | Black | |
| 7,092,934 B1 | 8/2006 | Mahan et al. | |
| 7,094,977 B2 * | 8/2006 | Ericson et al. | 178/18.01 |
| 7,098,898 B2 | 8/2006 | Hattori et al. | |
| 7,120,320 B2 | 10/2006 | Petterson et al. | |
| 7,158,678 B2 | 1/2007 | Nagel et al. | |
| 7,167,164 B2 | 1/2007 | Ericson et al. | |
| 7,176,896 B1 | 2/2007 | Fahraeus et al. | |
| 7,197,174 B1 | 3/2007 | Koizumi | |
| 7,203,384 B2 | 4/2007 | Carl | |
| 7,239,747 B2 | 7/2007 | Bresler et al. | |
| 7,262,764 B2 | 8/2007 | Wang et al. | |
| 7,289,105 B2 | 10/2007 | Dort | |
| 7,289,110 B2 | 10/2007 | Hansson | |
| 7,295,193 B2 | 11/2007 | Fahraeus | |
| D558,166 S | 12/2007 | Black | |
| 7,328,995 B2 | 2/2008 | Campagna et al. | |
| 7,341,456 B2 | 3/2008 | McAdams et al. | |
| 7,345,673 B2 | 3/2008 | Ericson et al. | |
| 7,353,453 B1 * | 4/2008 | Simmons | 715/268 |
| 7,363,505 B2 | 4/2008 | Black | |
| 7,376,630 B2 | 5/2008 | Blair et al. | |
| 7,408,536 B2 | 8/2008 | Hugosson et al. | |
| 7,433,499 B2 | 10/2008 | Kim | |
| 7,447,537 B1 | 11/2008 | Funda et al. | |
| 7,456,820 B1 | 11/2008 | Lapstun et al. | |
| 7,609,410 B2 | 10/2009 | Lapstun et al. | |
| 2002/0012134 A1 | 1/2002 | Calaway | |
| 2002/0031243 A1 | 3/2002 | Schiller et al. | |
| 2002/0040817 A1 * | 4/2002 | LeKuch et al. | 178/18.09 |
| 2002/0044152 A1 | 4/2002 | Abbott, III et al. | |
| 2002/0044689 A1 | 4/2002 | Roustaei et al. | |
| 2002/0064308 A1 | 5/2002 | Altman et al. | |
| 2002/0079371 A1 | 6/2002 | Bobrow et al. | |
| 2002/0085843 A1 | 7/2002 | Mann | |
| 2002/0105484 A1 | 8/2002 | Navab et al. | |
| 2002/0126105 A1 | 9/2002 | O'Donnell, Jr. | |
| 2002/0143994 A1 | 10/2002 | Sun et al. | |
| 2002/0156902 A1 | 10/2002 | Crandall | |
| 2002/0183890 A1 | 12/2002 | Bass et al. | |
| 2002/0196978 A1 * | 12/2002 | Hawkins et al. | 382/189 |
| 2003/0001020 A1 | 1/2003 | Kardach | |
| 2003/0001950 A1 | 1/2003 | Eriksson | |
| 2003/0024375 A1 | 2/2003 | Sitrick | |
| 2003/0043266 A1 | 3/2003 | Yoshikawa et al. | |
| 2003/0051362 A1 | 3/2003 | Buckman et al. | |
| 2003/0066691 A1 | 4/2003 | Jelinek et al. | |
| 2003/0081038 A1 | 5/2003 | Valero | |
| 2003/0090734 A1 | 5/2003 | Lapstun et al. | |
| 2003/0115470 A1 | 6/2003 | Cousins et al. | |
| 2003/0144034 A1 | 7/2003 | Hack et al. | |
| 2003/0146286 A1 | 8/2003 | Berson | |
| 2003/0148539 A1 | 8/2003 | van Dam et al. | |
| 2003/0151596 A1 | 8/2003 | Moyne et al. | |
| 2003/0173121 A1 | 9/2003 | Zloter et al. | |
| 2003/0184649 A1 | 10/2003 | Mann | |
| 2003/0187458 A1 | 10/2003 | Carlson, II | |
| 2003/0193544 A1 | 10/2003 | Eguchi | |
| 2003/0218070 A1 | 11/2003 | Tsikos et al. | |
| 2004/0002926 A1 | 1/2004 | Coffy et al. | |
| 2004/0005915 A1 | 1/2004 | Hunter | |
| 2004/0013454 A1 | 1/2004 | Manduley | |

| | | | |
|---|---|---|---|
| 2004/0023024 A1 | 2/2004 | Landberg et al. | |
| 2004/0035936 A1 | 2/2004 | Hoson et al. | |
| 2004/0085301 A1 | 5/2004 | Furukawa et al. | |
| 2004/0085358 A1 | 5/2004 | Tolmer et al. | |
| 2004/0093330 A1 | 5/2004 | Westphal | |
| 2004/0101178 A1 | 5/2004 | Fedorovskaya et al. | |
| 2004/0103111 A1 | 5/2004 | Miller et al. | |
| 2004/0108381 A1 | 6/2004 | Elliott et al. | |
| 2004/0120404 A1 | 6/2004 | Sugahara et al. | |
| 2004/0130614 A1 | 7/2004 | Valliath et al. | |
| 2004/0131252 A1 | 7/2004 | Seto | |
| 2004/0133189 A1 | 7/2004 | Sakurai | |
| 2004/0135776 A1 | 7/2004 | Brouhon | |
| 2004/0140965 A1 | 7/2004 | Wang et al. | |
| 2004/0144575 A1 | 7/2004 | Zloter et al. | |
| 2004/0164970 A1* | 8/2004 | Benard et al. | 345/177 |
| 2004/0179000 A1 | 9/2004 | Fermgard et al. | |
| 2004/0182925 A1 | 9/2004 | Anderson et al. | |
| 2004/0210444 A1 | 10/2004 | Arenburg et al. | |
| 2004/0212848 A1 | 10/2004 | Lapstun et al. | |
| 2004/0218738 A1 | 11/2004 | Arai et al. | |
| 2004/0225282 A1 | 11/2004 | Ness | |
| 2004/0236244 A1 | 11/2004 | Allen et al. | |
| 2004/0236315 A1 | 11/2004 | Hered | |
| 2004/0241424 A1 | 12/2004 | Barbera-Guillem | |
| 2004/0260507 A1 | 12/2004 | Chang et al. | |
| 2005/0013104 A1 | 1/2005 | Feague et al. | |
| 2005/0024346 A1 | 2/2005 | Dupraz et al. | |
| 2005/0024690 A1 | 2/2005 | Picciotto et al. | |
| 2005/0030297 A1 | 2/2005 | Burstrom et al. | |
| 2005/0033724 A1 | 2/2005 | Antognini et al. | |
| 2005/0041100 A1 | 2/2005 | Maguire | |
| 2005/0052434 A1 | 3/2005 | Kolmykov-Zotov et al. | |
| 2005/0060644 A1 | 3/2005 | Patterson | |
| 2005/0064503 A1 | 3/2005 | Lapstun et al. | |
| 2005/0083516 A1 | 4/2005 | Baker | |
| 2005/0138541 A1 | 6/2005 | Euchner et al. | |
| 2005/0148828 A1 | 7/2005 | Lindsay | |
| 2005/0152602 A1 | 7/2005 | Chen et al. | |
| 2005/0194444 A1 | 9/2005 | Gieske | |
| 2005/0199724 A1 | 9/2005 | Lubow | |
| 2005/0202844 A1 | 9/2005 | Jabri et al. | |
| 2005/0231482 A1 | 10/2005 | Theytaz et al. | |
| 2005/0246337 A1 | 11/2005 | Forman et al. | |
| 2005/0251397 A1 | 11/2005 | Zanovitch et al. | |
| 2005/0286743 A1 | 12/2005 | Kurzweil et al. | |
| 2006/0018546 A1 | 1/2006 | Lagardere et al. | |
| 2006/0036557 A1 | 2/2006 | Mattern | |
| 2006/0067572 A1 | 3/2006 | White et al. | |
| 2006/0078866 A1 | 4/2006 | Marggraff et al. | |
| 2006/0086811 A1 | 4/2006 | Yoshida et al. | |
| 2006/0109237 A1 | 5/2006 | Morita et al. | |
| 2006/0109238 A1 | 5/2006 | Lau et al. | |
| 2006/0138211 A1 | 6/2006 | Lubow | |
| 2006/0149296 A1 | 7/2006 | Stanners | |
| 2006/0149549 A1 | 7/2006 | Napper | |
| 2006/0155589 A1 | 7/2006 | Lane et al. | |
| 2006/0159345 A1 | 7/2006 | Clary et al. | |
| 2006/0208085 A1 | 9/2006 | Cohen et al. | |
| 2006/0209051 A1 | 9/2006 | Cohen et al. | |
| 2006/0210172 A1 | 9/2006 | Sutanto et al. | |
| 2006/0219776 A1 | 10/2006 | Finn | |
| 2006/0238877 A1 | 10/2006 | Ashkenazi et al. | |
| 2006/0267965 A1 | 11/2006 | Clary | |
| 2006/0275068 A1 | 12/2006 | Breton | |
| 2006/0283962 A1 | 12/2006 | Silverstein | |
| 2006/0285147 A1 | 12/2006 | Wolfman et al. | |
| 2007/0046649 A1 | 3/2007 | Reiner | |
| 2007/0184422 A1 | 8/2007 | Takahashi | |
| 2007/0220494 A1 | 9/2007 | Spooner | |
| 2007/0253614 A1 | 11/2007 | Jung et al. | |
| 2007/0273674 A1 | 11/2007 | Cohen et al. | |
| 2007/0273918 A1 | 11/2007 | Gonzalez | |
| 2007/0286486 A1 | 12/2007 | Goldstein | |
| 2008/0088606 A1 | 4/2008 | Cohen et al. | |
| 2008/0088607 A1 | 4/2008 | Sandstrom et al. | |
| 2008/0141117 A1 | 6/2008 | King et al. | |
| 2009/0098925 A1 | 4/2009 | Gagner et al. | |

OTHER PUBLICATIONS

"Pen-One, Inc. Selects Award Winning P9 Design to Develop New Fingerprint Sensing Pen"; Breaking News Jul. 27, 2004 10:00 AM Southfield, MI (For Release Jul. 27, 2004); Jul. 27, 2004; pp. 1-2; printed on Dec. 13, 2006; bearing dates of 2001-2004; located at http://pen-one.com/html/biometric_P9_news_072604.htm; Pen One.

"Pen-One, Inc. to Unveil Connaitre Biometric Pen at CARTES Worldwide Card and Security Conference"; Breaking News Oct. 20, 2004 Southfield, MI (For Release Oct. 22, 2004); Oct. 22, 2004; pp. 1-2; printed on Dec. 13, 2006; bearing dates of 2001-2004; located at http://pen-one.com/html/connaitre_news_102004.htm; Pen One.

"Pen-One News Releases Worldwide Pen-One in the News . . . "; pp. 1-2; printed on Dec. 13, 2006; bearing dated of 2001-2004; located at http://pen-one.com/html/Pen-One_in_the_news.htm; Pen One.

"The World's First Fingerprint Sensing Pen! Pen One in the news . . . "; pp. 1-2; printed on Dec. 13, 2006; bearing dates of 2001-2004; located at http://pen-one.com/index.html; Pen One.

"World's First Use of Fraud Resistant Fingerprint Scanning Biometric Pen"; May 6, 2004; pp. 1-2 ; printed on Dec. 13, 2006; bearing dates of 2001-2004; located at http://pen-one.com/html/biometric_news_050604.html; Pen One.

Heim, Kristi; "Stroke of a pen captures data"; The Seattle Times; Apr. 10, 2006; pp. 1-3; The Seattle Times Company; Seattle; U.S.A.; located at http://seattletimes.nwsource.com/html/businesstechnology/2002921837_smartpen10.html; printed on Apr. 11, 2006.

"AirPen Storage Notebook"; Pegasus Technologies; pp. 1-2; bearing a date of Jul. 1, 2004; located at: http://www.pegatech.com/Articles/Article.asp?ArticleID=82&CategoryID=8; printed on Jan. 28, 2005.

Bricklin, Dan; "About Tablet Computing Old and New"; Dan Bricklin's Web Site: www.bricklin.com; bearing dates of Nov. 22, 2002, 1999-2004; pp. 1-7; located at: http://www.bricklin.com/tabletcomputing.htm; printed on Dec. 30, 2004.

Buderi, Robert; Huang, Gregory; "Microsoft plumbs China for IT talent"; NewScientist.com; bearing a date of Nov. 22, 2004; pp. 1-2; located at: www.Newscientist.com; printed on Jan. 7, 2005.

"Camedia Digital Camera AZ-1 Reference Manual"; Olympus Corporation; bearing a date of 2004; pp. 1-212.

"Extended abstract"; pp. 1-3; bearing a date of Sep. 16, 2003; located at : http://csidc.dcs.elf.stuba.sk/ips/project.html; printed on Jan. 3, 2005.

Handschuh, Siegfried; Staab, Steffen; Maedche, Alexander; "CREAM—Creating relational metadata with a component-based, ontology-driven annotation framework"; Institute AIFB, University of Karlsruhe; Ontoprise GmbH; FZI Research Center for Information Technologies; pp. 1-8; Karlsruhe, Germany; located at: http://www.aifb.uni-karlsruhe.de/WBS/Sha/papers/kcap2001-annotate-sub.pdf; printed on Jan. 26, 2005.

Jesdanun, Anick; "'Tags' Ease Sifting of Digital Data"; Yahoo! Inc.; The Associated Press; bearing dates of May 2 and 2005; pp. 1-2; located at: http://news.yahoo.com/s/ap/20050502/ap_on_hi_te/social_tagging&printer=1; printed on May 3, 2005.

"Logitech® io™ personal digital pen"; Anotofunctionality.com—Logitech; bearing dates of Jul. 5, 2004 and 1997-2004; p. 1 of 1; located at: http://www.anotofunctionality.com/Default.asp?id=54; Anoto AB; printed on Jan. 12, 2005.

"Mobile Note Taker"; Pegasus—Digital Pens; bearing a date of 2003; pp. 1-4; located at: https://www.pegatech.com/shop/; Pegasus Technologies Ltd.; printed on Jan. 28, 2005.

"Mobile Note Taker"; Pegasus—Digital Pens; bearing a date of 2003; pp. 1-3; located at: https://www.pegatech.com/shop/; Pegasus Technologies Ltd.; printed on Mar. 7, 2005.

"Nokia Digital Pen—As Personal as Your Signature"; Nokia—Messaging Enhancements—Nokia Digital Pen; bearing a date of 2004; p. 1 of 1; located at: http://www.nokia.com/nokia/0,5184,5787,00.html; Nokia.com; printed on Jan. 12, 2005.

"OTM Technologies: Products, VPen™—How does it work?"; OTM Technologies—VPen; pp. 1-2; located at: http://www.otmtech.com/vpen3.asp; printed on Jan. 3, 2005.

"OTM Technologies: Products, VPen—What is it?"; OTM Technologies—VPen; pp. 1-2; located at: http://www.otmtech.com/vpen.asp; printed on Jan. 3, 2005.

"PC Notes Taker tracking technology"; 2P; pp. 1-2; located at: http://www.pc-notetaker.com/; printed on Jan. 3, 2005.

Poupyrev, Ivan; Tomokazu, Numada; Weghorst, Suzanne; "Virtual Notepad: Handwriting in Immersive VR"; IS Lab, Hiroshima University; HIT Lab, University of Washington; bearing a date of Mar. 1998; pp. 1-7; Higashi-Hiroshima, Japan; Seattle, WA; printed on Jan. 3, 2005.

Stroud, Michael; "DigiPens Search for Write Market" Wired News; bearing a date of Dec. 21, 2002; pp. 1-2; located at: http://www.wired.com/news/print/0,1294,56951,00.html; printed on Jan. 12, 2005.

VPEN Brochure; "VPEN—Revolutionizing human interaction with the digital world™; OTM Technologies—Light Speed Innovation"; pp. 1-6; located at: http://www.otmtech.com/upload/publications/VPenBrochureFinal.pdf; printed on Jan. 3, 2005.

W., Daniel; Pegasus—Digital Pens : "News & Events>Review—Private review"; bearing dates of Feb. 1, 2004, and 2003; pp. 1-5; located at: http://www.pegatech.com/Articles/Article.asp?ArticleID=68&CategoryID=55; Pegasus Technologies; printed on Jan. 3, 2005.

Zhong, Youliang; Shen, Jianliang; Jin, Jesse S.; Zhang, Guoyin; "Sonar-based Visual Information Architecture for Handwriting Information Processing"; School of Computer Science & Engineering, University of New South Wales, Computer Science & Tech School of Harbin Engineering University; pp. 1-6; Australia, China; printed on Jan. 3, 2005.

Excerpts from The Oxford English Dictionary $2^{nd}$ Edition; bearing a date of 1989; printed on Apr. 1, 2009; pp. 1-4 and pp. 1-2.

Shneiderman et al.; "Direct Annotation: A Drag-and-Drop Strategy for Labeling Photos"; bearing a date of 2000; pp. 88-95; © 2000 IEEE.

U.S. Appl. No. 12/924,991, Cohen et al.
U.S. Appl. No. 11/603,336, filed Apr. 17, 2008, Cohen et al.
U.S. Appl. No. 11/603,334, filed May 31, 2007, Cohen et al.
U.S. Appl. No. 11/603,333, filed Apr. 17, 2008, Cohen et al.
U.S. Appl. No. 11/603,332, filed Apr. 17, 2008, Cohen et al.
U.S. Appl. No. 11/603,289, filed Jun. 7, 2007, Cohen et al.
U.S. Appl. No. 11/603,275, filed Jun. 28, 2007, Cohen et al.
U.S. Appl. No. 11/580,218, filed Apr. 5, 2007, Cohen et al.
U.S. Appl. No. 11/580,217, filed Apr. 12, 2007, Cohen et al.
U.S. Appl. No. 11/167,072, filed Sep. 21, 2006, Cohen et al.
U.S. Appl. No. 11/167,058, filed Sep. 21, 2006, Cohen et al.
U.S. Appl. No. 11/166,780, filed Sep. 21, 2006, Cohen et al.
U.S. Appl. No. 11/166,035, filed Sep. 21, 2006, Cohen et al.
U.S. Appl. No. 11/137,716, filed Sep. 21, 2006, Cohen et al.
U.S. Appl. No. 11/137,687, filed Sep. 21, 2006, Cohen et al.
U.S. Appl. No. 11/713,092, filed Nov. 29, 2007, Cohen et al.
U.S. Appl. No. 12/806,115, filed Mar. 24, 2011, Cohen et al.
U.S. Appl. No. 12/806,112, Cohen et al.
U.S. Appl. No. 12/806,054, Cohen et al.

"6 tips for adding international characters and symbols to your document, for Microsoft Office Word 2003, Microsoft Word 2000 and 2002"; Microsoft Office Online; Bearing a date of 2009; pp. 1-6; Microsoft Corporation; printed on Jun. 6, 2009; located at: http://office.microsoft.com/en-us/world/HA011268771033.aspx.

U.S. Appl. No. 13/135,206, Cohen et al.

Definition of "tag"; Merriam Webster Online Dictionary; bearing a date of May 12, 2009; pp. 1-2; located at http://www.meriam-webster.com/dictionary/tag (as provided by examiner).

U.S. Appl. No. 13/007,982, Dated Jan. 17, 2011, Cohen et al.

* cited by examiner

FIG. 11

402 A computer-readable medium.

404 A computer program product embodied in a code and operable to execute a computer process in a handheld device, the computer process comprising:
a) generating in the handheld device a first data set indicative of a handwriting movement by a writing element physically associated with the handheld device; and
b) generating in the handheld device a second data set indicative of a content portion of a document proximate to the handwriting movement by the writing element.

406 c) Saving in a digital storage medium physically associated with the handheld device the first data set indicative of a handwriting movement and the second data set indicative of a content portion of the document proximate to the handwriting movement.

408 c) Transmitting the first data set indicative of the handwriting movement.

410 c) Transmitting the second data set indicative of a content portion of the document proximate to the handwriting movement.

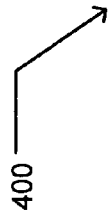

400

FIG. 27
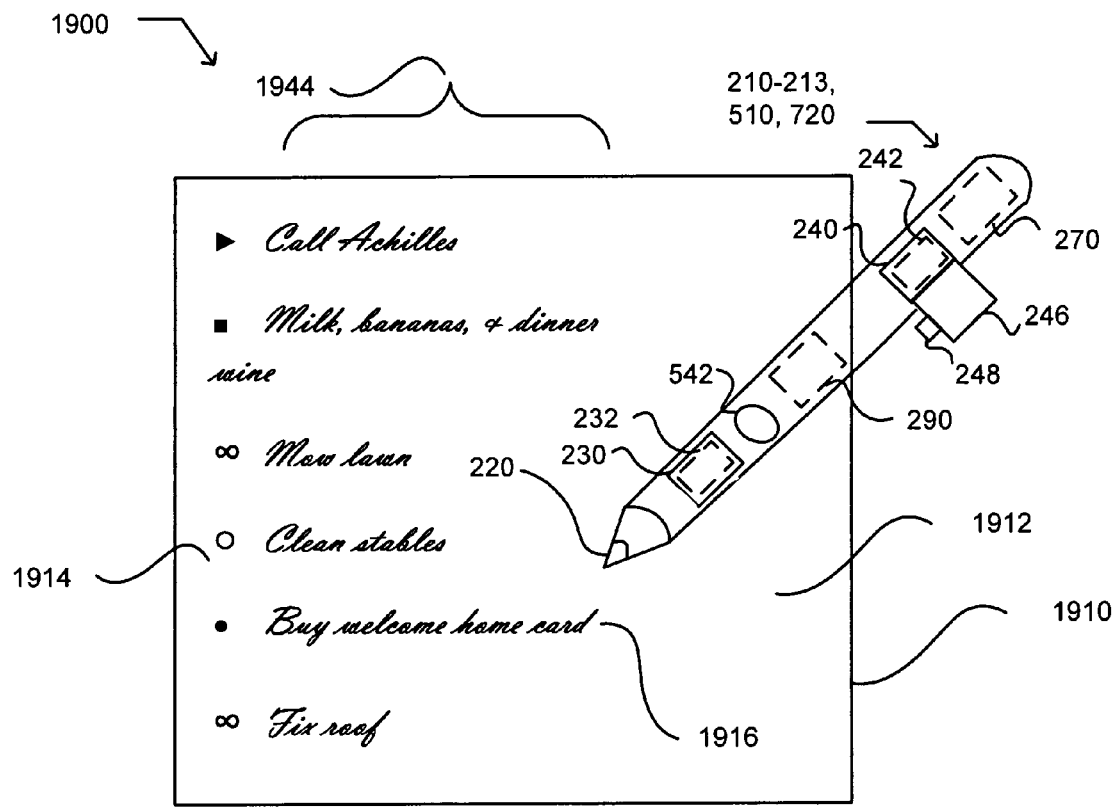
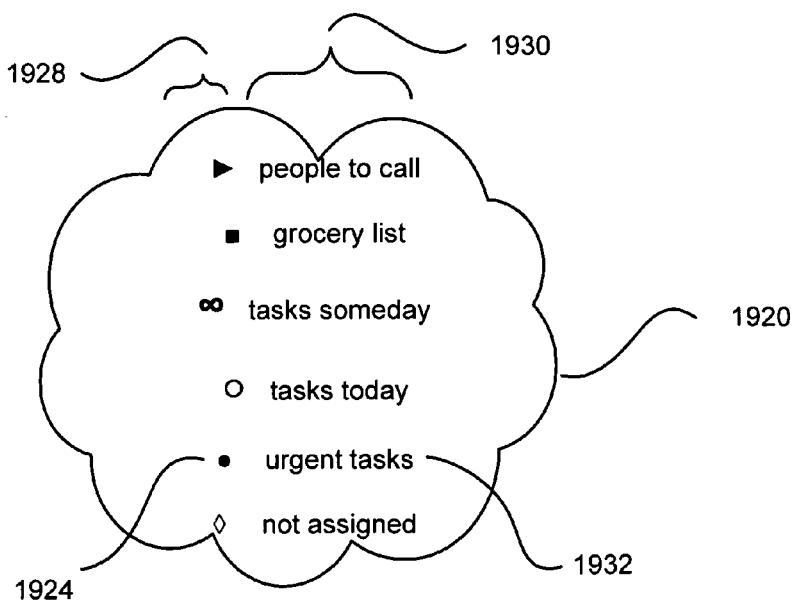

2152 A computer-readable signal-bearing medium.

2154 program instructions operable to perform a process in a computer system, the process comprising:

receiving a signal indicative of a handwriting;

receiving a signal indicative of a machine-distinguishable tag associated by a user with the handwriting, the machine-distinguishable tag being selected from at least two machine-distinguishable tags; and distributing a representation of the handwriting to a data recipient in response to the machine-distinguishable tag.

2156 Distributing a representation of the handwriting to a data recipient saved in a computer-readable storage medium associated with the computing system in response to the machine-distinguishable tag.

2158 Distributing a representation of the signal indicative of a handwriting to a data recipient saved in a computer-readable storage medium associated with the computing system in response to the signal indicative of a machine-distinguishable tag.

2160 The signal-bearing medium includes a computer storage medium.

2162 The signal-bearing medium includes a communication medium.

FIG. 56

2560 

2570 A computer-readable signal-bearing medium.

2580 Program instructions operable to perform a process in a computer system, the process comprising:
 a) receiving a request for information saved in a computer-readable file, the computer-readable file including at least one representation of a hand-formed mark distributed to the computer-readable file in response to a machine-distinguishable tag associated with the hand-formed mark, the machine-distinguishable tag selected from at least two machine-distinguishable tags;
 b) searching the computer-readable file for the requested information; and
 c) outputting the at least one representation of a hand-formed mark.

2572 The signal-bearing medium includes a computer storage medium.

2574 The signal-bearing medium includes a communication media.

2610 Means for receiving a request for a content of a computer-readable file.

2620 Means for searching the computer-readable file for the requested content, the computer-readable file including at least one representation of a hand-formed mark distributed to the computer-readable file in response to a machine-distinguishable tag associated with the hand-formed mark, the machine-distinguishable tag selected from at least two machine-distinguishable tags.

2630 Means for providing the at least one representation of a hand-formed mark.

PERFORMING AN ACTION WITH RESPECT TO HAND-FORMED EXPRESSION

PRIORITY CLAIM, CROSS-REFERENCE TO RELATED APPLICATION, AND INCORPORATION BY REFERENCE

The present application is related to, claims the earliest available effective filing date(s) from (e.g., claims earliest available priority dates for other than provisional patent applications; claims benefits under 35 U.S.C. §119(e) for provisional patent applications), and incorporates by reference in its entirety all subject matter of the herein listed application(s); the present application also claims the earliest available effective filing date(s) from, and also incorporates by reference in its entirety all subject matter of any and all parent, grandparent, great-grandparent, etc. applications of the herein listed application(s). The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. For purposes of the USPTO extra-statutory requirements, the present application constitutes a continuation in part of currently co-pending United States patent application entitled ELECTRONIC ACQUISITION OF A HAND FORMED EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 18, 2005, Ser. No. 11/083,567.

2. For purposes of the USPTO extra-statutory requirements, the present application constitutes a continuation in part of currently co-pending United States patent application entitled ACQUISITION OF A USER EXPRESSION AND A CONTEXT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 31, 2005, Ser. No. 11/097,977.

3. For purposes of the USPTO extra-statutory requirements, the present application constitutes a continuation in part of currently co-pending United States patent application entitled ACQUISITION OF A USER EXPRESSION AND AN ENVIRONMENT OF THE EXPRESSION, naming Alexander J. Cohen, Edward K. Y. Jung, Royce A. Levien, Robert W. Lord, Mark A. Malamud, and John D. Rinaldo, Jr., as inventors, filed Mar. 31, 2005, Ser. No. 11/097,980.

4. For purposes of the USPTO extra-statutory requirements, the present application constitutes a continuation in part of currently co-pending United States patent application entitled SYSTEM AND METHOD FOR ELECTRONIC ASSOCIATION OF CONTENT AND CONTEXT, naming Alexander J. Cohen, Edward K. Y. Jung, Royce A. Levien, Robert W. Lord, Mark A. Malamud, and John D. Rinaldo, Jr., as inventors, filed Apr. 25, 2005, Ser. No. 11/114,245.

5. For purposes of the USPTO extra-statutory requirements, the present application constitutes a continuation in part of currently co-pending United States patent application entitled PERFORMING AN ACTION WITH RESPECT TO A HAND-FORMED EXPRESSION, naming Alexander J. Cohen, Edward K. Y. Jung, Royce A. Levien, Robert W. Lord, Mark A. Malamud, and John D. Rinaldo, Jr., as inventors, filed May 25, 2005, Ser. No. 11/137,716 filed contemporaneously herewith.

6. For purposes of the USPTO extra-statutory requirements, the present application constitutes a continuation in part of currently co-pending United States patent application entitled OUTPUTTING A SAVED HAND-FORMED EXPRESSION, naming Alexander J. Cohen, Edward K. Y. Jung, Royce A. Levien, Robert W. Lord, Mark A. Malamud, and John D. Rinaldo, Jr., as inventors, filed May 25, 2005, Ser. No. 11/137,687 filed contemporaneously herewith.

SUMMARY

An embodiment provides a method. The method includes receiving a signal originated by a handheld writing device and indicative of a handwriting on a surface. The method also includes receiving a signal indicative of a machine-distinguishable tag associated by a user with the handwriting. The machine-distinguishable tag selected from at least two machine-distinguishable defined tags. The method includes distributing a representation of the handwriting to a data recipient in response to the machine-distinguishable tag.

An alternative embodiment, the method may further include receiving another signal originated by the handheld writing device and indicative of another handwriting on the surface. The method may also include receiving another signal indicative of another machine-distinguishable tag associated by the user with the another handwriting. The machine-distinguishable tag selected from the at least two machine-distinguishable defined tags. In addition, the method may include distributing a representation of the another handwriting to another data recipient associated with the computing device in response to the another machine-distinguishable tag. In addition to the foregoing, other method embodiments are described in the claims, drawings, and text forming a part of the present application.

A further embodiment provides a computer program product. The computer program product includes program instructions operable to perform a process in a computer system. The process includes receiving a signal indicative of a handwriting, and receiving a signal indicative of a machine-distinguishable tag associated with the handwriting. The machine-distinguishable tag being selected from at least two machine-distinguishable tags. The process also includes distributing a representation of the handwriting to a data recipient in response to the machine-distinguishable tag. The computer program product includes a computer-readable signal-bearing medium bearing the program instructions. In addition to the foregoing, other computer program product embodiments are described in the claims, drawings, and text forming a part of the present application.

An embodiment provides a system. The system includes a pen and a computer program product. The pen includes a writing element, and a writing detector module operable to generate a signal indicative of a handwriting by the writing element on a surface. The pen also includes a tag detector module operable to generate a signal indicative of a machine-distinguishable tag associated by a user with the handwriting. The machine-distinguishable tag being selected from at least two machine-distinguishable tags. The computer program product includes program instructions operable to perform a process in a computer system. The process includes receiving the signal indicative of a handwriting, and receiving the signal indicative of a machine-distinguishable tag associated with the handwriting. The process also includes distributing a representation of the handwriting to a data recipient in response to the machine-distinguishable tag. The computer program product includes a computer-readable signal-bearing medium bearing the program instructions. In addition to the foregoing, other system embodiments are described in the claims, drawings, and text forming a part of the present application.

Another embodiment provides a device. The device includes means for receiving in a computing device a signal indicative of a handwriting on a surface, and means for receiving in the computing device a signal indicative of a machine-distinguishable tag associated by a user with the handwriting. The machine-distinguishable tag being selected from at least two machine-distinguishable tags. The device also includes means for distributing a representation of the handwriting to a data recipient associated with the computing device in response to the machine-distinguishable tag. In addition to the foregoing, other device embodiments are described in the claims, drawings, and text forming a part of the present application.

A further embodiment provides a method. The method includes generating a content signal indicative of a hand-formed mark on a surface, and generating a label signal indicative of a machine-distinguishable tag user associated with the hand-formed mark. The machine-distinguishable tag selected from at least two machine-distinguishable tags. In addition to the foregoing, other method embodiments are described in the claims, drawings, and text forming a part of the present application.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein.

BRIEF DESCRIPTION OF THE DRAWINGS

FIG. 11 illustrates a partial view of an exemplary computer-program product that includes a computer program for executing a computer process in a handheld computing device;

FIG. 27 illustrates an environment in which embodiments may be implemented;

FIG. 47 illustrates a partial view of an exemplary computer program product that includes a computer program and a computer-readable signal-bearing medium bearing the computer program;

FIG. 56 illustrates a partial view of an exemplary computer program product; and FIG. 57 illustrates a partial view of an exemplary device.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
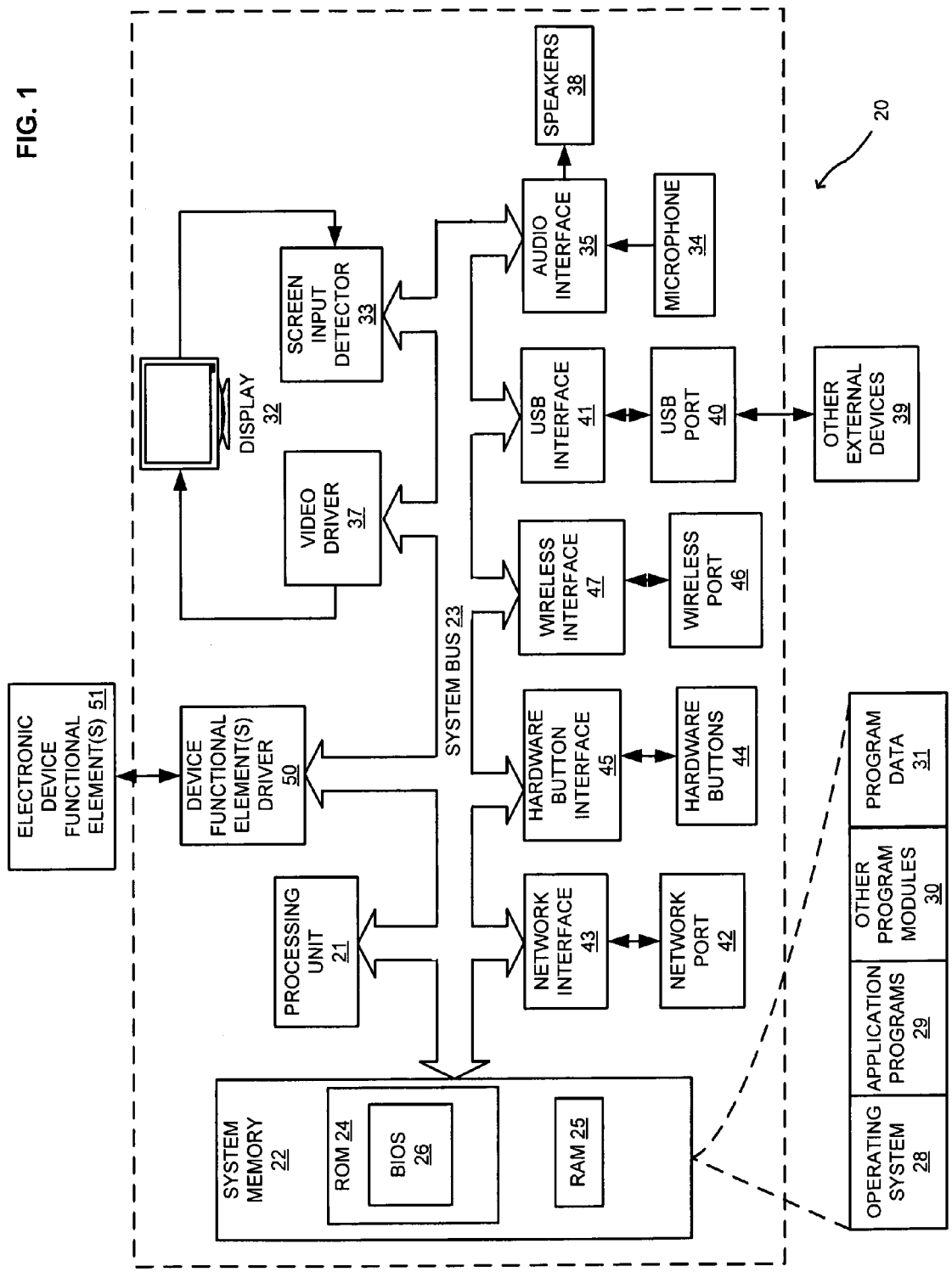
FIG. 1 illustrates an exemplary system in which embodiments may be implemented, including a thin computing device.

FIG. 1 and the following discussion are intended to provide a brief, general description of an environment in which embodiments may be implemented. FIG. 1 illustrates an exemplary system that includes a thin computing device 20 that interfaces with an electronic device (not shown) that includes one or more functional elements 51. For example, the electronic device may include any item having electrical and/or electronic components playing a role in a functionality of the item, such as a limited resource computing device, a digital camera, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30, and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device 20 may be designed to include a user interface having a physical keyboard (not shown).

The device functional elements (not shown) are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and a camera capturing and saving an image.

Figure 2:
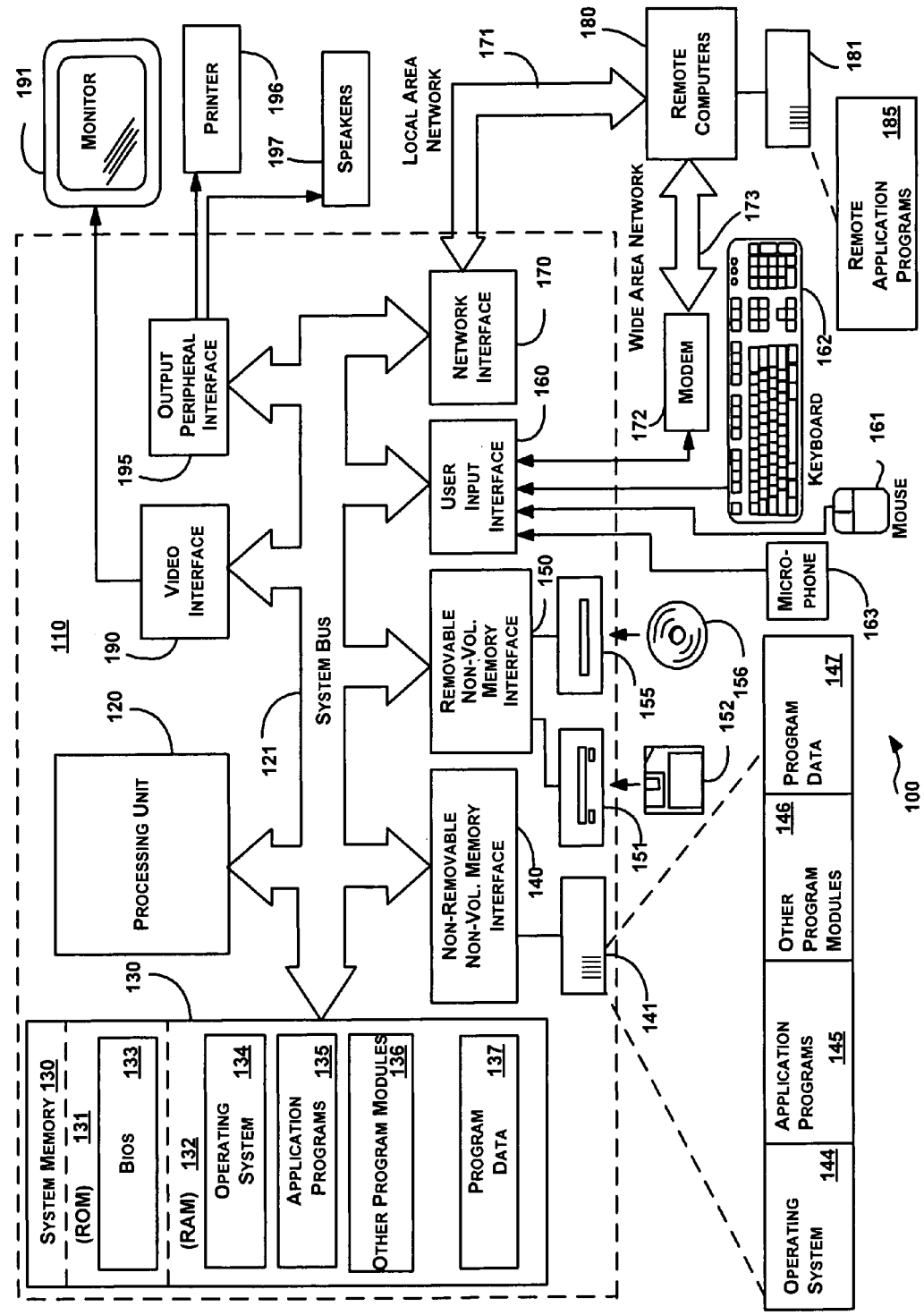
FIG. 2 illustrates another exemplary system in which embodiments may be implemented, including a general-purpose computing device.

FIG. 2 illustrates another exemplary system in which embodiments may be implemented. FIG. 2 illustrates an electronic device that may correspond in whole or part to a general-purpose computing device, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art. The computing device 110 may also include other removable/non-removable, volatile/nonvolatile computer storage media products. By way of example only, FIG. 2 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/non-volatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, certain embodiments may be described with reference to acts and symbolic representations of operations that are performed by one or more computing devices, such as computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIG. 2 illustrates an example of a suitable environment on which embodiments may be implemented. The computing system environment 100 of FIG. 2 is an example of a suitable environment and is not intended to suggest any limitation as to the scope of use or functionality of an embodiment. Neither should the environment be interpreted as having any dependency or requirement relating to any one or combination of components illustrated in an exemplary operating environment.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, server computers, handheld or laptop devices, personal digital assistants, multiprocessor systems, microprocessor-based systems, set top boxes, programmable consumer electronics, network, minicomputers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in distributed computing environments where tasks are performed by remote processing devices that are linked through a communications network. In a distributed computing environment, program modules may be located in both local and remote computer storage media including memory storage devices.

The following includes a series of illustrations depicting implementations of processes. For ease of understanding, certain illustrations are organized such that the initial illustrations present implementations via an overall "big picture" viewpoint and thereafter the following illustrations present alternate implementations and/or expansions of the "big picture" illustrations as either sub-steps or additional steps building on one or more earlier-presented illustrations. This style of presentation utilized herein (e.g., beginning with a presentation of a illustration(s) presenting an overall view and thereafter providing additions to and/or further details in subsequent illustrations) generally allows for a rapid and easy understanding of the various process implementations.

Figure 3:
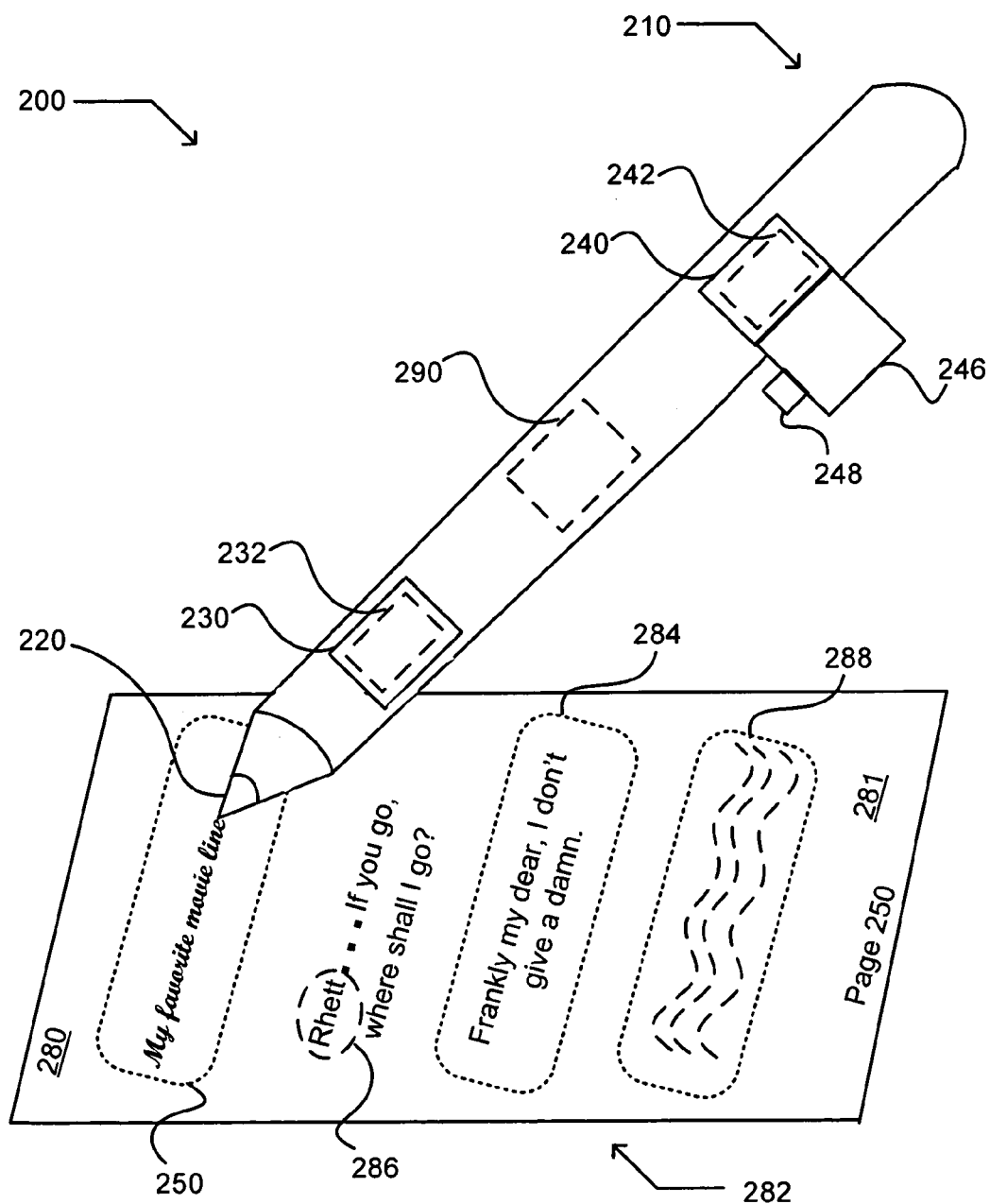
FIG. 3 illustrates an environment that includes partial view of an exemplary handheld writing device, and an exemplary document environment.

FIG. 3 illustrates an environment 200 that includes partial view of exemplary handheld writing device 210, and an exemplary document environment 280. In an embodiment, the exemplary document environment 280 (hereafter "document 280") may include a single sheet, a part of a page, a single page, a poster, a display, multiple pages, a chapter, a volume, and/or a file. In a further embodiment, the document may include a book, such as a bound volume, a box, such as a retail package, a container, a carton, a label, a currency bill or note, and/or check. In another embodiment, the document may include an article of clothing, an item, a structure, a vehicle, and/or an indicator, such as a temperature gauge or speedometer. In an embodiment, a document includes any thing having a human recognizable content.

The document 280 includes a content portion 282. The content portion 282 may include a word 286, illustrated as a word "Rhett," a phrase 284, illustrated as the phrase "Frankly my dear, I don't give a damn," and/or other printed or native content, schematically illustrated as a textual paragraph 288. In another embodiment, the content portion may include a textual content portion. For example, a textual content portion may include words printed on a page, such as a page of a book, and/or words printed on a cover or a spine of a book. In a further embodiment, the content portion may include a human language content, for example, text printed in roman alphabet characters, math symbols, and/or script characters such as Asian language characters. In another embodiment, the content portion may include a human readable content, and/or graphical content. In an embodiment, the content portion may include a graphical content having a meaning or a significance to a human, such as a picture, a drawing, a figure, a photograph, an illustration, a diagram, a doodle, a decoration, a sketch, and/or a portrait. In another embodiment, the content portion may be arbitrary and not recognizable by an individual human reader. In a further embodiment, the content portion may include any content primarily useful to a human reader. For example, a content portion may include a textual and/or graphical label on a retail article, such as clothing, a retail package, or a carton. A content portion may include an address written on shipping label or an address written on a side of a building. A content portion may include an odometer reading on a vehicle or a temperature reading on a thermometer. In another embodiment, the content portion may include an incidental element not primarily employed by a human reader but that aids in distinguishing the document. For example, an incidental element may include a coffee stain, a torn page, and/or a physical attribute of the document. In an embodiment, a content portion may include a human and/or machine recognizable characteristic form or shape, such a pair of skis, a car, and/or a dress.

In an embodiment, the content portion 282 of the document 280 may be displayed on a surface 281, such as a paper surface, a surface of a sheet of paper, a surface of a newspaper, a surface of a book, and/or a surface of a poster. In a further embodiment, the surface may include a surface of a box, a surface of a container, a surface of a carton, a surface of a label, a surface of a currency bill or note, and/or a surface of a check. In another embodiment, a surface may include a surface of an article of clothing, a surface of an item, a surface of a structure, a surface of a vehicle, and/or a surface of an indicator. In an embodiment, a surface may include content located in at least two planes. In another embodiment, a surface may include a planar surface. In an embodiment, the content portion 282 may be electronically displayed, such as a text displayed through the surface 281, and/or a text projected on the surface. The surface electronically displaying the content portion may include a surface of a computer monitor, a surface of a television screen, and/or a surface of an e-paper, The exemplary handheld writing device 210 includes a writing element 220. In an embodiment, the writing element may include an active writing element, such as an ink cartridge operable to discharge a marking fluid onto a surface of a document. The active writing element may include a replaceable ink cartridge. In another embodiment, the active writing element may include a pencil lead. In a further embodiment, the writing element may include a non-marking element, such as non-marking stylus.

The writing device 210 also includes a writing detector module 230 operable to generate information indicative of a handwriting movement 250 by the writing element 220. The handwriting movement is illustrated as "My favorite movie line." The writing detector module 230 may be implemented in any manner, including software, hardware, firmware, and/or a combination thereof. An embodiment of the writing detector module 230 may be implemented using reflected light, optical image, sonar, ultrasound, and/or accelerometer detection of a handwriting movement. The handwriting movement may be formed in response to hand movements. In an alternative embodiment, the handwriting movement may be formed in response to movements of another part of a body, such as by movement of a user's head while holding the writing device in their mouth.

In an embodiment, "information" includes data that may be processed, stored, or transmitted by a computing device. In another embodiment, "information" includes a meaning of data as may be interpreted by or meaningful to people. In an embodiment, "data" includes a piece or pieces of information. Data may include facts, quantities, characters, and/or symbols. Data may be subject to operations by a computer, saved, and transmitted by electrical signals.

In an embodiment, the writing detector module 230 may be implemented by illuminating a surface 281 of the document 280 from the handheld writing device 210, and determining the handwriting movement 250 of the writing element 220 in response to reflected illumination from the surface, such as more fully described in U.S. Pat. No. 6,741,335, titled OPTICAL TRANSLATION MEASUREMENT, issued on May 25, 2004, Kinrot, et al. as inventor; U.S. Pat. No. 6,452,683, titled OPTICAL TRANSLATION MEASUREMENT, issued on Sep. 17, 2002, Kinrot, et al. as inventor; and U.S. Pat. No. 6,330,057, titled OPTICAL TRANSLATION MEASUREMENT, issued on Dec. 11, 2001, Lederer, et al. as inventor, each of which is incorporated herein by reference in their entirety for all that they disclose and teach. In another embodiment, the writing detector module may be implemented by capturing images of a pattern in a writing base and handwriting movements of the pen determined by calculating positions of the writing element based on the images of the writing base, such as more fully described in U.S. Pat. No. 7,180,509 (published as US 2004/0179000) titled ELECTRONIC PEN, MOUNTING PART THEREFOR AND METHOD OF MAKING THE PEN, filed Jun. 26, 2002, under application Ser. No. 10/179,949, Fermgard, et al. as inventor, which is incorporated herein by reference in its entirety for all that is discloses and teaches. In a further embodiment, the writing detector module may be implemented using ultrasound to track a handwriting movement of a writing element, such as more fully described in U.S. Pat. No. 6,876,356 (published as US 2003/0173121) titled DIGITZER PEN filed Mar. 18, 2002, under application Ser. No. 10/098,390, Zloter, et al. as inventor, which is incorporated herein by reference in its entirety for all that it discloses and teaches. In an embodiment, the writing detector module may be implemented using a sensor package that measures velocity, acceleration, and angular acceleration in a handheld writing device, such as more fully described in U.S. Pat. No. 6,993,451 (published as US 2004/0260507) titled 3D INPUT APPARATUS AND METHOD THEREOF, filed Jun. 17, 2004 under application Ser. No. 10/868,959, Chang, et al. as inventor, which is incorporated herein by reference in its entirety for all that it discloses and teaches. In another embodiment, the writing detector module may be implemented using an image processing approach that captures and saves segments of a writing movement as a separate image. The final output is a combination of multiple images superimposed on each other.

In another embodiment, the writing detector module 230 may generate information indicative of a handwriting movement 250 by capturing images of the handwriting movement, and stitching the images together.

In an embodiment, the writing detector module 230 may include an electrical circuit 232 operable to generate information indicative of a handwriting movement of the writing element. In a further embodiment, the writing detector module 230 may include operability to generate information indicative of a movement of the writing element generated by an activity of writing by hand. In another embodiment, the writing detector module may include operability to generate information indicative of a movement of the writing element in response to a hand generated activity.

In a further embodiment, the writing detector module 230 may generate raw handwriting movement information. In another embodiment, the writing detector module may process the raw handwriting movement information.

The writing device 210 also includes a context detector module 240 operable to generate information indicative of a content portion of a document proximate to the handwriting movement of the writing element. In an embodiment, a content portion of a document proximate to the handwriting may include a content portion separated from the handwriting movement of less than approximately one to two inches. In another embodiment, a content portion of a document proximate to the handwriting movement may include a content portion and a handwriting movement both on a page. In a further embodiment, a content portion of a document proximate to the handwriting movement may include a content portion on a body that includes the handwriting movement. In an inanimate example, the content portion may be a book title and/or author printed on a book spine or cover, and the handwriting movement being on a page of the book. In an animate example, the content portion may include a portion of a human body, such as a skin surface having a landmark, and the handwriting movement being on the skin surface and proximate to the landmark, such a surgeon marking incision lines before beginning a procedure.

The context detector module 240 may be implemented in any manner, including software, hardware, firmware, and/or any combination thereof. In an embodiment, the context detector module 240 may include an electrical circuit 242 operable to generate information indicative of a content portion 282 of a document proximate to the handwriting movement of the writing element 220, such as the phrase 284 and/or the word 286. An embodiment includes a context detector module operable to generate information indicative of a content portion of a displayed document proximate to the handwriting movement of the writing element. A further alternative embodiment includes a context detector module operable to generate information indicative of a content portion of an electronically displayed document proximate to the handwriting movement of the writing element. Another embodiment includes a context detector module operable to generate information indicative of a printed content portion of a document proximate to the handwriting movement of the writing element. An embodiment includes a context detector module operable to generate information indicative of a printed content portion of a paper-based document proximate to the handwriting movement of the writing element. A further alternative embodiment includes a context detector module operable to generate information indicative of a content portion of an e-paper document proximate to the handwriting movement of the writing element.

In an embodiment, the context detector module 240 may include an image capture device 246 having a lens 248. The image capture device 246 includes operability to capture at least one image of the content portion 282 proximate to the handwriting movement 250, such as the phrase 284 and/or the word 286. The image capture device 246 and the lens 248 may have any location with respect to the handheld writing device 210 suitable for capturing at least one image of a content portion proximate to the handwriting movement, including within an outer periphery of the handheld writing device, and/or outside the outer periphery. In another embodiment, the image capture device 246 includes operability to capture image information of the displayed content portion proximate to the handwriting movement with a resolution sufficient to render the image information into textural information by an optical character resolution process.

In a further embodiment, the image capture device 246 includes operability to capture at least one image of a displayed content portion as a writer moves the writing element 220 of the handheld writing device 210 toward the document 280. In another embodiment, the image capture device includes operability to capture at least one image of a displayed content portion as a writer imparts a handwriting movement to the writing element. In a further embodiment, the image capture device includes operability to capture at least one image of a displayed content portion as a writer moves the writing element of the handheld writing device away from the document. The lens 248 may include a user adjustable orientation allowing a user to optimize image capture.

In an embodiment, the context detector module 240 may include a user activatable switch (not shown) allowing a user to select when the information indicative of a content portion of a document element will be captured. For example, the image capture device 246 may include a user activatable switch allowing a user to select when an image of a content portion is obtained. A user may aim the lens 248 at a content portion and capture an image by activating the switch. The switch may include a hardware switch, a motion sensitive switch, and/or a voice activated switch.

In an embodiment, the context detector module 240 may further include operability to acquire contextual information from another source, and to use that contextual information to generate information indicative of a content portion of a document proximate to the handwriting movement of the writing element. For example, the handwriting movement may occur proximate to a surface or a device operable to generate contextual information indicative of a content portion of a document proximate to the handwriting movement. The surface may include a touch sensitive screen coupled to a circuit operable to generate the contextual information. Alternatively, the handwriting movement may occur proximate to a surface monitored by an ultrasonic system coupled to a circuit operable to generate contextual information indicative of a content portion of a document proximate to the handwriting movement.

In a further embodiment, the context detector module 240 may generate raw information indicative of a content portion of a document proximate to the handwriting movement of the writing element. In another embodiment, the context detector module may process the raw context portion information.

In another embodiment, the context detector module 240 may include operability to generate information indicative of a content portion of a document proximate to the handwriting movement using other technologies. For example, information indicative of a content portion may be generated using data from a radio frequency identification device (RFID) associated with the document, a global positioning satellite system, and/or other data signal.

In an alternative embodiment, the handheld writing device 210 may include a recognition module 290. The recognition module includes operability to generate information indicative of a human readable content in response to the information indicative of the hand driven movement of the writing element. For example, in an embodiment, the recognition module may determine a presence of human readable content in the information indicative of the hand driven or handwriting movement 250 generated by the writing detector module 230, recognize the human readable content as "My favorite movie line," and generate information indicative of that content. In another embodiment, the recognition module may determine a presence of human readable content, recognize the handwriting movements as forming the human readable content as a script character, and generate information indicative of that script character.

In an operation of an embodiment, a reader may wish to annotate the document 280 with a comment or sketch. The reader holds the handheld writing device 210 in their hand in a manner similar to a conventional pen or pencil, and begins handwriting an annotation using the writing element 220 proximate to a content portion 282. The handheld writing device 210 captures a handwriting movement, or hand driven movement, of the writing element imparted by the user's hand to the writing device, and through the writing detector module 230, generates information indicative of the handwriting movement. The handheld writing device captures a context of the handwriting movement through the context detector module 240 by capturing at least one image of the content portion of the document proximate to the handwriting movement. The context may be captured before the handwriting movement, during the handwriting movement, and/or after the handwriting movement. The context detector module generates information indicative of the content portion of the document proximate to the handwriting movement.

Figure 4:
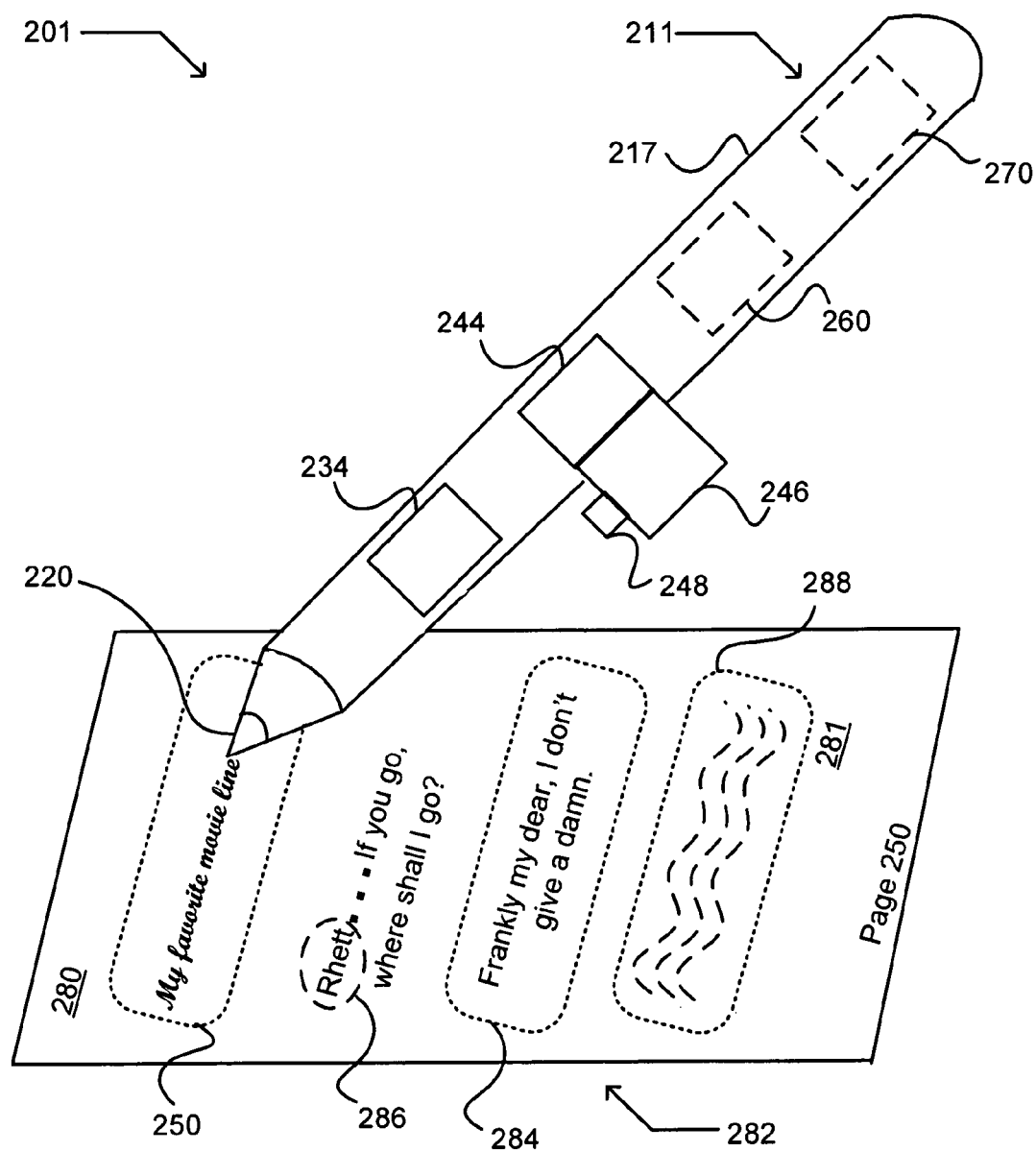
FIG. 4 illustrates a partial view of an environment that includes an exemplary electronic pen, and the exemplary document environment of FIG. 3.

FIG. 4 illustrates a partial view of an environment 201 that includes an exemplary electronic pen 211, and the exemplary document environment 280 of FIG. 3. The electronic pen 211 includes a generally elongated body 217 and the writing element 220 extending from the generally elongated body. In an embodiment, the writing element may be configured to make a visible mark. A visible mark may include any mark visible to a human eye. For example, a visible mark may include an ink mark, and/or a pencil mark. A visible mark may include a letter, a character, a symbol, a line, and/or a figure.

The electronic pen 211 also includes a writing detector module 234 operable to generate information indicative of a hand driven movement of the writing element. In an embodiment, a hand driven movement includes a hand-generated movement. In an alternative embodiment, the writing detector module includes operability to generate information indicative of a hand driven movement of the writing element in contact with the surface 281 of a document 280. In another alternative embodiment, the writing detector module includes operability to generate information indicative of a hand driven movement of the writing element in contact with the surface of a paper document. In a further embodiment, the writing detector module includes operability to generate information indicative of a hand driven movement of the writing element in contact with a surface displaying an electronic document. The writing detector module may be implemented in any manner, including software, hardware, firmware, and/or a combination thereof. An embodiment of the writing detector module may be implemented using reflected light, optical image, sonar, ultrasound, and/or accelerometer detection of the handwriting movement. In an embodiment, the writing detector module may be implemented in a manner at least substantially similar to the writing detector module 230 of FIG. 3.

The electronic pen further includes a context detector module 244 operable to generate information indicative of a content portion of a document proximate to the hand driven movement of the writing element. In an alternative embodiment, the context detector module may include operability to generate information indicative of a content portion of a page of multiage document proximate to the handwriting movement of the writing element. In another alternative embodiment, the context detector module may include operability to generate information indicative of a hand-generated writing movement of the writing element. The context detector module 244 may be implemented in any manner, including software, hardware, firmware, and/or any combination thereof. In an embodiment, the context detector module 244 may be implemented in a manner at least substantially similar to the writing detector module 240 of FIG. 3.

In an alternative embodiment, the electronic pen 211 may include at least one additional module. Additional modules may include a communications module 260 and a storage module 270. In an embodiment, the communications module 260 includes operability to transmit at least one of the signal indicative of a hand driven movement of a writing element and the signal indicative of at least a portion of a document proximate to the hand driven movement of the writing element. The term "signal" means at least one current signal, voltage signal, or signal. In another embodiment, the communications module includes operability to transmit in real time at least one of the information indicative of a hand driven movement of a writing element and the information indicative of at least a portion of a document proximate to the hand driven movement of the writing element. In a further embodiment, the communications module includes operability to transmit at least one of processed information corresponding to the information indicative of a handwriting movement of a writing element and processed information corresponding to the information indicative of at least a portion of a document proximate to the writing movement of the writing element.

The communications module 260 may transmit a signal. In an optional embodiment, the communications module both receives and transmits signals (transceiver). For example and without limitation, "signal" includes a current signal, voltage signal, magnetic signal, or optical signal in a format capable of being stored, transferred, combined, compared, or otherwise manipulated. The communications module may include wireless, wired, infrared, optical, and/or other communications techniques. In an embodiment, the communications module may include operability for communication with a computing device, such as the thin computing device 20 of FIG. 1, and/or the computing device 110 of FIG. 2. The communications module may include an antenna for wireless communication, a connection for wired connection, and/or an optical port for optical communication.

The digital storage module 270 may include any suitable digital storage medium. For example, a digital storage medium may include a computer storage medium. The digital storage module includes operability to save at least one of the information indicative of a hand driven movement of a writing element and the information indicative of at least a portion of a document proximate to the hand driven movement of the writing element. Information may be saved in any form or format, such as a raw data form, or a processed data form. In conjunction with the communications module 260, information may be saved as generated and then be available for uploading at a later time. For example, information may be stored, batched, and subsequently transmitted. In another example, information may be stored, and subsequently transmitted after the electronic pen 211 is docked.

In operation of an embodiment, the electronic pen 211 acquires a handwritten annotation and a context of the handwritten annotation in a manner at least substantially similar to the handheld writing device 210 of FIG. 3. In addition, the electronic pen 211 may transmit signals indicative of the handwritten annotation and the context of the annotation using the communication module 260. One or both of the signals may be transmitted in real time as a reader writes an annotation. In an alternative embodiment, one or both of the signals may be processed by a component of the electronic pen prior to transmission. In another alternative embodiment, the electronic pen may save one or both of the signals in the digital storage medium 270. The saved signal may be transmitted at a later time.

Figure 5:
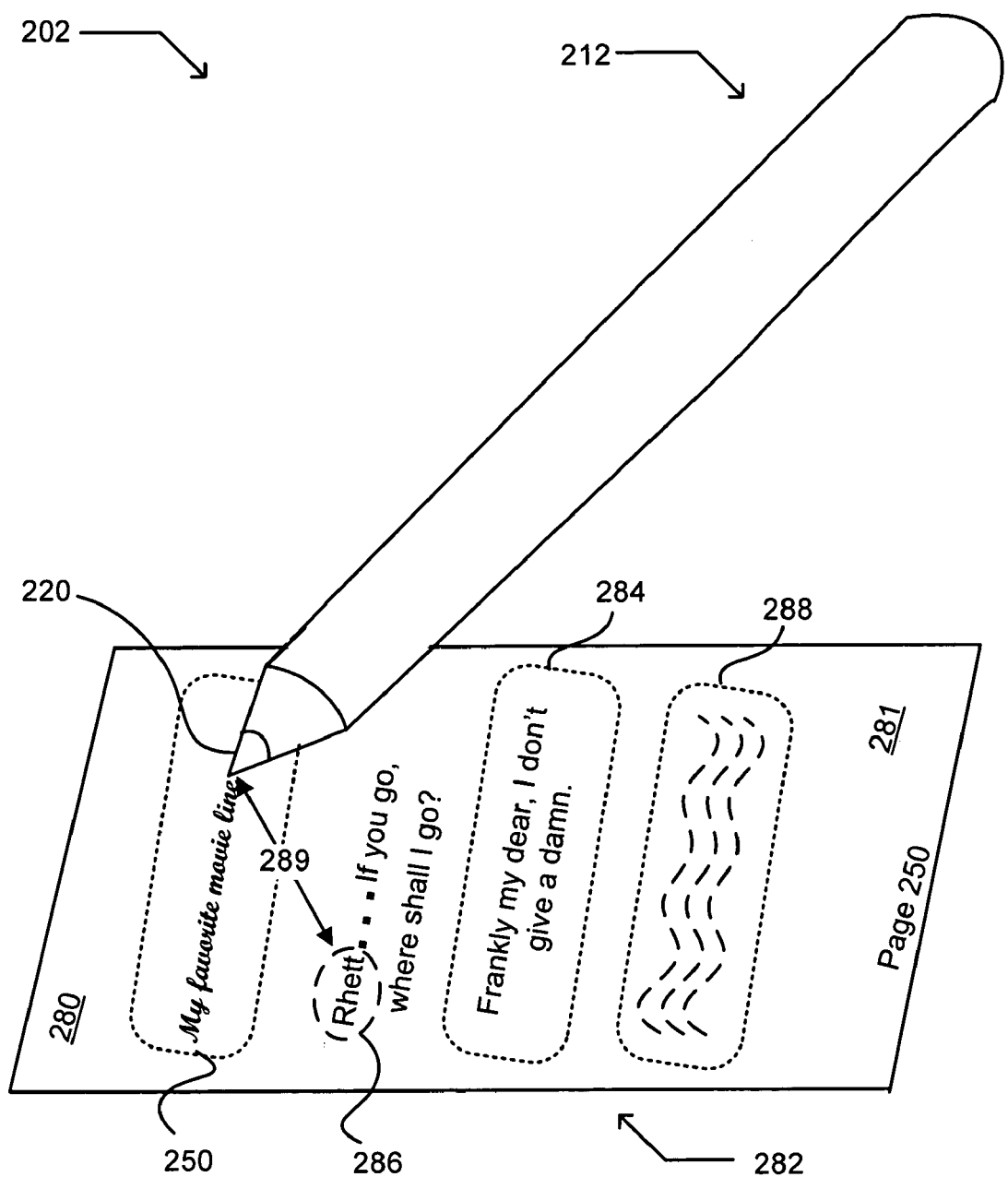
FIG. 5 illustrates a partial view of an environment that includes an exemplary apparatus, and the exemplary document environment of FIG. 3.

FIG. 5 illustrates a partial view of an environment 202 that includes an exemplary apparatus 212, and the exemplary document environment 280 of FIG. 3. The apparatus 212 includes operability to mark the document 280, such as the handwriting movement 250, and to generate an electronic indicator of a position 289 of the mark relative to an existing character, such as the word 286 "Rhett" of the document. The indicator 289 of a position of the mark relative to an existing word 286 may be expressed in any manner, including an indication in Cartesian coordinates, and/or spherical coordinates. In an embodiment, the existing character of the document includes at least one existing letter displayed by the document. In another embodiment, the existing character of the document includes at least one existing word displayed by the document. In a further embodiment, the document includes at least one existing image displayed by the document.

In an alternative embodiment, the apparatus 212 includes a pen configured to mark relative to an existing character, such as the word 286, of a document 280 based, at least in part, on a marking position 289 relative to the existing character of the document, wherein the mark and an indicator of the marking position are saved within the pen.

Figure 6:
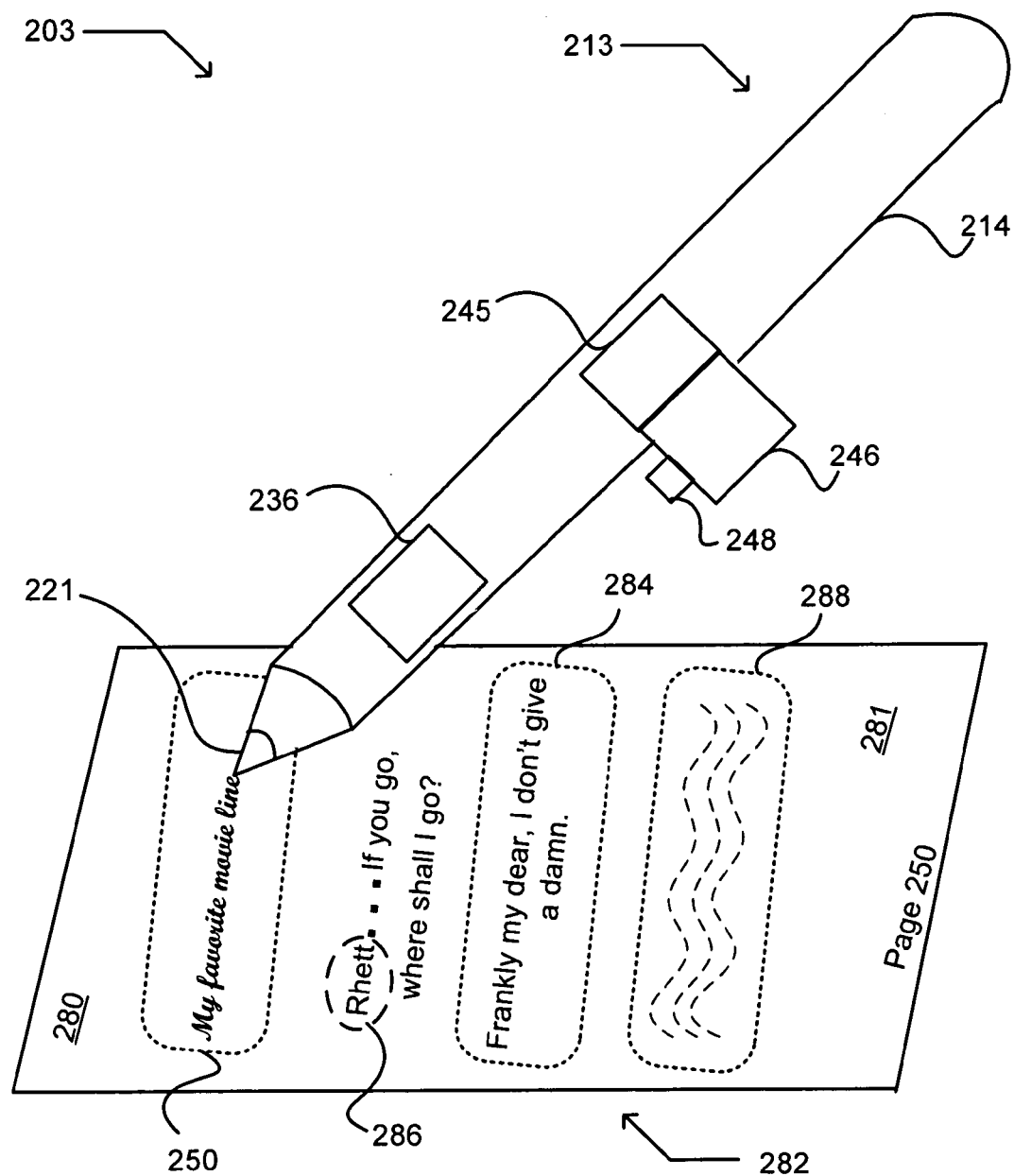
FIG. 6 illustrates a partial view of an environment that includes an exemplary apparatus, and the exemplary document environment of FIG. 3.

FIG. 6 illustrates a partial view of an environment 203 that includes an exemplary apparatus 213, and the exemplary document environment 280 of FIG. 3. The apparatus 213 includes a stylus 221 configured to write on a surface, such as the surface 281 of the document 280. The stylus may be at least similar to the stylus 220 of FIG. 3. The apparatus also includes a position sensor 236 operable to generate information indicative of handwriting movement 250 of the stylus relative to the surface. The apparatus includes an imaging element 245 operable to generate information representing at least a portion of the word 286 displayed from the surface proximate to the handwriting movements.

Figure 7:
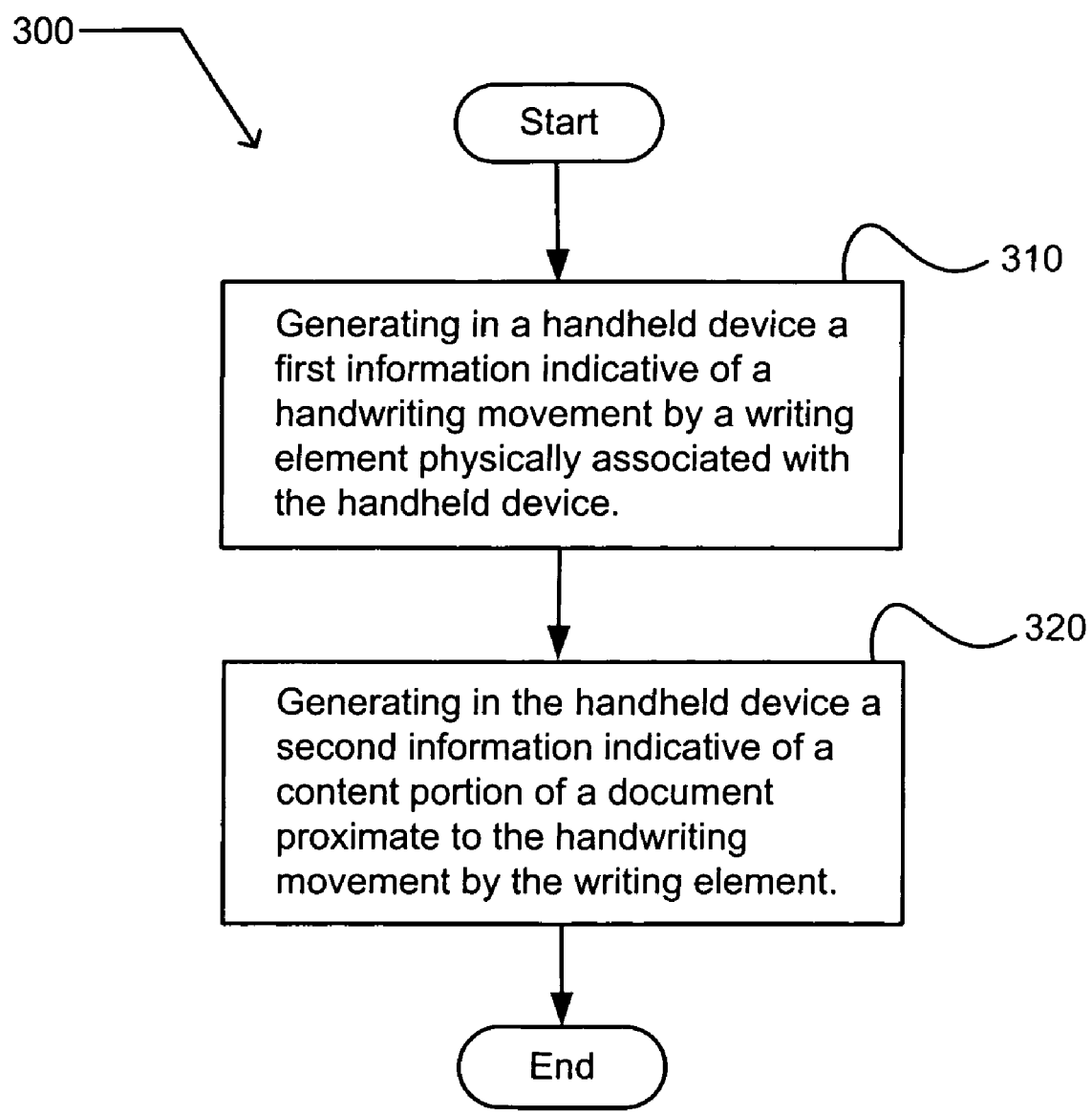
FIG. 7 illustrates an exemplary operational flow.

FIG. 7 illustrates an exemplary operational flow 300. After a start operation, the operational flow 300 moves to a content operation 310. At the content operation 310, a first information is generated in a handheld device indicative of a handwriting movement of a writing element physically associated with the handheld device. At the operation 320, a second information is generated in the handheld device information indicative of a content portion of a document proximate to the handwriting movement of the writing element. The operational flow 300 then proceeds to an end operation.

Figure 8:
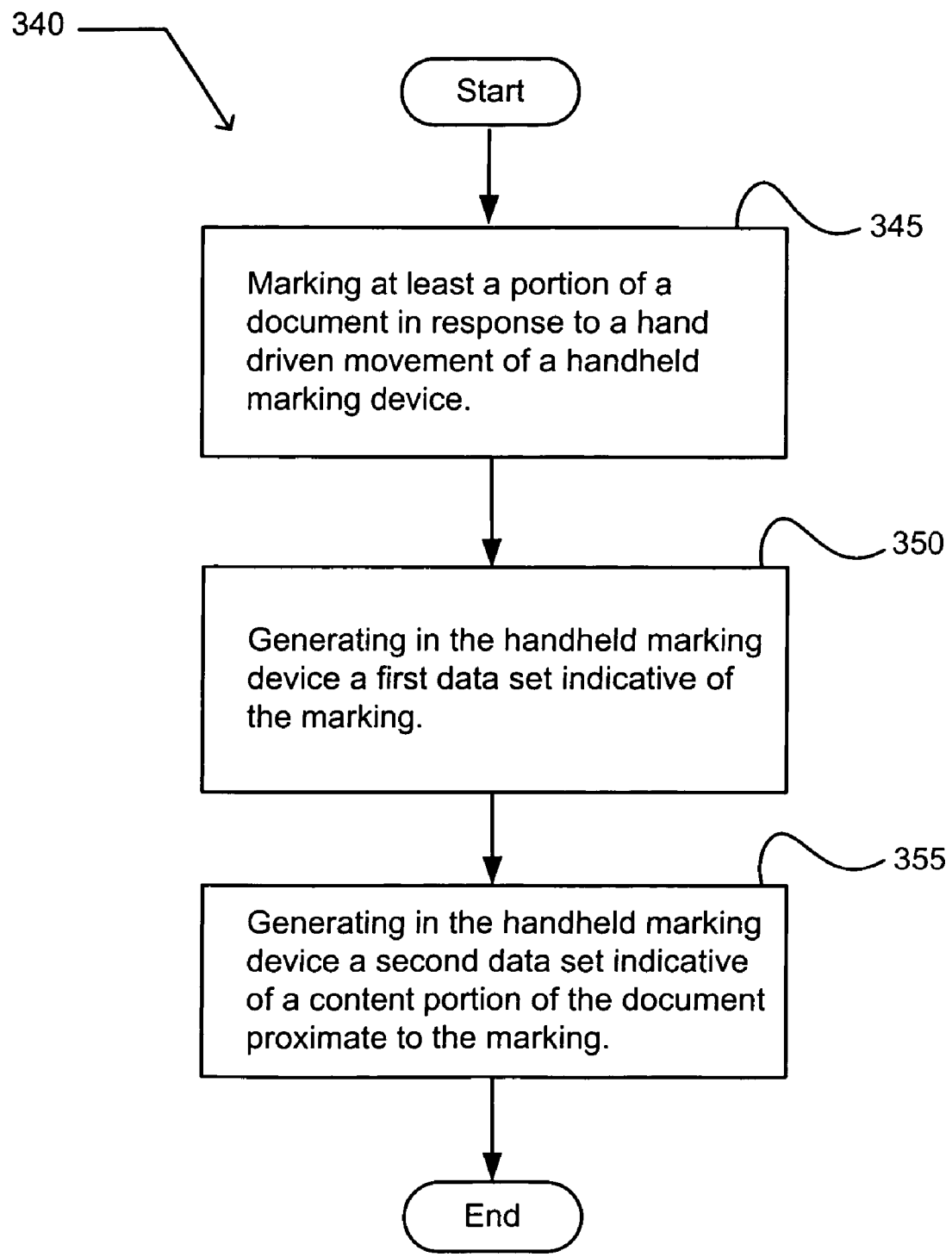
FIG. 8 illustrates another exemplary operational flow.

FIG. 8 illustrates an exemplary operational flow 340. After a start operation, the operational flow 340 moves to a writing operation 345. At the writing operation 345, at least a portion of a document is marked in response to a hand driven movement of a handheld marking device. At a content operation 350, a first data set indicative of the marking is generated in the handheld marking device. At a context operation 355, a second data set indicative of a content portion of the document proximate to the marking is generated in the handheld marking device.

Figure 9:
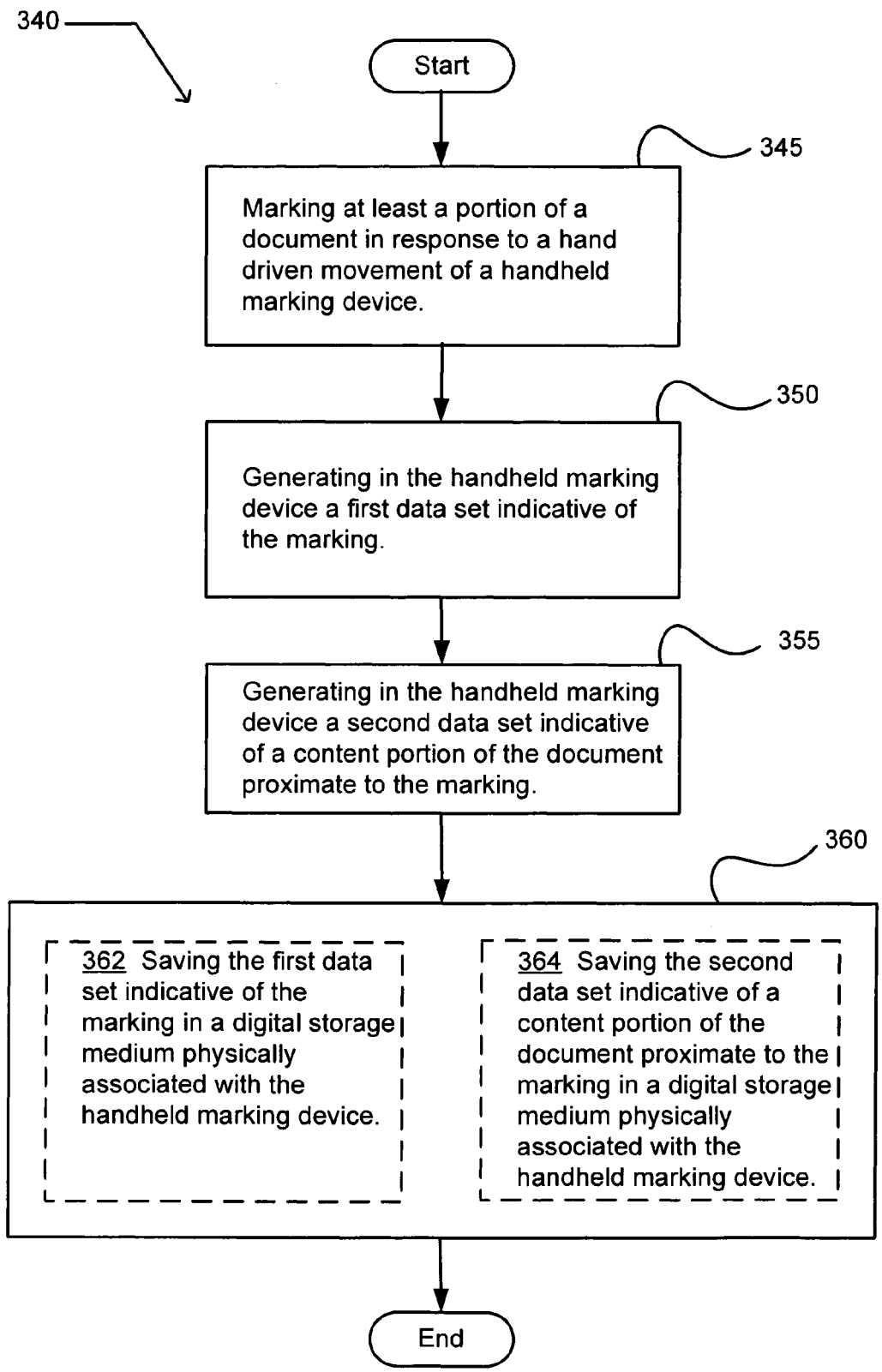
FIG. 9 illustrates an alternative embodiment of the exemplary operational flow of FIG. 8.

FIG. 9 illustrates an alternative embodiment of the exemplary operational flow 340 of FIG. 8. FIG. 9 illustrates an embodiment where the exemplary operation flow 340 may include at least one additional operation 360. The additional operation 360 may include an operation 362 and an operation 364. At the operation 362, the first data set indicative of the marking is saved in a digital storage medium physically associated with the handheld device. At the operation 364, the second data set indicative of a content portion of the document proximate to the marking is saved in a digital storage medium physically associated with the handheld device.

Figure 10:
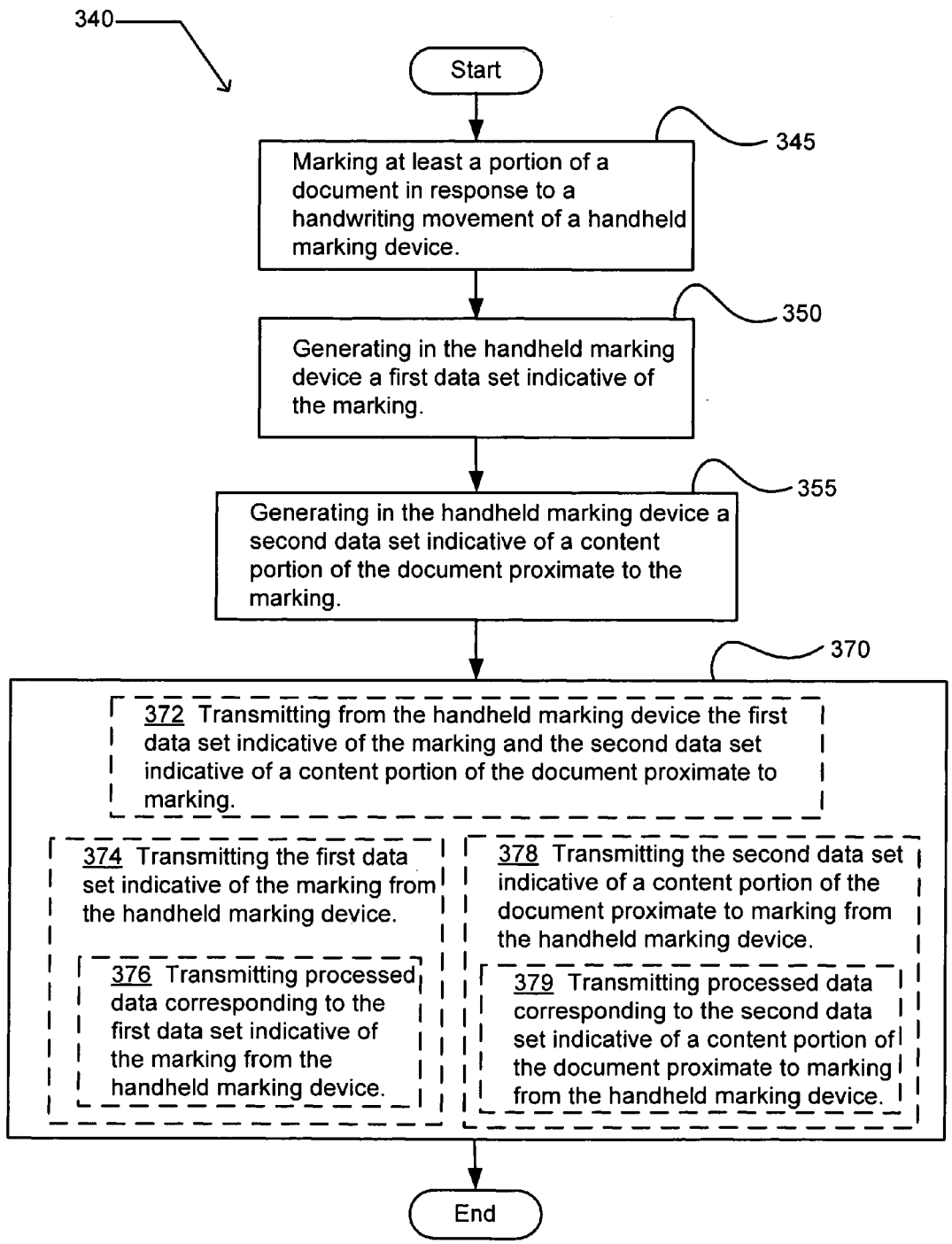
FIG. 10 illustrates another alternative embodiment of the exemplary operational flow of FIG. 8.

FIG. 10 illustrates an alternative embodiment of the exemplary operational flow 340 of FIG. 8. FIG. 10 illustrates an embodiment where the exemplary operation flow 340 may include at least one additional operation 370. The additional operation 370 may include an operation 372, an operation 374, and an operation 378. At the operation 372, the first data set indicative of the marking and the second data set indicative of a content portion of the document proximate to marking are transmitted from the handheld marking device. At the operation 374, the first data set indicative of the marking is transmitted from the handheld marking device. The operation 374 may include at least one additional operation, such as an operation 376. At the operation 376, processed data corresponding to the first data set indicative of the marking is transmitted from the handheld marking device. At the operation 378, the second data set indicative of a content portion of the document proximate to marking is transmitted from the handheld marking device. The operation 378 may include at least one additional operation, such as an operation 379. At the operation 379, processed data corresponding to the second data set indicative of a content portion of the document proximate to marking is transmitted from the handheld marking device.

FIG. 11 illustrates a partial view of an exemplary computer-program product 400 that includes a computer program 404 for executing a computer process in a handheld computing device. An embodiment of the exemplary computer-program product 400 may be provided using a computer-readable medium 402, and includes computer executable instructions. The computer product 400 encodes the computer program 404 for executing on the handheld computing device a computer process. The computer process includes generating in the handheld device a first data set indicative of a handwriting movement of a writing element physically associated with the handheld device, and generating in the handheld device a second data set indicative of a content portion of a document proximate to the handwriting movement of the writing element. In an alternative embodiment, the computer process 404 may further include an additional process, such as a process 406, a process 408, and a process 410. At the process 406, the first data set indicative of a handwriting movement and the second data set indicative of a content portion of the document proximate to the handwriting movement are saved in a digital storage medium physically associated with the handheld device. At the process 408, the first data set indicative of the handwriting movement is transmitted. At the process 410, the second data set indicative of a content portion of the document proximate to the handwriting movement is transmitted. The computer-readable medium 402 may include a computer storage medium, which may be carried by a computer-readable carrier (not shown). The computer-readable medium 402 may include a communications medium (not shown). The computer-program product 400 may be implemented in hardware, software, and/or firmware.

Figure 12:
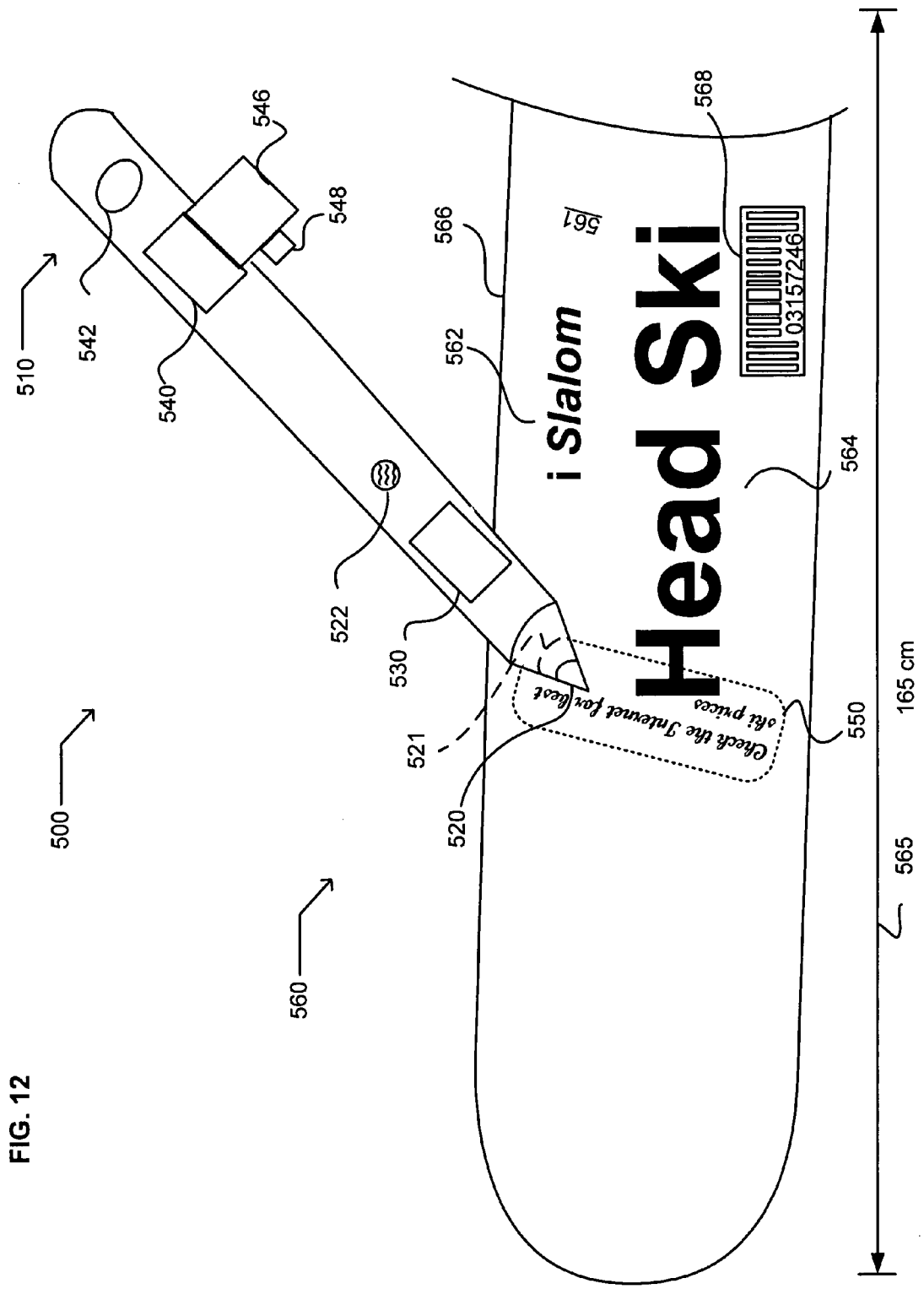
FIG. 12 illustrates an environment that includes a partial view of an exemplary annotation system and a partial view of an exemplary item.

FIG. 12 illustrates an environment 500 that includes a partial view of an exemplary annotation system and a partial view of an exemplary item. The exemplary annotation system is illustrated as an exemplary handheld system 510. The exemplary item is illustrated as a ski 560 having at a top surface 561, and two recognizable aspects printed and/or painted on the surface. Recognizable aspects are illustrated as a text content "i Slalom" 562 and a trademark content "Head Ski" 564. Another recognizable aspect may include a recognizable ski shape, illustrated as a recognizable outer periphery 566, a recognizable electronic product code, illustrated as an electronically readable bar code 568, and/or a recognizable dimension 565, illustrated as a length of 165 cm.

In a further embodiment, a recognizable aspect may include a textual content portion. For example, a textual content portion may include words printed or displayed on a surface, such as a page of a book, and/or words printed on a cover or a spine of a book. In a further embodiment, a recognizable aspect may include a human language content, for example, text printed in roman alphabet characters, math symbols, and/or script characters such as Asian language characters. In another embodiment, a recognizable aspect may include a human readable content, and/or graphical content. In an embodiment, a recognizable aspect may include a graphical content having a meaning or a significance to a human, such as a picture, a drawing, a figure, a photograph, an illustration, a diagram, a doodle, a decoration, a sketch, and/or a portrait. In another embodiment, a recognizable aspect may be arbitrary and recognizable by an individual human reader, and not recognizable by another individual human reader. In a further embodiment, a recognizable aspect may include any content primarily useful to a human reader. For example, a recognizable aspect may include a textual and/or graphical label on a retail article, such as clothing, a retail package, or a carton. A recognizable aspect may include an address written on a shipping label or an address written on a side of a building. A recognizable aspect may include dynamically displayed matter, such as an alignment of an indicator needle with a speed value on a vehicle speedometer, or a temperature reading on a thermometer. In another embodiment, a recognizable aspect may include an incidental element not primarily employed by a human reader but that aids in distinguishing the item. In an embodiment, a recognizable aspect may include any aspect recognizable by a human, a computing device, a recognition program running on a computing device, a computer implement method, and/or a machine. In another embodiment, a recognizable aspect may include a characteristic form and/or shape, such a pair of skates, a car, and/or a dress. In an embodiment, an aspect may be recognizable locally in response to information indicative of a recognizable aspect of an item. In another embodiment, an aspect may be recognizable in response to information provided by a remote third-party responsive at least in part to information indicative of a recognizable aspect of an item.

The exemplary handheld system 510 includes a writing element 520 operable to form a user expression. The user expression is illustrated as a handwritten user expression "Check the Internet for best ski prices" 550. In an embodiment, the writing element may include an active writing element, such as an ink cartridge operable to discharge a marking fluid onto a surface of a document. The active writing element may include a replaceable ink cartridge. The active writing element may include a disappearing ink. The active writing element may include a pencil lead. In a further embodiment, the writing element may include a non-marking element, such as non-marking stylus. In an alternative embodiment, the system may include a microphone 522 operable to capture an audible user expression, such as a sound, word, and/or sentence.

The handheld system 510 includes an annotating device 530 operable to generate information indicative of a user expression associated with a recognizable aspect of the item 560. In an embodiment where the user expression includes the handwritten user expression 550 visually or spatially associated with the recognizable trademark content "Head Ski" 564 and/or the text content "i Slalom" 562 on the top surface 561, the annotating device includes operability to generate information indicative of the handwritten user expression 550 formed by the writing element 520. Where the exemplary item includes a retail item in a store, such as the ski 560, the writing element may include a non-marking writing element. Alternatively, when the item includes a retail item in a store, a user may adhere a "Post It" type notepaper proximate to a recognizable aspect, handwrite on the "Post It" so as not to damage or mar the item, capture the handwritten expression, and then remove the "Post It." In an embodiment where the user expression includes an audible user expression, such as a spoken sentence "Check the Internet for best ski prices," the annotating device may include operability to generate information indicative of the spoken sentence received by the microphone 522.

The annotating device 530 may be implemented in any manner, including software, hardware, firmware, and/or a combination thereof. The annotating device may be implemented in a manner at least substantially similar to the writing detector module 230 of FIG. 3. In an embodiment, the annotating device may include operability to generate information indicative of a user verbal expression (not shown) associated with the recognizable aspect of the item. The annotating device may include operability to generate information indicative of the handwritten user expression "Check the Internet for best ski prices" 550 associated with the recognizable aspect of the item. The annotating device may include operability to generate information indicative of a user hand drawn expression associated with the recognizable aspect of the item. The annotating device may include operability to generate information indicative of a user gesture associated with the recognizable aspect of the item. The annotating device may include operability to generate information indicative of a user gesture formed at least in part by a user limb. The annotating device may include operability to generate information indicative of a user gesture formed with a user held stylus.

Continuing with FIG. 12, the handheld system 510 includes an annotation environment capture device 540 operable to generate information indicative of a recognizable aspect of an item, such as the text content "i Slalom" 562. The annotation environment capture device may be implemented in any manner, including software, hardware, firmware, and/or any combination thereof. The context-detecting device may be implemented in a manner at least substantially similar to the context detector module 240 of FIG. 3. In an embodiment, the context-detecting device 540 may include operability to generate information indicative of a recognizable aspect of an item in response to data acquired from at least one of several technologies and/or data sources. For example, data indicative of a recognizable aspect of an item may be acquired from data corresponding to the recognizable aspect of the item, such as for example, time of day, time of user expression, time period of user expression, user-entered time, time bracket, date, location, presence of another person, presence of other items, temperature, elevation, bearing, and/or global position coordinates. By way of further example, data corresponding to the recognizable aspect of an item may be acquired at least in part from a radio frequency identification device (RFID). The RFID may be directly associated with the aspect of item, associated with the item, and/or indirectly associated with the item.

In another embodiment, the context-detecting device 540 may include an image capture device 546 having a lens 548. The image capture device and/or the lens may be implemented in a manner at least substantially similar to the image capture device 246 and/or lens 248 of FIG. 3. In an embodiment, the context-detecting device 540 may include a user-activatable switch 542 allowing a user to select when the information indicative of a recognizable aspect of an item will be captured. For example, a user may aim the lens 548 at a recognizable aspect of an item and capture an image by activating the switch 542. The switch may include a hardware switch, a motion sensitive switch, and/or a voice activated switch. In a further embodiment, the context-detecting device may generate raw information indicative of a recognizable aspect of an item. In another embodiment, the context-detecting device may process the raw information indicative of a recognizable aspect of an item.

In an embodiment, the context-detecting device 540 may include operability to generate information indicative of a machine recognizable aspect of an item, such as the ski 560. A machine recognizable aspect of the ski may include a ratio of its length dimension 565 to its width (not shown). The context-detecting device may include operability to generate information indicative of an optically recognizable aspect of an item. The context-detecting device may include operability to generate information indicative of a recognizable human readable content of an item, such as the trademark content "Head Ski" 564. The context-detecting device may include operability to generate information indicative of a recognizable native text of an item, such as the text content "i Slalom" 562. The context-detecting device may include operability to generate information indicative of a recognizable shape aspect of an item, such as the ski shape 566. The context-detecting device may include operability to generate information indicative of a recognizable dimensional aspect of an item, such as the length dimension 565 of the ski 560.

In an alternative embodiment of the handheld system 510, an impact and/or pressure sensitive switch 521 may include a non-marking element version of the writing element 520. Tapping the non-marking element 520 against a surface of an item, such as the surface 561, activates the switch 521. In an embodiment, activation of the switch causes the annotating device 530 to record a verbal user expression. In another embodiment, activation of the switch causes the context-detecting device 540 to acquire an image of a recognizable aspect of the item, such as the trademark content "Head Ski" 564.

In a further embodiment, the context-detecting device 540 may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

In an embodiment, the system may include a communications device (not shown). The communications device may include operability to communicate at least one of the information indicative of a recognizable aspect of an item and the information indicative of a user expression associated with the recognizable aspect of the item. In another embodiment, the system may include a storage device (not shown). The storage device may include operability to save at least one of the information indicative of a recognizable aspect of an item and the information indicative of a user expression associated with the recognizable aspect of the item.

As used in this document, an "item" may include a thing, an article, an object, an occurrence, a garment, a vehicle, a body, a person, a worldly matter, and/or a state of an item. An item may include a representation. An item may be very small, such as would require aided vision for human viewing, or an item may be very large, such as a building, an aircraft, vehicle, and/or a vessel that a human could walk through. An item may be animate and/or inanimate.

A user expression may be associated by the user with an item or an aspect of an item in any manner. In an embodiment, the user expression may be physically associated with an aspect of an item by the user. For example, a user may associate a user expression and an aspect of an item by writing the user expression on the item and proximate to the aspect. Writing proximate to the text content "i Slalom" 562 is an example of a user expression associated by the user with an aspect of an item. In another embodiment, the user expression may be temporally associated with an item or aspect of an item. For example, a user may temporally associate a user expression and an item or aspect of an item by speaking at a time when the item or aspect of the item is spatially proximate to the user. In another embodiment, a user may associate a user expression and an item or aspect of an item by a gesture. For example, a user may gesturally associate a user expression and an item or aspect of an item by tapping on or pointing to the item or aspect of the item while speaking.

In operation of an embodiment, a user may wish to associate a user expression with a recognizable aspect of an item. For example, a user signing a printed credit card slip in a restaurant may wish to associate information indicative of their entries and the printed credit card slip. In addition, a user may wish to associate information indicative of the meal and the printed credit card slip. In this example, the handheld system 510 generally having a shape of a common writing pen may be used. A written user expression associated with the credit card slip may include a user written entry for a tip, a user written entry for a total charge, and a user written signature entry, made with the active writing element 520 having an ink tip.

In an embodiment, the written entries are captured by the annotating device 530. In another embodiment, images of the written entries are captured by the image capture device 546. Further, before, during, and/or after the writing, the user may verbally express a description the meal and the quality of the meal in association with the printed credit card slip, and perhaps a description of a wine consumed during the meal. A user verbal expression is captured by the microphone 522.

Also, before, during, and/or after the writing, the image capture device 546 captures an image indicative of at least one recognizable aspect of the printed credit card slip. A recognizable aspect of the credit card slip may include a name of the restaurant, a date, a time, a charge for meals, a sever name, and/or a charge for wine.

The annotating device 530 generates information indicative of the user's verbal expression(s) and/or the user's handwritten expression(s). The context-detecting device 540 generates information indicative of a recognizable aspect of the credit card slip. The information indicative of a recognizable aspect of the credit card slip and/or the information indicative of the user expression may be saved in the handheld system for later communication to a computing device, such as a computer device running an expense account program.

Figure 13:
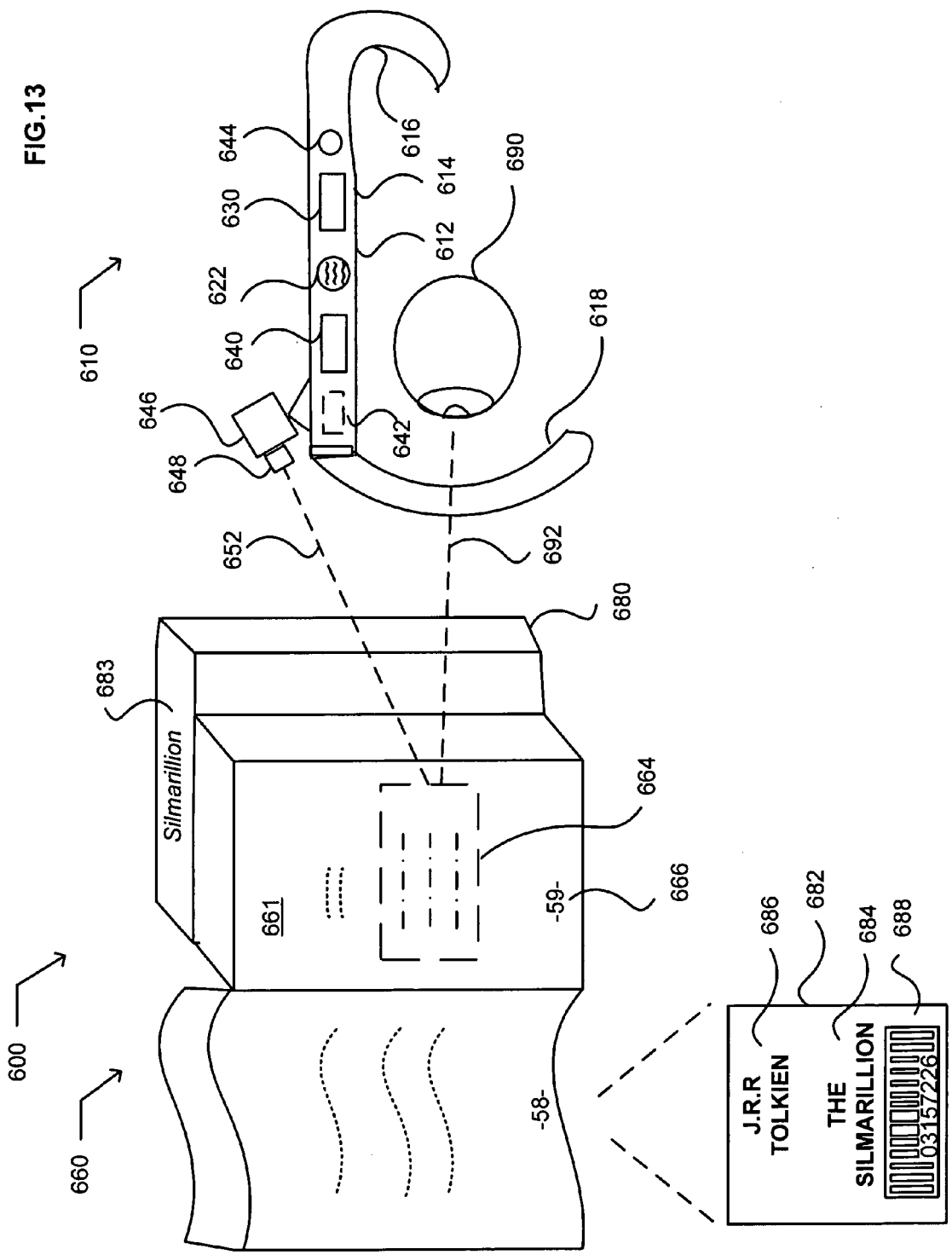
FIG. 13 illustrates an environment that includes a partial view of an exemplary annotation system and a partial view of an exemplary item.

FIG. 13 illustrates an environment 600 that includes a partial view of an exemplary annotation system and a partial view of an exemplary item. The exemplary annotation system is illustrated as an exemplary human wearable annotation system 610, which is further illustrated as an exemplary head mountable system 612. The exemplary item is illustrated as an exemplary bound paper book 660. The exemplary book illustrates several exemplary recognizable aspects, including a cover 682, an author name 686, illustrated as J. R. R. Tolkien, a cover title 684, illustrated as "The Silmarillion," and an electronically readable product code 688, illustrated as a bar code. Further illustrated exemplary recognizable aspects include a page having a page number 666, illustrated as page number "59," a page surface 661, and a binding 680 having a binding title 683, illustrated as "Silmarillion." The exemplary book also illustrates an exemplary recognizable aspect that includes a recognizable text content 664 printed on and native to the page surface 661 of the page number 59.

The exemplary head mountable system 612 includes a frame 614, which includes an earpiece 616 and an eye cover 618. In an optional embodiment, the eye cover may be omitted. The frame includes a configuration to be worn in a manner similar to a pair of eyeglasses. In an embodiment, the eye cover 618 includes a configuration that allows a substantially unobstructed line of sight, illustrated as a eye gaze 692, between an eye 690 and an aspect of an item, illustrated as the recognizable text 664. In an embodiment, the frame provides a structure that incorporates an annotating device 630, an annotation environment capture device 640, and a microphone 622 and associated sound capture circuitry. In an optional embodiment, the frame may also provide a structure that incorporates a user-activatable switch 644. In another embodiment, the system 612 may include any configuration allowing it to be worn on a head.

The annotation environment capture device 640 includes operability to generate information indicative of a recognizable aspect of an item. In an embodiment, annotation environment capture device includes a tracking module 642 operable to track the eye gaze 692 directed proximate to a recognizable aspect of the item. In another embodiment, the annotation environment capture device includes an image capture module 646 operable to acquire an image of a recognizable aspect of the item. In a further embodiment, the annotation environment capture device includes an image capture module 646 and a lens 648 operable to acquire an image of a recognizable aspect of the item in response to a signal indicative of a received user command. The user command may include a verbal command, a gestural command, and/or activation of a switch, such as the switch 644. The capture module 646 and the lens 648 direct a lens track 652 on a recognizable aspect of an item.

The annotation environment capture device 640 operable to generate information indicative of a recognizable aspect of an item may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

The annotation environment capture device operable to generate information indicative of a recognizable aspect of an item may include a tracking module operable to track an eye gaze directed proximate to the recognizable aspect of the item. The annotation environment capture device operable to generate information indicative of a recognizable aspect of an item may include a receiver circuit operable to receive a signal containing data indicative of a recognizable aspect of the item. The annotation environment capture device operable to generate information indicative of a recognizable aspect of an item may include an image capture module operable to acquire an image of a recognizable aspect of the item. The annotation environment capture device operable to generate information indicative of a recognizable aspect of an item may include an image capture module operable to acquire an image of a recognizable aspect of the item in response to a signal indicative of a received user command.

The annotation environment capture device 640 may include operability to generate information indicative of a machine recognizable aspect of an item. In an embodiment, a machine recognizable aspect of an item may include the author name 686, the cover title 684, the page number 666, the binding title 683, the electronically readable product code 688, and/or the text content 664. The annotation environment capture device may include operability to generate information indicative of an optically recognizable aspect of an item. In an embodiment, an optically recognizable aspect of an item may include the author name, the cover title, the page number, the binding title, and/or the text content. The annotation environment capture device may include operability to generate information indicative of a human recognizable aspect of an item. In an embodiment, a human recognizable aspect of an item may include the author name, the cover title, the page number, the binding title, and/or the text content. The annotation environment capture device may include operability to generate information indicative of a recognizable native text of an item. In an embodiment, a recognizable native text of an item may include the author name, the cover title, the page number, the binding title, and/or the text content. The annotation environment capture device may include operability to generate information indicative of a recognizable visual aspect of an item. In an embodiment, a recognizable aspect of an item may include an optically recognizable author name, cover title, page number, binding title, and/or text content. The annotation environment capture device may include operability to generate information indicative of a recognizable image aspect of an item. In an embodiment, a recognizable image aspect may include a picture, a figure, a drawing, and/or a graphic element (not shown) of the item. The annotation environment capture device may include operability to generate information indicative of a recognizable aspect of an item. In an embodiment, a recognizable aspect may include any recognizable aspect of the book. The annotation environment capture device may include operability to generate information indicative of a recognizable human readable content. In an embodiment, a recognizable human readable content may include the author name, the cover title, the page number, the binding title, and/or the text content. The context-detecting device operable to generate information indicative of a recognizable aspect of an item may include a context-detecting device operable to generate information indicative of a recognizable audio aspect of an item. For example, the context-detecting device may include an operability to generate information indicative of a recognizable excerpt of a music piece, such as a song, or an excerpt of a speech.

The annotation environment capture device operable to generate information indicative of a recognizable aspect of an item may include an annotation environment capture device operable to generate information indicative of a recognizable aspect of an item in response to an input received from the user. For example, an input received from a user may include an interaction with a user to select an item to which the user expression is associated from among at least two candidate items in an image. By way of further example, an input received from a user may include an interaction with a user to select an aspect of an item to which the user expression is associated from among at least two candidate aspects of an item. The annotation environment capture device operable to generate information indicative of a recognizable aspect of an item may include an annotation environment capture device operable to generate information indicative of a recognizable aspect of an item in response to an input responsive to a gesture by the user. For example, an input responsive to a user gesture may include a user pointing to an item to which the user expression is associated from among at least two candidate items in an environment.

The annotation environment capture device 640 operable to generate information indicative of a recognizable aspect of an item may include an annotation environment capture device operable to generate information indicative of a recognizable shape aspect of an item. The annotation environment capture device operable to generate information indicative of a recognizable aspect of an item may include an annotation environment capture device operable to generate information indicative of a recognizable dimensional aspect of an item.

In a further embodiment, the annotation environment capture device 640 may include a module operable to recognize data indicative of the recognizable aspect of an item. The module operable to recognize data indicative of the recognizable aspect of an item may include an artificial intelligence module operable to recognize data indicative of the recognizable aspect of an item. The module operable to recognize data indicative of the recognizable aspect of an item may include a pattern recognition module operable to recognize data indicative of the recognizable aspect of an item.

The annotation environment capture device 640 may be implemented in any manner, including software, hardware, firmware, and/or any combination thereof. The annotation environment capture device may be implemented in a manner at least substantially similar to the context-detector module 240 of FIG. 3.

Continuing with FIG. 13, the annotating device 630 includes operability to generate information indicative of a user expression associated with the recognizable aspect of the item. In an embodiment, the annotating device may include operability to generate information indicative of a user verbal expression associated with the recognizable aspect of the item. In an embodiment, a user verbal expression may include a verbal sound, a word, at least two words, and/or a sentence. In another embodiment, a user verbal expression may include any vocal expression a user wishes to associate with the recognizable aspect of the item. In an embodiment, the annotating device includes operability to generate information indicative of a preformed user expression associated with the recognizable aspect of the item. In a further embodiment, a preformed user verbal expression may include at least one word representative of at least two words. For example, a verbalized word "high" may represent a verbal expression of "this aspect is of high interest to me."

The annotating device 630 may be implemented in any manner, including software, hardware, firmware, and/or any combination thereof. The annotating device may be implemented in a manner at least substantially similar to the context-detector module 230 of FIG. 3.

In operation of an embodiment, a user may don the exemplary head mountable system 612 in a manner similar to eyeglasses. The person may direct their eye gaze 692 through the eye cover 618 and at one or more recognizable aspects of an item, such as for example, the text content 664. Alternatively, the user's gaze 692 may be directed toward any other recognizable aspect of the book described above, for example, the title 684. The tracking module 642 tracks the gaze 692 of the user's eye 690 and aligns the lens track 652 of the lens 648 of the image capture module 646 with the recognizable text content. An image of the text content 664 may be captured. The capture may be automatic, such as in response to a predetermined time that the gaze 692 is directed toward the recognizable text context, and/or such as in response to the user making a verbal expression associated with the recognizable text context. Alternatively, the capture may be in response the user activating the switch 644 through a touch or verbal command. The context-detector 640 generates information indicative of the recognizable text context responsive to the captured image.

Continuing with the exemplary operation, the user may utter a verbal expression for connection or association with the recognizable aspect of the book 660, which in this example includes the recognizable text aspect 664. The verbal expression may be any verbal expression. For example, a verbal expression may include "This is really interesting stuff," or "This statement contradicts a statement at page 12." The verbal expression is captured by the microphone 622. The annotating device generates information indicative of the user expression in response to the captured verbal expression.

In an alternative embodiment, the exemplary human wearable system 610 may comprise two separate human wearable elements. For example, the annotation environment capture device 640 may be carried in a first element wearable on a person's head and the annotation device 630 carried in a second element wearable around the person's neck. In a further embodiment, the annotating device may include an annotating device having a configuration selected from a group consisting of a handheld device, a wearable device, and a head mountable device. The annotation environment capture device includes an annotation environment capture device having a configuration other than the selected configuration of the annotating device. In another embodiment, the annotation environment capture device may include an annotation environment capture device having a configuration selected from a group consisting of a handheld device, a wearable device, and a head mountable device. The annotating device includes an annotating device having a configuration other than the selected configuration of the annotation environment capture device.

Figure 14:
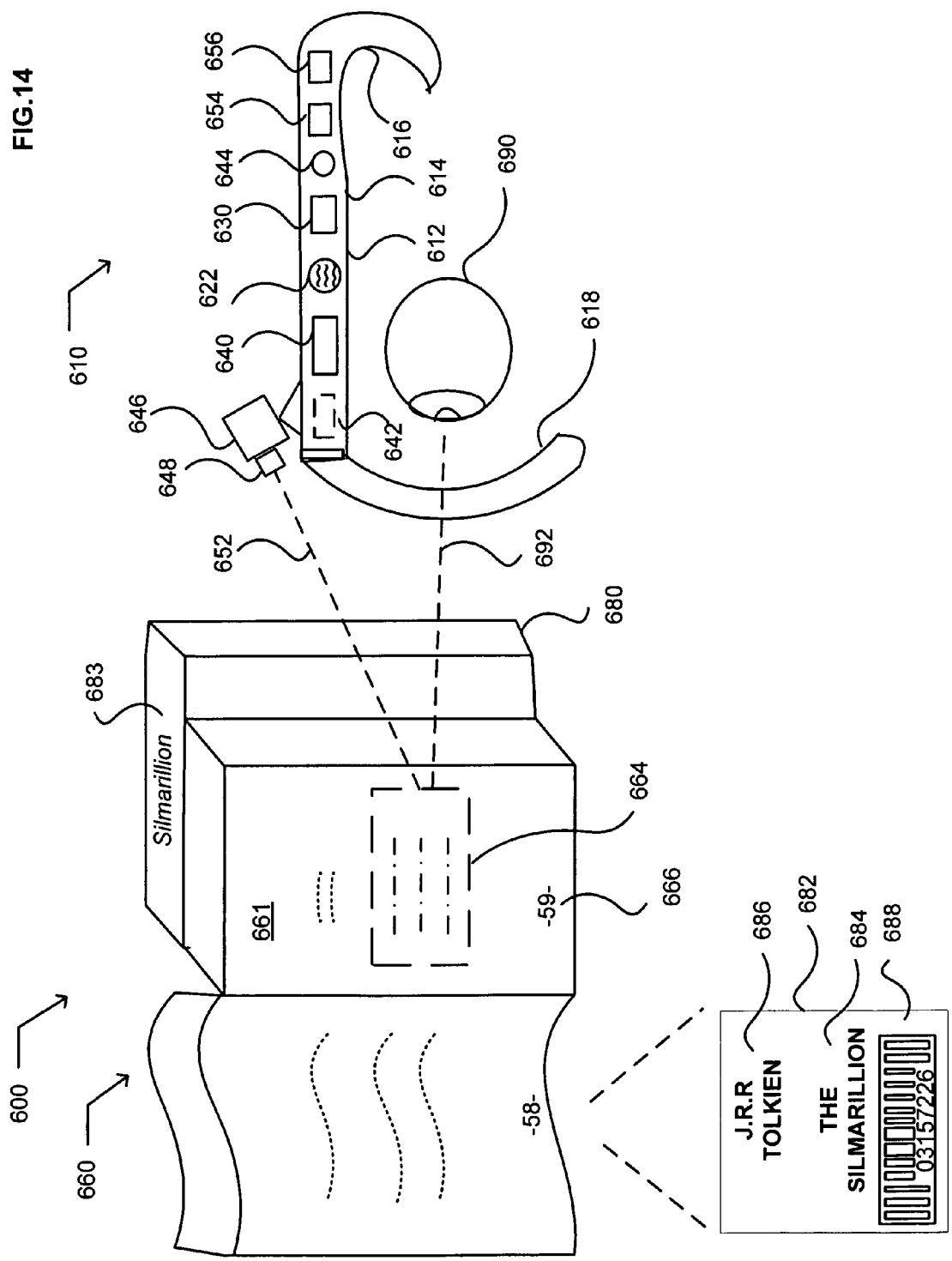
FIG. 14 illustrates a partial view an alternative embodiment of the environment of FIG. 13.

FIG. 14 illustrates a partial view an alternative embodiment of the environment 600 of FIG. 13. The exemplary head mountable system 612 may include at least one additional device. An additional device may include a communications device 654 coupled with an antenna (not shown), and a storage device 656. The communications device includes operability to communicate at least one of the information indicative of a recognizable aspect of an item and the information indicative of a user expression associated with the recognizable aspect of the item. The storage device includes operability to save at least one of the information indicative of a recognizable aspect of an item and the information indicative of a user expression associated with the recognizable aspect of the item.

Figure 15:
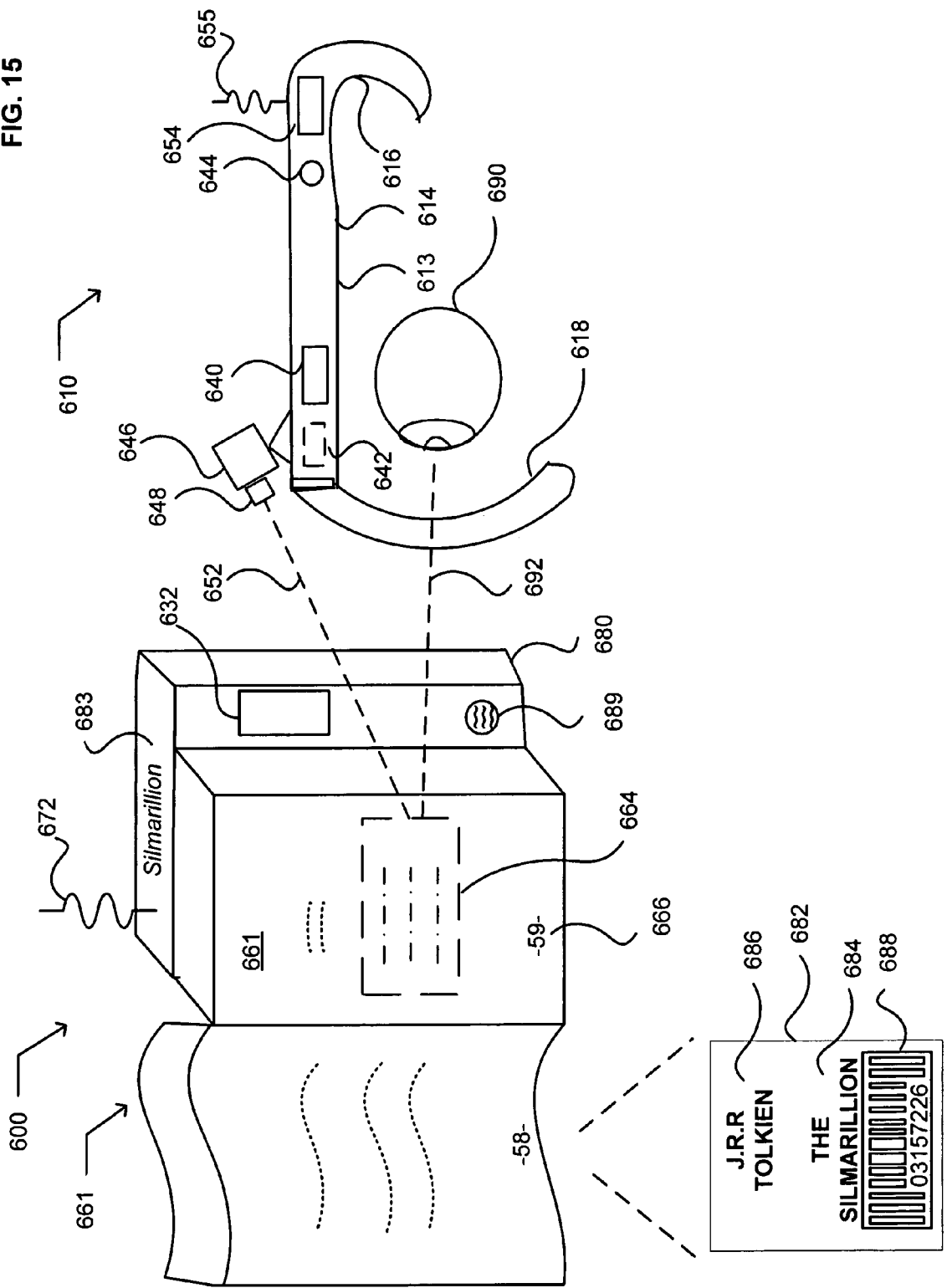
FIG. 15 illustrates a partial view of an alternative embodiment of the environment of FIG. 13 that includes an exemplary head mountable system and an exemplary item illustrated as an exemplary bound book.

FIG. 15 illustrates a partial view of an alternative embodiment of the environment 600 of FIG. 13 that includes an exemplary head mountable system 613 and an exemplary item illustrated as an exemplary bound book 661. The alternative embodiment of the environment 600 includes an exemplary distributed annotation system. The system 613 includes the context-detection module 640, a communications device 654 coupled with an antenna 655. The system 613 is operable to generate information indicative of a recognizable aspect of the item, illustrated as the book 661.

The book 661 includes microphone 689 and associated sound capture circuitry, an annotating device 632, and an antenna 672 coupled with a communications device (not shown). The annotating device 632 includes operability to generate information indicative of a user expression associated with a recognizable aspect of the item, illustrated as the book 661. The annotating device 632 is at least substantially similar to the annotating device 630 of FIG. 13. The microphone 689 and associated sound capture circuitry is at least substantially similar to the microphone 622 and associated sound capture circuitry of FIG. 13. At least one of the communications devices may be configured as a receiver circuit, a transmission circuit, and/or a transceiver circuit.

In operation of an embodiment, a user may don and use the exemplary head mountable system 613 to generate information indicative of a recognizable aspect of an item in a manner at least substantially similar to the system 612 of FIG. 13. Also, as described in conjunction with FIG. 13, the user utters a verbal expression for connection or association with the recognizable aspect of the book 660, which in this example includes the recognizable text aspect 664. In the embodiment illustrated in FIG. 15, the verbal expression is captured by the microphone 689. The annotating device 632 generates information indicative of the user expression in response to the captured verbal expression. In one embodiment, one of the book 661 and the head mountable system 613 may transmit the respective information generated by their device to the other. In another embodiment, the book and the system may transmit the respective information generated by their devices to a third device.

Figure 16:
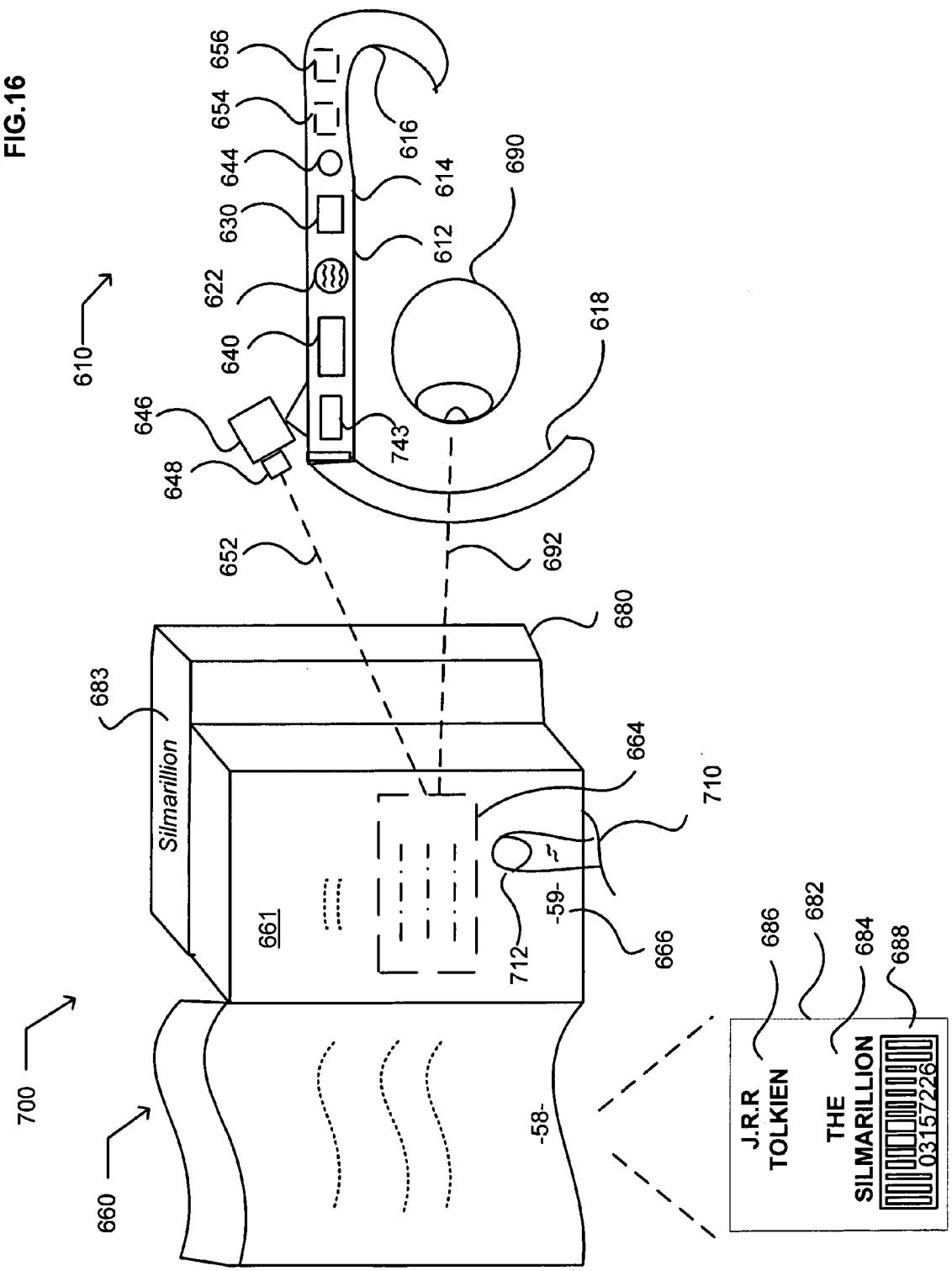
FIG. 16 illustrates an environment that includes a partial view of an exemplary annotation system and a partial view of an exemplary item.

FIG. 16 illustrates an environment 700 that includes a partial view of an exemplary annotation system and a partial view of an exemplary item. The exemplary annotation system is illustrated as an exemplary human wearable system 610, which is further illustrated as an exemplary head mountable system 612. The exemplary item is illustrated as an exemplary bound paper book 660.

The system 612 includes a tracking module 743 carried in the frame 614 and operable to track a user finger 710 and/or a user fingertip 712 proximate to a recognizable aspect of the item, such as the recognizable text content 664 printed on and/or native to the page surface 661. In an embodiment, the tracking module may include operability to track a gesture formed by the user finger and/or the user fingertip.

In an alternative embodiment, the tracking module 743 includes operability to track a stylus. For example, a tracked stylus may include a hand holdable stylus (not shown) proximate to a recognizable aspect of the item.

In operation, a user may place their fingertip 712 and/or their finger 710 on the surface 661 of the page and proximate to the recognizable text content 664. The tracking module 743 tracks the finger and/or fingertip, and upon occurrence of a predetermined condition acquires data indicative of the recognizable text content 664. The predetermined condition may include a gesture with the finger and/or fingertip proximate to the recognizable text content. For example, in an embodiment, the predetermined condition may include tapping the fingertip three times on the page surface 661 proximate to the recognizable text content. In another embodiment, the predetermined condition may include the user activating the switch 644. In a further embodiment, the predetermined condition may include the user speaking a voice command received at the microphone 622. In an embodiment, the predetermined condition may include the fingertip remaining stationary and proximate to the recognizable text content for a predetermined time. The context-detector generates information indicative of a recognizable aspect of the text content in response to the acquired data. Alternatively, the fingertip may be placed proximate to another recognizable aspect of the book 660. For example, another recognizable aspect of the book may include the cover title 684.

The user may create an expression associated with the recognizable aspect of the book 660. In an embodiment, the user may create a verbal expression for association with the recognizable aspect of the item. The verbal expression may be received by the microphone 622. In another embodiment, the user may create the expression by a user gesture associated with the recognizable aspect of the item. The user gesture may be formed at least a part by a user limb associated with the recognizable aspect of the item. The user gesture may be captured by the image capture module 646.

In another embodiment, the annotation environment capture device may remain incorporated in the system 612, and a microphone and an annotating device may be incorporated into a structure of the book 660. For example, the microphone and annotating device may be incorporated as illustrated in conjunction with the book 661 of FIG. 15.

Figure 17:
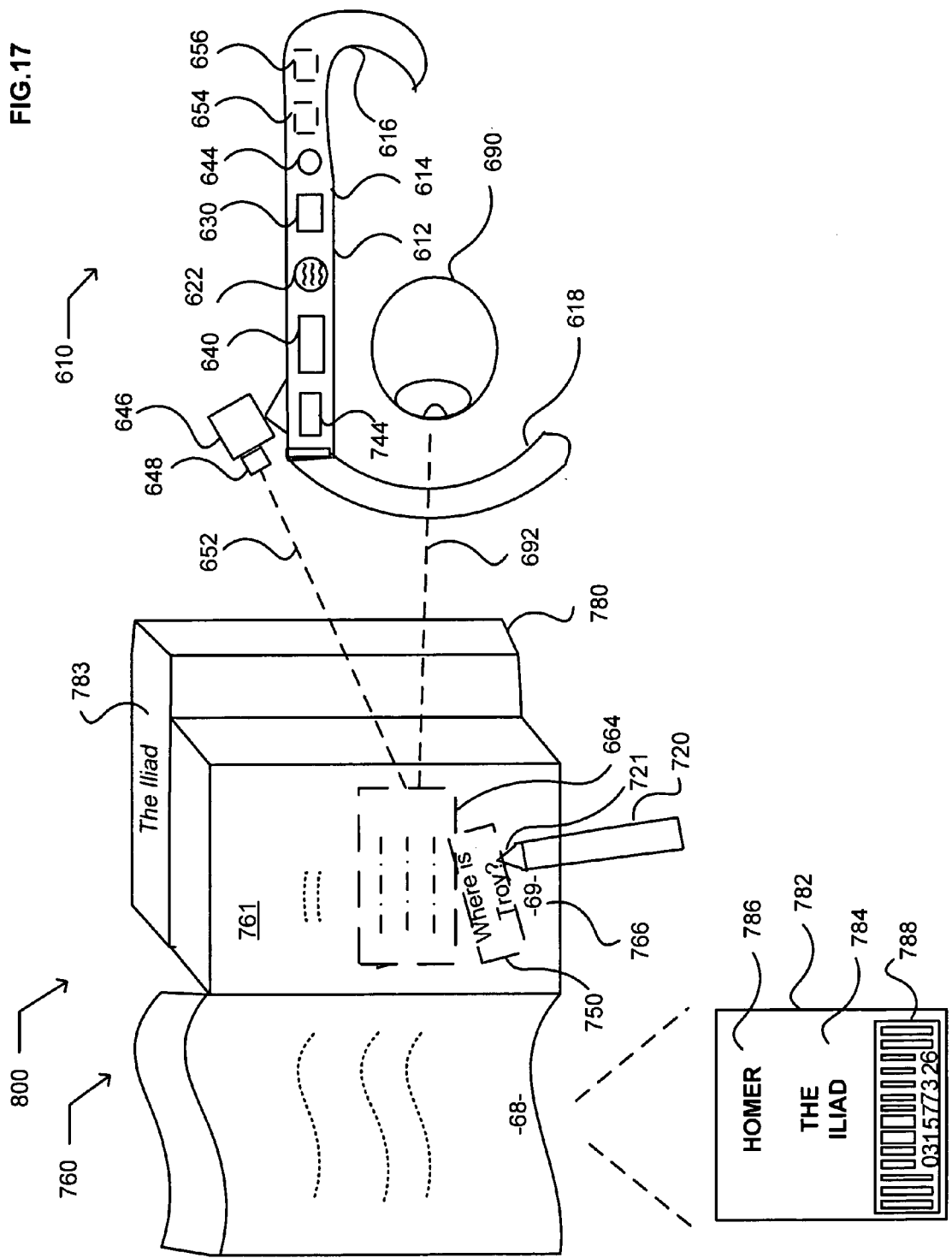
FIG. 17 illustrates an environment that includes a partial view of an exemplary annotation system and a partial view of an exemplary item.

FIG. 17 illustrates an environment 800 that includes a partial view of an exemplary annotation system and a partial view of an exemplary item. The exemplary annotation system is illustrated as an exemplary human wearable system 610, which is further illustrated as the exemplary head mountable system 612. The exemplary item is illustrated as an exemplary bound paper book 760. The exemplary book illustrates several exemplary recognizable aspects, including a cover 782, an author name 786, illustrated as Homer, a cover title 784, illustrated as THE ILIAD, and an electronically readable product code 788, illustrated as a bar code. Further illustrated exemplary recognizable aspects include a page having a page number 766, illustrated as page number "69," a page surface 761, and a binding 780 having a binding title 783, illustrated as THE ILIAD. The exemplary book also illustrates an exemplary recognizable aspect that includes a recognizable text content 664 printed on and native to the page surface 761 of the page number 69.

FIG. 17 also includes a handwriting instrument, illustrated as a pen 720 having a writing tip 721. The pen is illustrated as having formed the handwritten characters "Where is Troy?" 750 in response to a user action.

The exemplary head mountable system 612 includes the frame 614 as described in conjunction with FIG. 13. The frame includes a handwriting-tracking module 744 operable to acquire data indicative of the handwritten annotation 750. In an embodiment, the handwriting-tracking module 744 includes operability to acquire data indicative of the handwritten annotation in response to detected movements by the pen-writing tip 721. In another embodiment, the handwriting-tracking module includes operability acquire data indicative of the handwritten annotation in response to images of the pen-writing tip and/or the handwritten characters. The images may be captured by the capture module 646.

In operation of an embodiment, a user may don and use the exemplary head mountable system 612, and allow the system to generate information indicative of a recognizable aspect of an item in a manner at least substantially similar to the system 612 of FIG. 13. In addition, the user may grasp the pen 720 in their hand and hand generate a user expression, such as the annotation 750, using the pen tip 721 and proximate to a recognizable aspect, such as the recognizable text content 664. Data indicative of the hand-generated annotation is acquired by the handwriting-tracking module 744, and the annotating device 640 generates information indicative of the user expression associated with the recognizable text content 664.

In an alternative embodiment not illustrated, the handwriting instrument may include an annotating device operable to generate information indicative of a user expression associated with the recognizable aspect of the item. The annotating device may be at least substantially similar to the annotating device 530 described in conjunction with FIG. 12.

Figure 18:
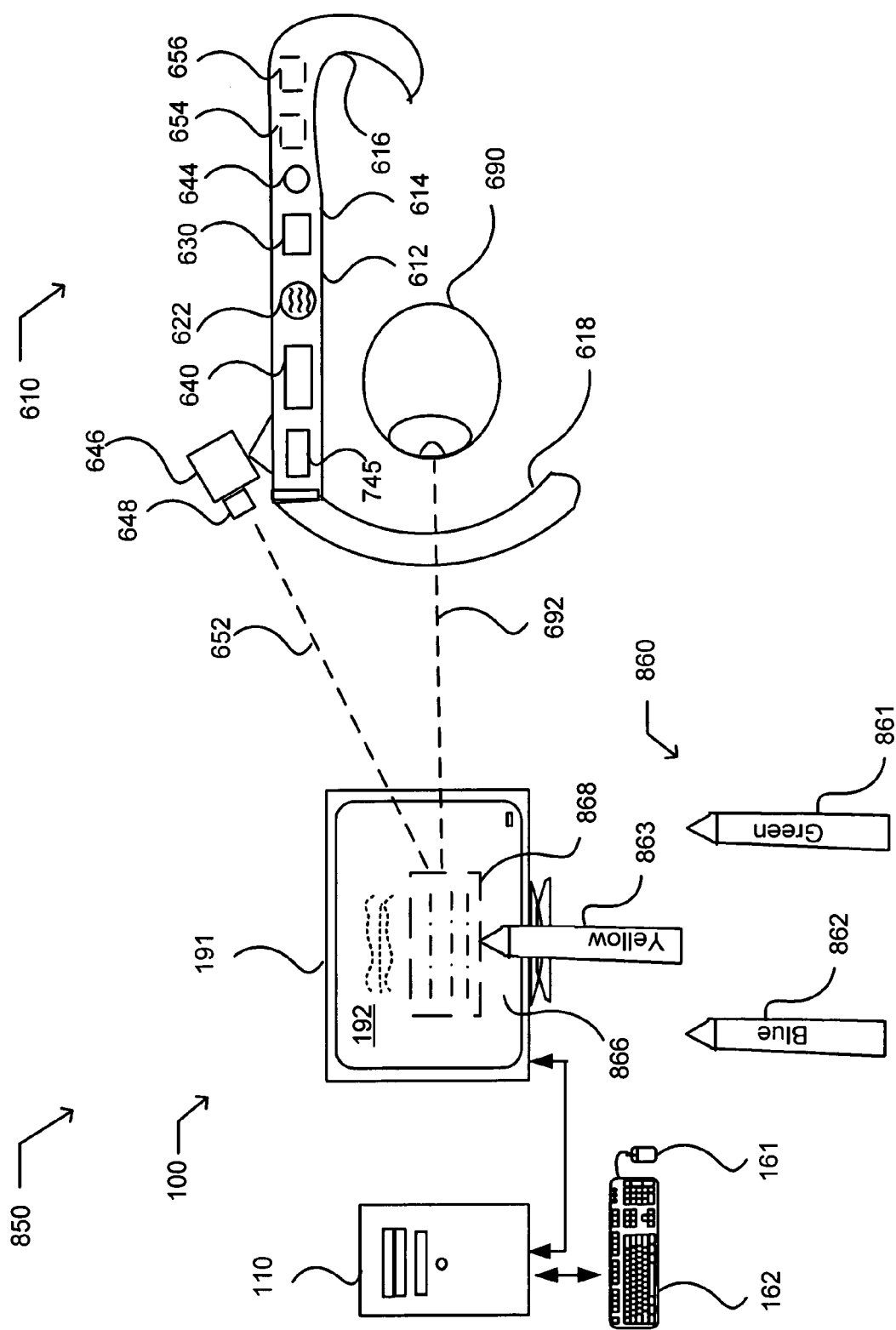
FIG. 18 illustrates an environment that includes a partial view of an exemplary annotation system and a partial view of an exemplary item.

FIG. 18 illustrates an environment 850 that includes a partial view of an exemplary annotation system and a partial view of an exemplary item. The exemplary annotation system is illustrated as an exemplary human wearable system 610, which is further illustrated as an exemplary head mountable system 612 of FIG. 13 and others. The exemplary item is illustrated as an exemplary document with a page 866 thereof displayed through a surface 192 of the monitor 191 of the computing system environment 100 of FIG. 2. The displayed page includes a recognizable text content 868. The head mountable system 612 includes a stylus-tracking module 745 operable to acquire data indicative of a preformed annotation.

The environment 850 also includes a stylus corresponding to a preformed user expression. In an embodiment illustrated in FIG. 18, the stylus is illustrated as a stylus set 860 of three individual styluses that include a green stylus 861, a blue stylus 862, and a yellow stylus 863. In an embodiment, the set of styluses are illustrative of "hi-liter" type highlighting markers used by students and others to annotate course materials. A stylus may have any preformed expression. For example, in an embodiment, the yellow stylus may correspond to a preformed user expression of "highly interesting material." the red stylus may correspond to a preformed user expression of "dumb material." In an embodiment, a stylus may transmit a signal indicative of a preselected or preformed annotation. In another embodiment, a stylus may include an optically recognizable feature indicative of a preselected or preformed annotation. An optically recognizable feature may include a color, a bar code, and/or a shape.

In operation of an embodiment, a user may don and use the exemplary head mountable system 612, and allow the system to generate information indicative of a recognizable aspect of an item in a manner at least substantially similar to the system 612 of FIG. 13. In addition, the user may grasp a stylus in their hand, such as the yellow stylus 863, and use the stylus to associate a preformed user expression with the recognizable text content 868 of the document. The user expression may be associated in any manner that may be captured by the stylus-tracking module 745. For example, in an embodiment, the stylus-tracking module may be operable to capture a tapping of a tip of the yellow stylus 863 proximate to the recognizable text content as a preformed user expression of "highly interesting material." In another embodiment, the stylus-tracking module may be operable to capture a closed figure drawn around the recognizable text content with the tip of a stylus as a preformed user expression, the nature of which is established by the particular stylus selected from the stylus set 860. The annotating device 630 generates information indicative of the user expression associated with the recognizable text context in response to the captured preformed user expression.

Figure 19:
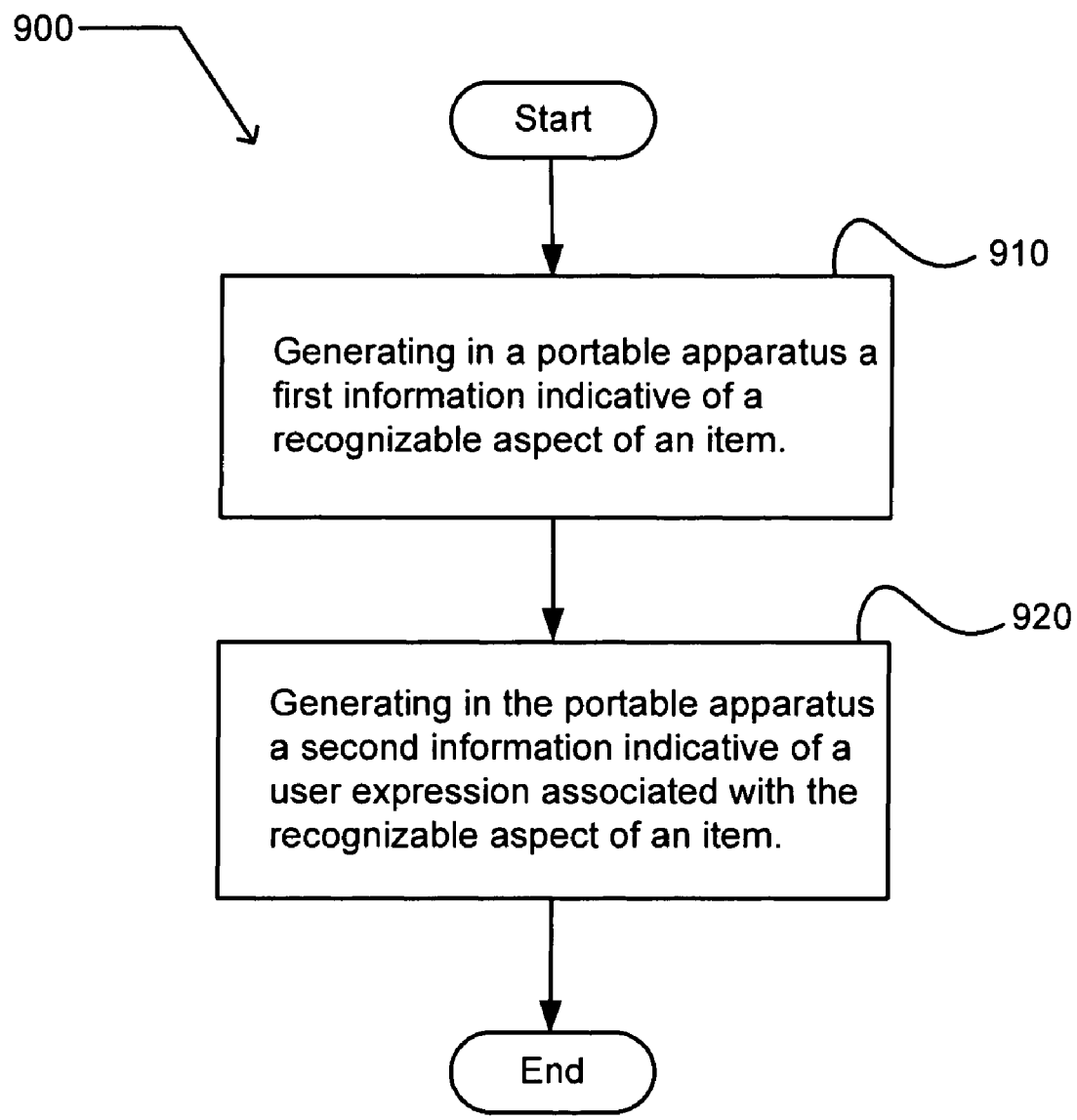
FIG. 19 illustrates an exemplary operational flow.

FIG. 19 illustrates an exemplary operational flow 900. After a start operation, the operational flow moves to a context operation 910. At the context operation, a first information indicative of a recognizable aspect of an item is generated in a portable apparatus. At a context operation 920, a second information indicative of a user expression associated with the recognizable aspect of an item is generated in the portable apparatus. The operational flow then moves to an end operation.

Figure 20:
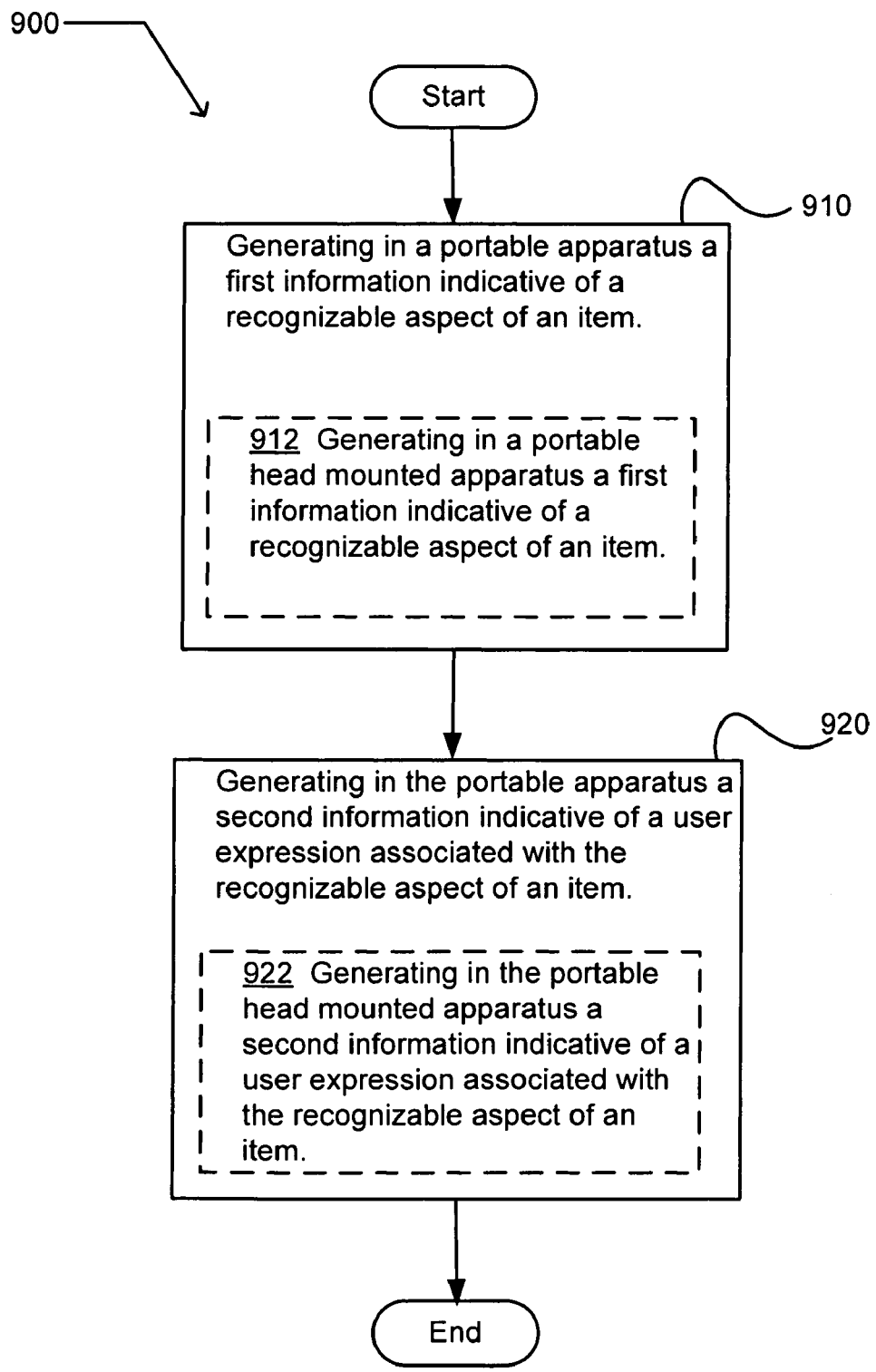
FIG. 20 illustrates an alternative embodiment of the exemplary operational flow of FIG. 19.

FIG. 20 illustrates an alternative embodiment of the exemplary operational flow 900 of FIG. 19. The context operation 910 may include at least one additional operation, such as an operation 912. At the operation 912, a first information indicative of a recognizable aspect of an item is generated in a portable head mountable apparatus. The content operation 920 may include at least one additional operation, such as an operation 922. At the operation 922, a second information indicative of a user expression associated with the recognizable aspect of an item is generated in the portable head mountable apparatus.

Figure 21:
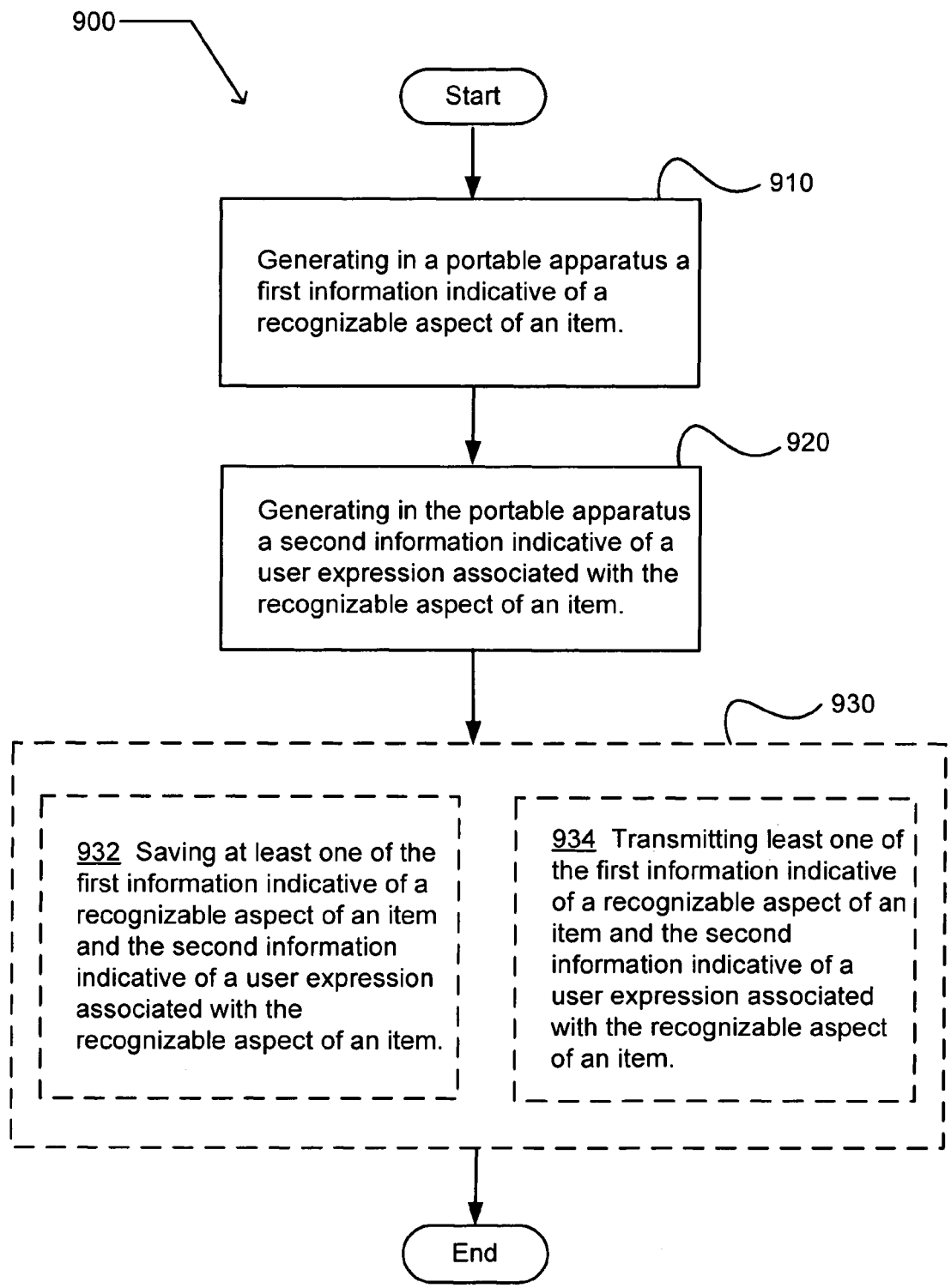
FIG. 21 illustrates another alternative embodiment of the exemplary operational flow of FIG. 19.

FIG. 21 illustrates another alternative embodiment of the exemplary operational flow 900 of FIG. 19. The operational flow 900 may include at least one additional operation 930. The additional operation 930 may include a storage operation 932 and/or a communication operation 934. The storage operation 932 may include saving at least one of the first information indicative of a recognizable aspect of an item and the second information indicative of a user expression associated with the recognizable aspect of an item. The communication operation 934 may include transmitting least one of the first information indicative of a recognizable aspect of an item and the second information indicative of a user expression associated with the recognizable aspect of an item.

Figure 22:
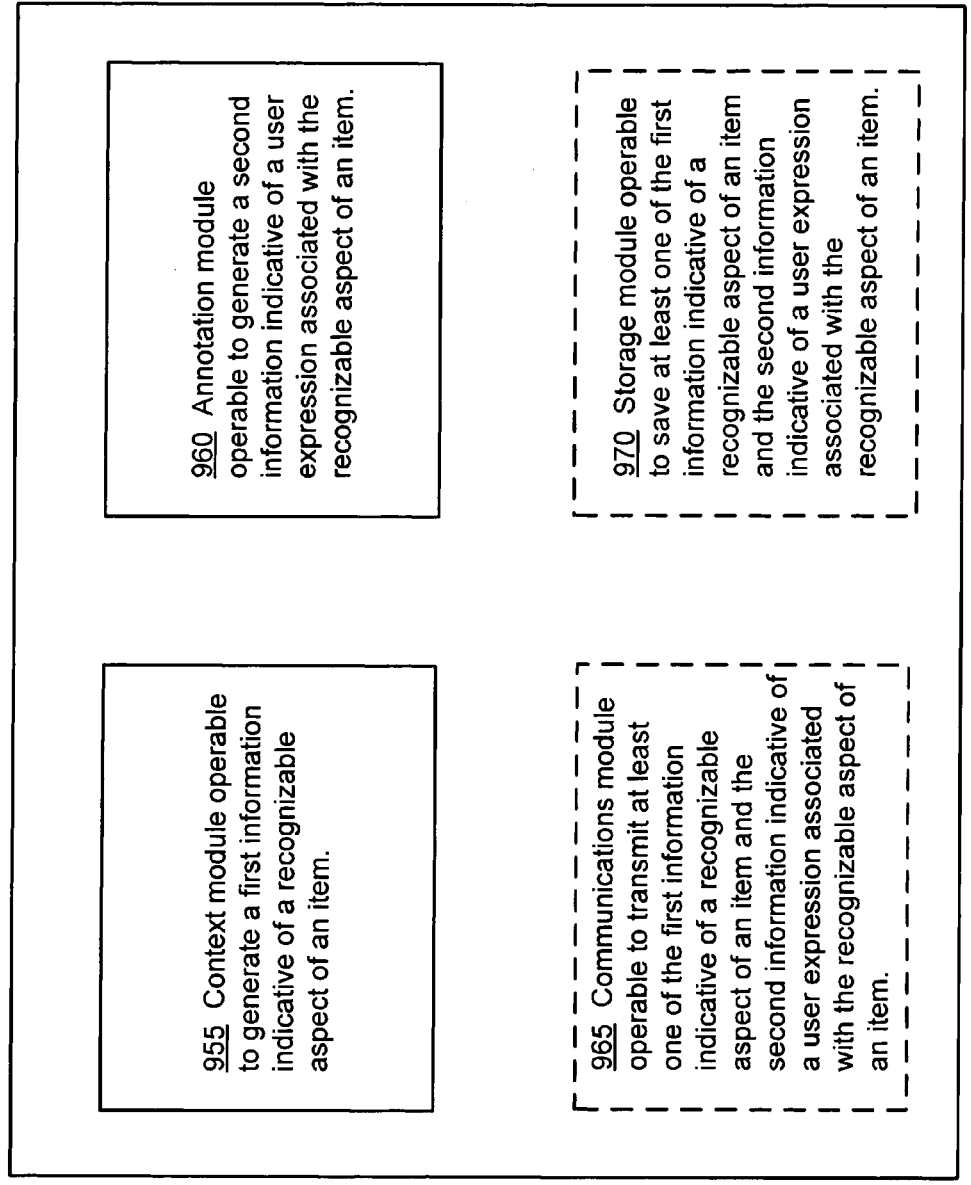
FIG. 22 illustrates a partial view of an exemplary wearable apparatus.

FIG. 22 illustrates a partial view of an exemplary wearable apparatus 950. The apparatus includes a context module 955 operable to generate a first information indicative of a recognizable aspect of an item. The apparatus also includes an annotation module 960 operable to generate a second information indicative of a user expression associated with the recognizable aspect of an item. In an embodiment, the apparatus may include at least one additional module. The additional module may include a communications module 965 operable to transmit at least one of the first information indicative of a recognizable aspect of an item and the second information indicative of a user expression associated with the recognizable aspect of an item. The additional module may include a storage module 970 operable to save at least one of the first information indicative of a recognizable aspect of an item and the second information indicative of a user expression associated with the recognizable aspect of an item.

Figure 23:
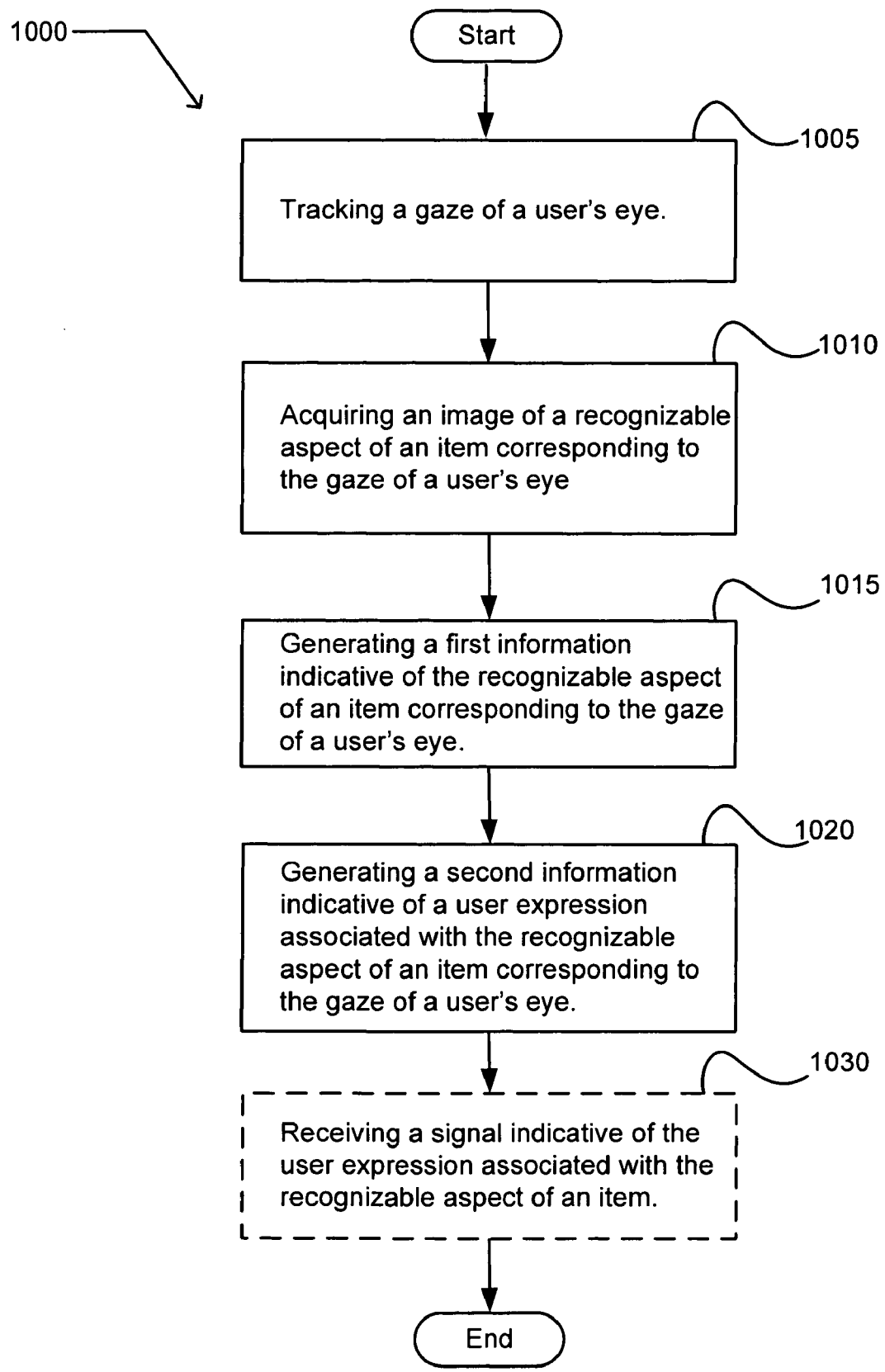
FIG. 23 illustrates an exemplary operational flow.

FIG. 23 illustrates an exemplary operational flow 1000. After a start operation, the operational flow moves to a monitoring operation 1005. At the monitoring operation, a gaze of a user's eye is tracked. At a capture operation 1010, an image is acquired of a recognizable aspect of an item corresponding to the gaze of a user's eye. At a context processing operation 1015, a first information is generated indicative of the recognizable aspect of an item corresponding to the gaze of a user's eye. At an annotation processing operation 1020, a second information is generated indicative of a user expression associated with the recognizable aspect of an item corresponding to the gaze of a user's eye. The operational flow then proceeds to an end operation.

In an embodiment, the operational flow 1000 may include at least one additional operation, such as an operation 1030. At the operation 1030, a signal is received indicative of the user expression associated with the recognizable aspect of an item.

Figure 24:
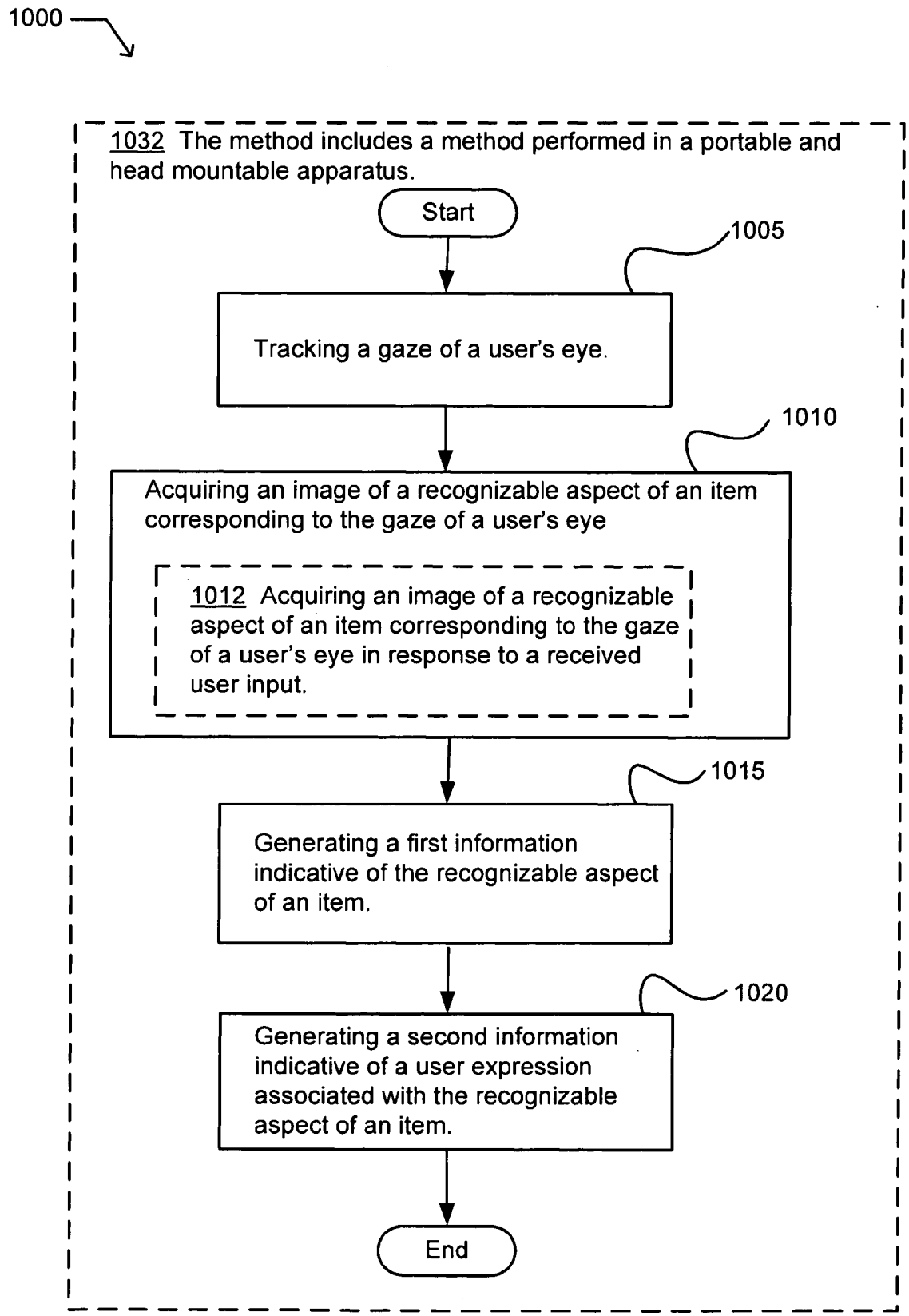
FIG. 24 illustrates an alternative embodiment of the operational flow of FIG. 23.

FIG. 24 illustrates an alternative embodiment of the operational flow 1000 of FIG. 23. In an embodiment, the operational flow 1000 may include an operational flow 1032 performed in a head mountable apparatus. In a further embodiment, the capture operation 1010 may include at least one additional operation, such as an operation 1012. At the operation 1012, an image is acquired of a recognizable aspect of an item corresponding to the gaze of a user's eye in response to a received user input. The received user command may include any suitable command, for example a sound, such as a finger snap, a voice command, such as "acquire this," and/or activation of a button.

Figure 25:
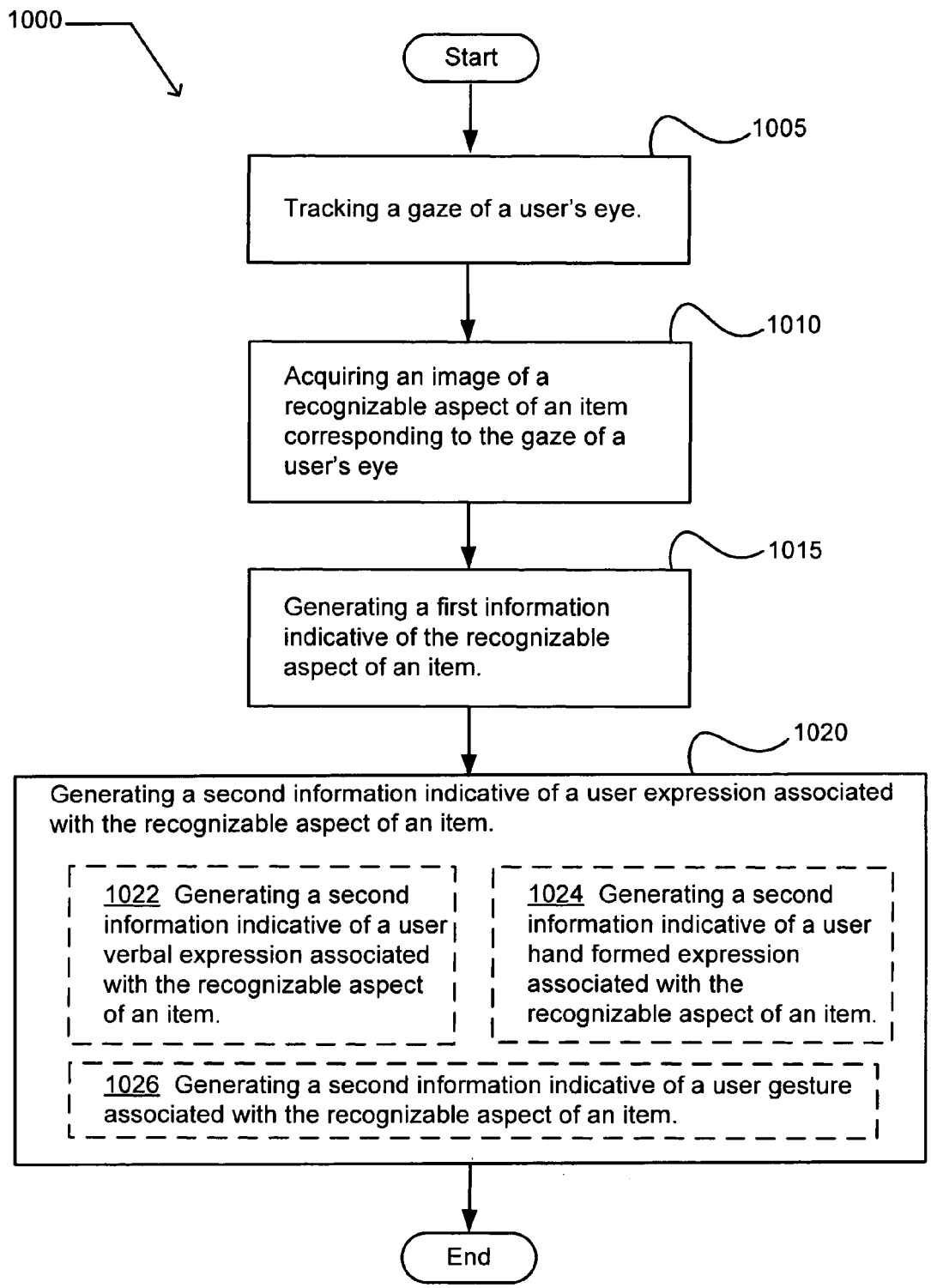
FIG. 25 illustrates another alternative embodiment of the operational flow of FIG. 23.

FIG. 25 illustrates another alternative embodiment of the operational flow 1000 of FIG. 23. The annotation processing operation 1020 may include at least one additional operation. An additional operation may include an operation 1022, an operation 1024, and an operation 1026. At the operation 1022, a second information is generated indicative of a user verbal expression associated with the recognizable aspect of an item. At the operation 1024, a second information is generated indicative of a user hand formed expression associated with the recognizable aspect of an item. At the operation 1026 a second information is generated indicative of a user gesture associated with the recognizable aspect of an item.

Figure 26:
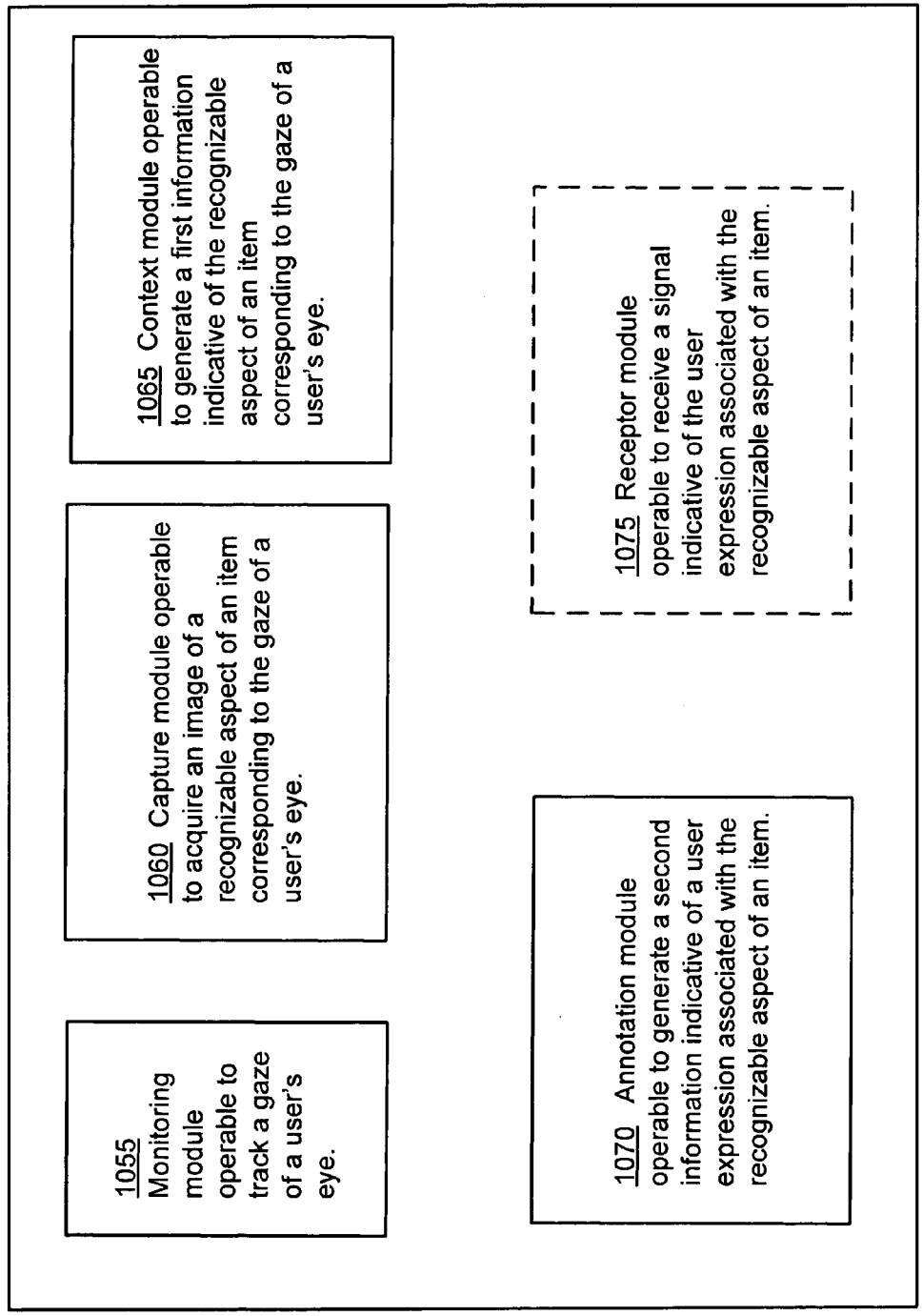
FIG. 26 illustrates a partial view of an exemplary wearable apparatus.

FIG. 26 illustrates a partial view of an exemplary wearable apparatus 1050. The apparatus includes a monitoring module 1055 operable to track a gaze of a user's eye, and a capture module 1060 operable to acquire an image of a recognizable aspect of an item corresponding to the gaze of a user's eye. The apparatus also includes a context module 1065 operable to generate a first information indicative of the recognizable aspect of an item corresponding to the gaze of a user's eye. The apparatus includes an annotation module 1070 operable to generate a second information indicative of a user expression associated with the recognizable aspect of an item. In an alternative embodiment, the apparatus may include a receiver module 1075 operable to receive a signal indicative of the user expression associated with the recognizable aspect of an item. The signal indicative of the user expression may include a video signal indicative of a handwritten user expression, a signal indicative of a spoken user expression, and/or a signal indicative of a user gesture (none shown).

FIG. 27 illustrates an environment 1900 in which embodiments may be implemented. The environment includes an article of manufacture including a surface, illustrated as a document 1910 including a surface 1912. The environment also includes a tag characterization table including at least two machine-distinguishable tags, illustrated as a characterization table 1920 including at least two machine-distinguishable tags 1928 displayed in a column. The tag characterization table further has a unique descriptor respectively correlating to each machine-distinguishable tag of the at least two machine-distinguishable tags, illustrated as a column 1930 of unique descriptors. In an embodiment, a machine-distinguishable tag 1924 is illustrated as a "●" and is correlated to a unique descriptor "urgent tasks" 1932. In an embodiment, the tag characterization table may be displayed on a separate article of manufacture. In another embodiment, the tag characterization table may be printed on the document 1910, displayed on an electronic display surface (not shown), and/or known to a user.

The environment also includes an exemplary handheld marking device, in an embodiment illustrated as pen having some or all of the elements of any one or all of the exemplary handheld marking device 210 of FIG. 3, the exemplary electronic pen 211 of FIG. 4, the exemplary apparatus 212 of FIG. 5, the exemplary apparatus 213 of FIG. 6, and/or the exemplary handheld system 510 of FIG. 21. In another embodiment, the exemplary handheld marking device may include the pen 720 having a writing tip 721 and the head-mountable system 612 of FIG. 17. The exemplary handheld marking device includes a writing detector module operable to generate a signal indicative of a hand-formed mark by a writing element on a surface, and a tag detector module operable to generate a signal indicative of a machine-distinguishable tag associated with the hand-formed mark. In an embodiment, the writing detector module is illustrated as the writing detector module 230 of the exemplary handheld writing device 210. The tag detector module is further illustrated as the context detector module 240.

In an alternative embodiment (not shown), the environment 1900 may include a device that generates movement tracking data corresponding to movements of the handheld marking device and/or the article of manufacture. For example, Polhemus of Colchester, Vt., manufactures and markets several electromagnetic tracking apparatus that tracks objects in a space. Movement tracking data may be used in generating a content signal indicative of a hand-formed mark on a surface, and/or generating a label signal indicative of a machine-distinguishable tag associated with the hand-formed mark.

In an embodiment, the surface 1912 of document 1910 is initially blank. In use, and as illustrated in FIG. 27, a user moves the writing element 220 of the handheld writing device 210 to form at least one instance of a hand-formed mark 1944 on the surface 1912. FIG. 27 illustrates instances of hand-formed marks each respectively formed on a single line. The user also hand-forms a machine-distinguishable tag on the surface 1912 and respectively associates the machine-distinguishable tag with at least one hand-formed mark. The machine-distinguishable tag is selected from the at least two machine-distinguishable tags 1928. For example, FIG. 27 illustrates a hand-formed machine-distinguishable tag "●" 1914 proximally associated with a hand-formed mark, illustrated as a textual entry "Buy welcome home card" 1916. The exemplary handheld marking device captures the hand-formed mark and generates a content signal indicative of the hand-formed mark using the writing detector module 230. The exemplary handheld marking device also captures the hand-formed machine-distinguishable tag using the writing detector module 230, and/or the context detector module 240, and generates a label signal indicative of the hand-formed machine-distinguishable tag.

Figure 28:
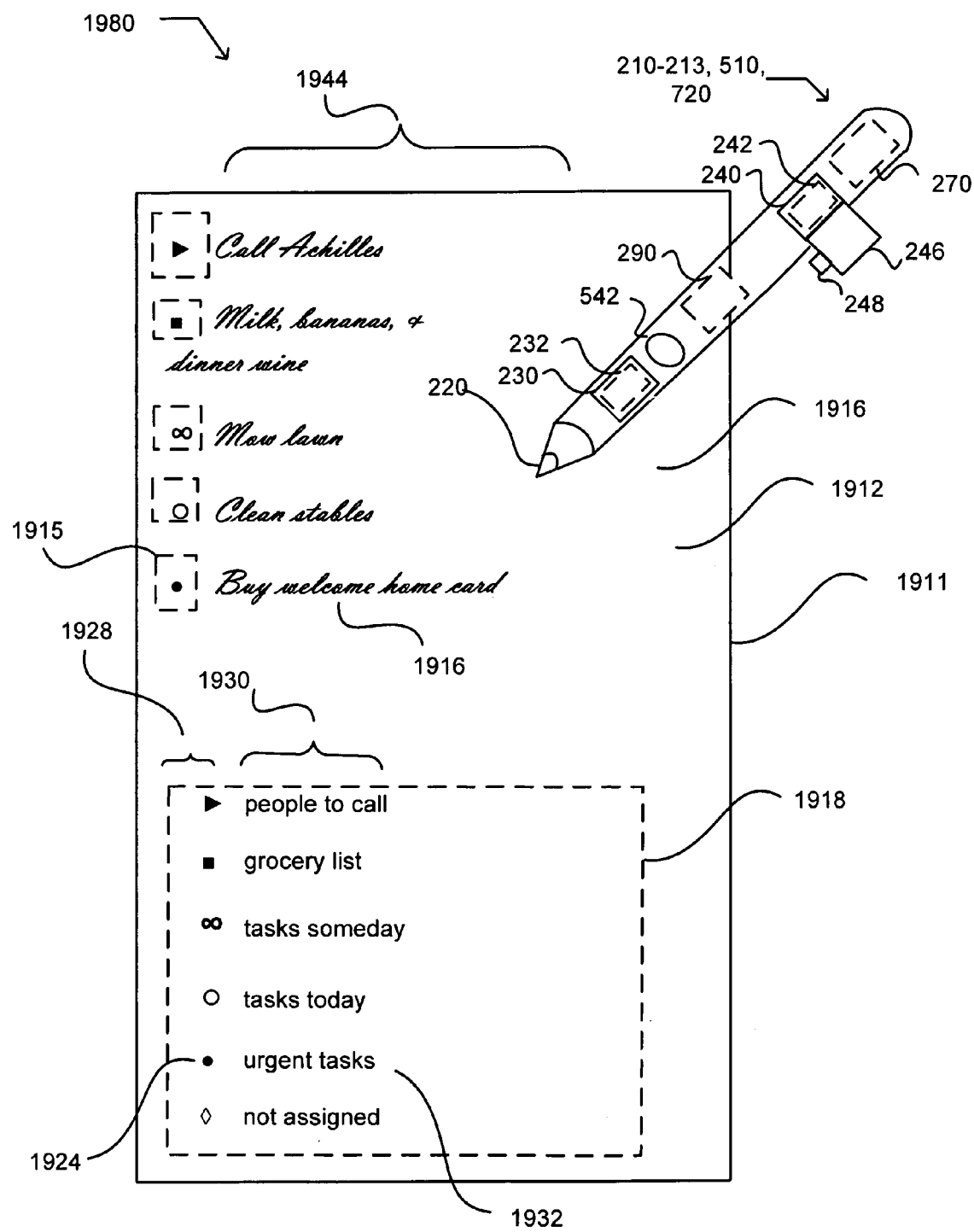
FIG. 28 illustrates another environment in which embodiments may be implemented.

FIG. 28 illustrates another environment 1980 in which embodiments may be implemented. The environment includes an article of manufacture, illustrated as a document 1911 including a surface 1912. The surface includes a writing surface portion 1916 and a tag portion 1918. The writing surface portion accepts at least one mark by a handheld marking device. The tag portion displays the at least two machine-distinguishable tags 1928, each machine-distinguishable tag of the at least two machine distinguishable tags is unique and user associatable with at least one mark. A tag may be associated by using a handheld marking device, such as the device 210-213, 510, and/or 720.

In an embodiment, the writing surface portion 1916 is initially blank. In use, and as illustrated in FIG. 28, a user moves the handheld marking device to form at least one hand-formed mark 1944 on the surface 1912 of the handwriting portion. The user also associates a machine-distinguishable tag with the at least one hand-formed mark. In an embodiment illustrated in FIG. 28, a user associates a machine-distinguishable tag with at least one hand-formed mark by capturing the machine-distinguishable tag from the at least two machine-distinguishable tags of the tag portion 1918. In an embodiment, the machine-distinguishable tag may be captured from the tag portion as an image using the image capture device 246 of the context detector module 240. A user may associate the machine-distinguishable tag "●" 1924 of the tags 1928 with the hand-formed mark "Buy welcome home card" 1916 by capturing an image (represented as the captured image 1915) of the machine-distinguishable tag "●" with the context detector module 240. The association may include a temporal association between forming the hand-formed mark 1916 and capturing the machine-distinguishable tag "●". In a further embodiment, the association may include a gesture indicating an association between the hand-formed mark 1916 and capturing the machine-distinguishable tag "●". For example, a gesture may include tapping a portion of the handheld marking device on the surface 1912, and/or tapping a fingertip on any surface. In another embodiment, a scanner (not shown) embodied in the handheld marking device may be used to discern the machine-distinguishable tag "●" for association with the hand-formed mark 1916.

Figure 29:
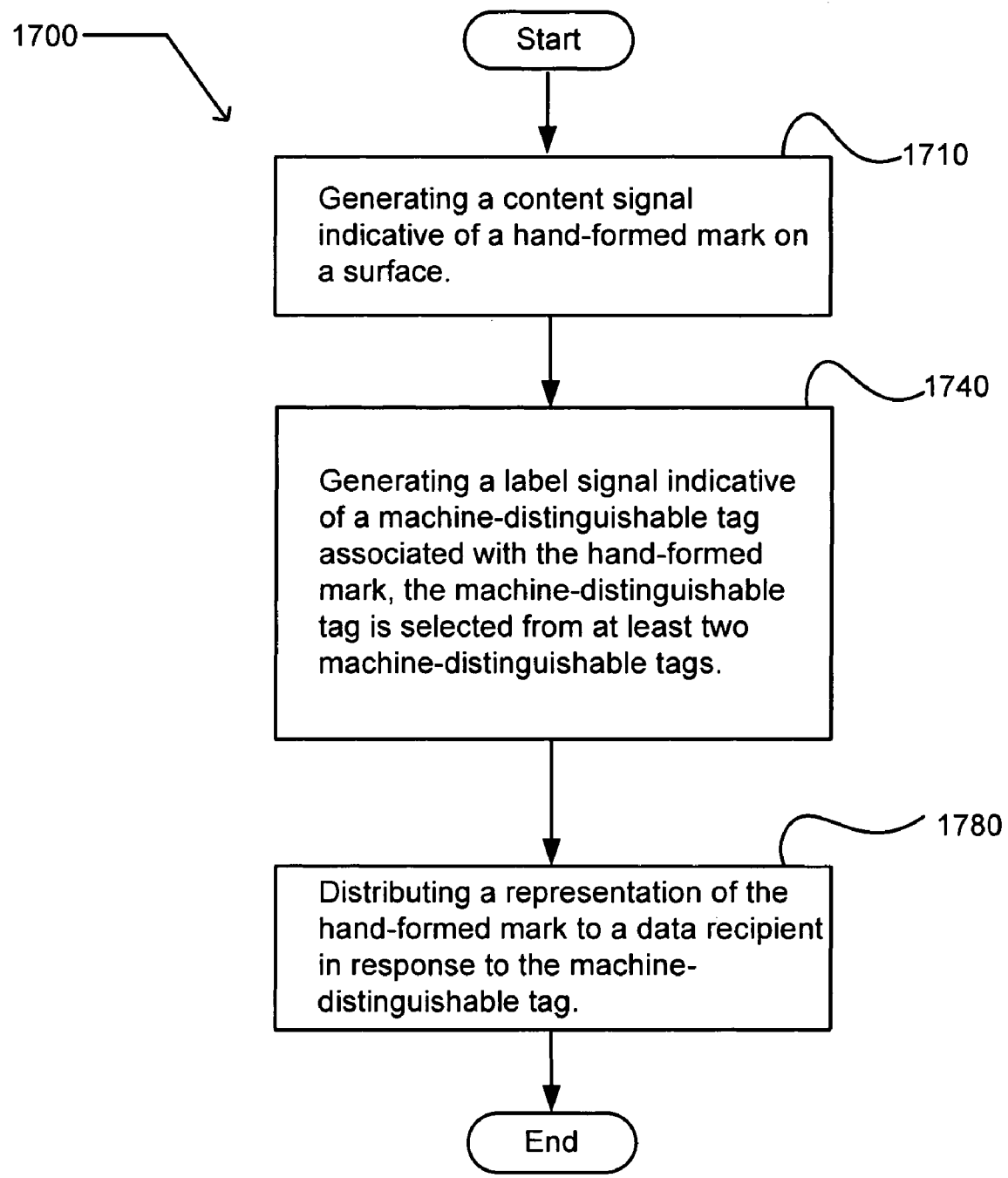
FIG. 29 illustrates an exemplary operational flow.

FIG. 29 illustrates an exemplary operational flow 1700. After a start operation, the flow moves to a mark description operation 1710. At the mark description operation 1710, a content signal indicative of a hand-formed mark on a surface is generated. At a description operation 1740, a label signal is generated indicative of a machine-distinguishable tag associated with the hand-formed mark. The machine-distinguishable tag is selected from at least two machine-distinguishable tags. At a dissemination operation 1780, a representation of the hand-formed mark is distributed to a data recipient in response to the machine-distinguishable tag. In an embodiment, a data recipient may include at least one of an application, a program, a file, an item list file, an automation, and/or a storage. The operational flow then moves to an end operation.

Operation of an embodiment of the exemplary operational flow 1700 may be illustrated with reference to FIG. 27. A user moves the writing element 220 to hand form the mark "Buy welcome home card" 1916 on the surface 1912. The operation 1710 generates a content signal indicative of the hand-formed mark 1916. The user moves the writing element 220 to hand form the machine-distinguishable tag 1914 and associate the tag with the hand-formed mark. The operation 1740 generates a label signal indicative of the machine-distinguishable tag 1914 associated with the hand-formed mark 1916. The operation 1780 distributes a representation of the hand-formed mark to a data recipient in response to the machine-distinguishable tag. The data recipient may be associated with the handheld writing apparatus, or may be associated with another computing device, for example, such as the thin computing device 20 of FIG. 1, and/or the general-purpose computing device 110 of FIG. 2.

Figure 30:
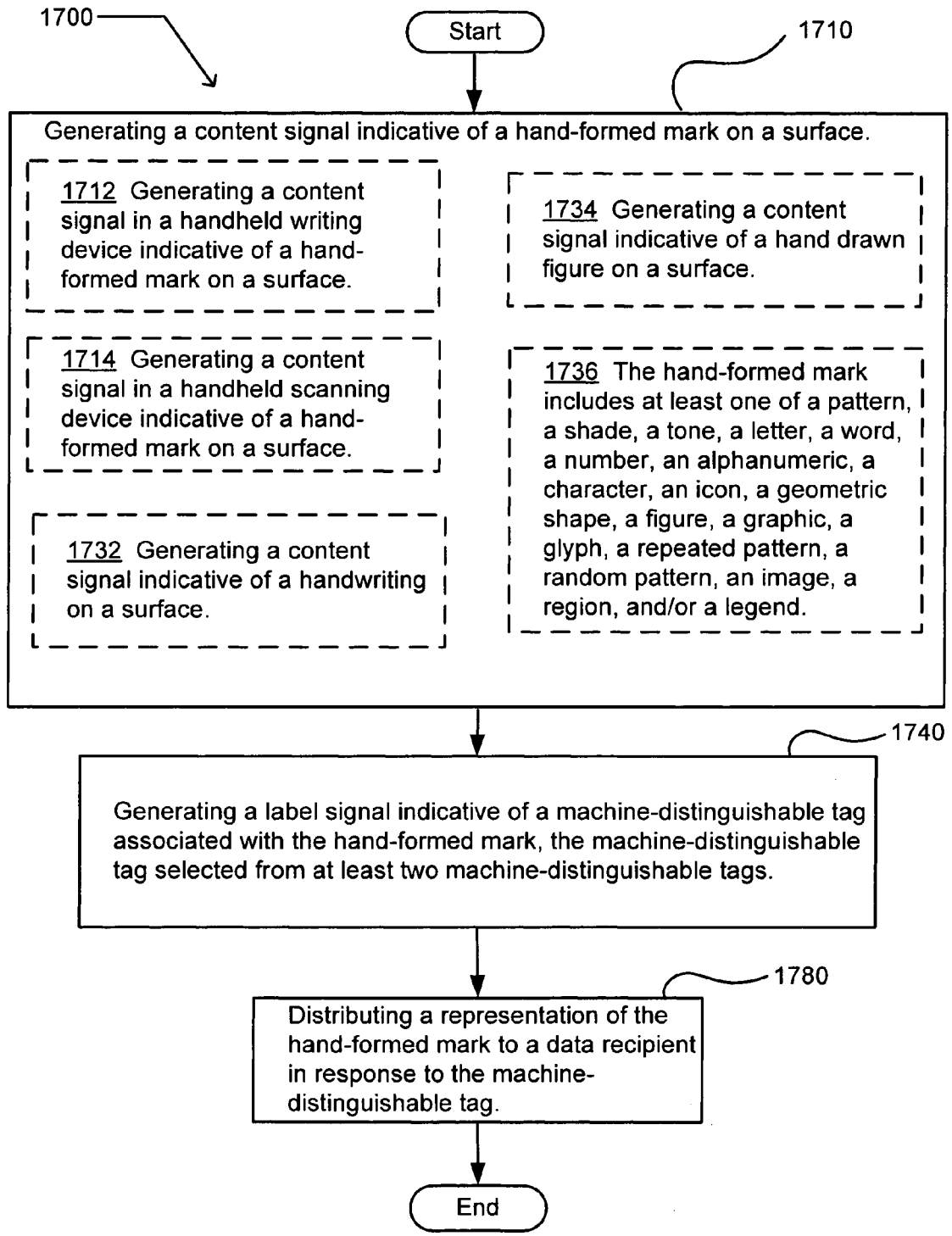
FIG. 30 illustrates an alternative embodiment of the exemplary operational flow of FIG. 29.

FIG. 30 illustrates an alternative embodiment of the exemplary operational flow 1700 of FIG. 29. The mark description operation 1710 may include at least one additional operation. An additional operation may include operation 1712, an operation 1714, and operation 1732, an operation 1734, and/or an operation 1736. The operation 1712 generates a content signal in a handheld writing device indicative of a hand-formed mark on a surface. The handheld writing device may include the exemplary handheld marking device of FIG. 27. The operation 1714 generates a content signal in a handheld scanning device indicative of a hand-formed mark on a surface. The operation 1732 generates a content signal indicative of a handwriting on a surface. The operation 1734 generates a content signal indicative of a hand drawn figure on a surface. At the operation 1736, the hand-formed mark includes at least one of a pattern, a shade, a tone, a letter, a word, a number, an alphanumeric, a character, an icon, a geometric shape, a figure, a graphic, a glyph, a repeated pattern, a random pattern, an image, a region, and/or a legend.

Figure 31:
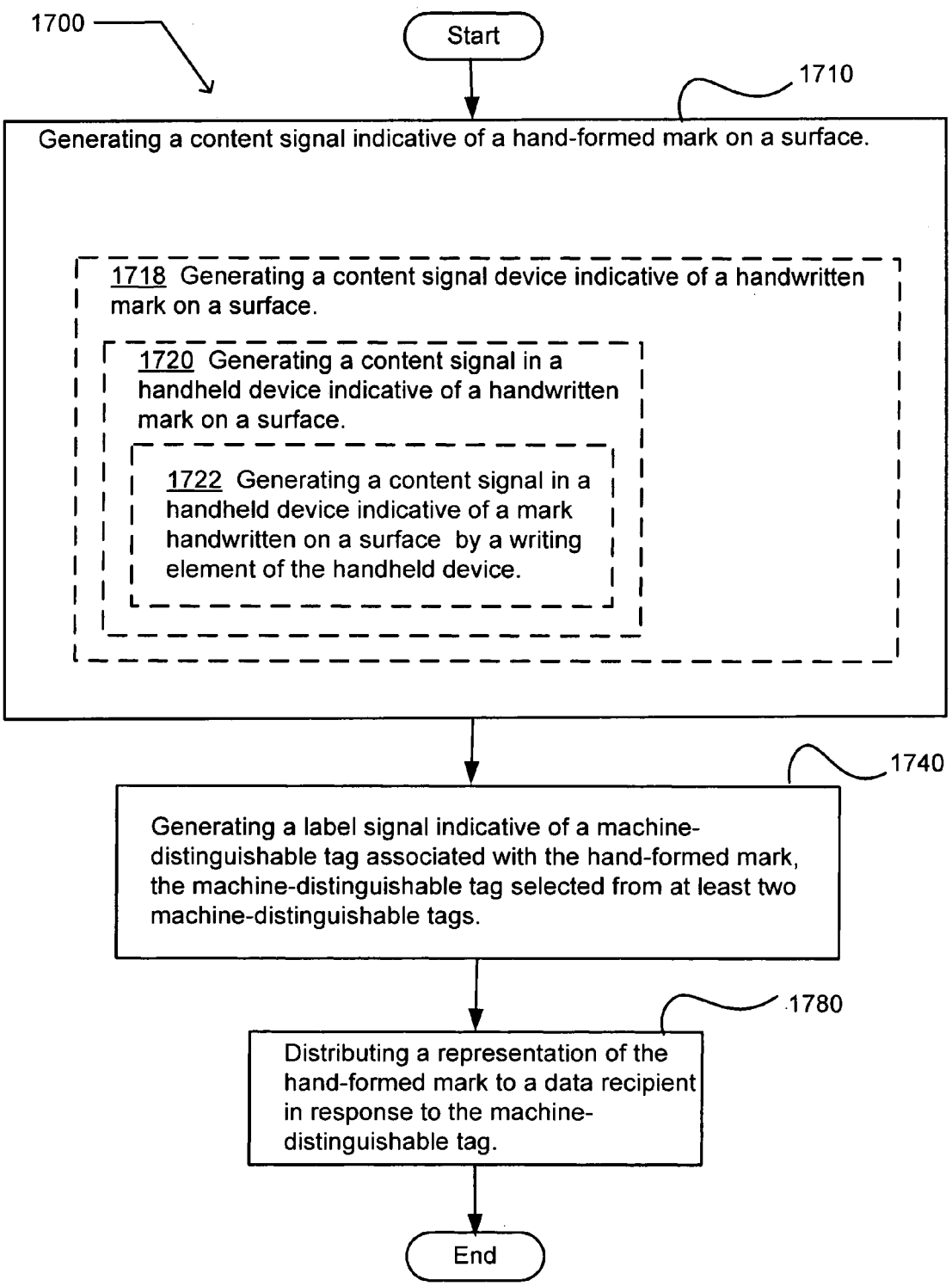
FIG. 31 illustrates another alternative embodiment of the exemplary operational flow of FIG. 29.

FIG. 31 illustrates another alternative embodiment of the exemplary operational flow 1700 of FIG. 29. The mark operation 1710 may include at least one additional operation, such as an operation 1718. The operation 1718 generates a content signal indicative of a handwritten mark on a surface. The operation 1718 may include at least one additional operation, such as an operation 1720. The operation 1720 generates a content signal in a handheld device indicative of a handwritten mark on a surface. The operation 1720 may include at least one additional operation, such as an operation 1722. The operation 1722 generates a content signal in a handheld device indicative of a mark handwritten on a surface by a writing element of the handheld device.

Figure 32:
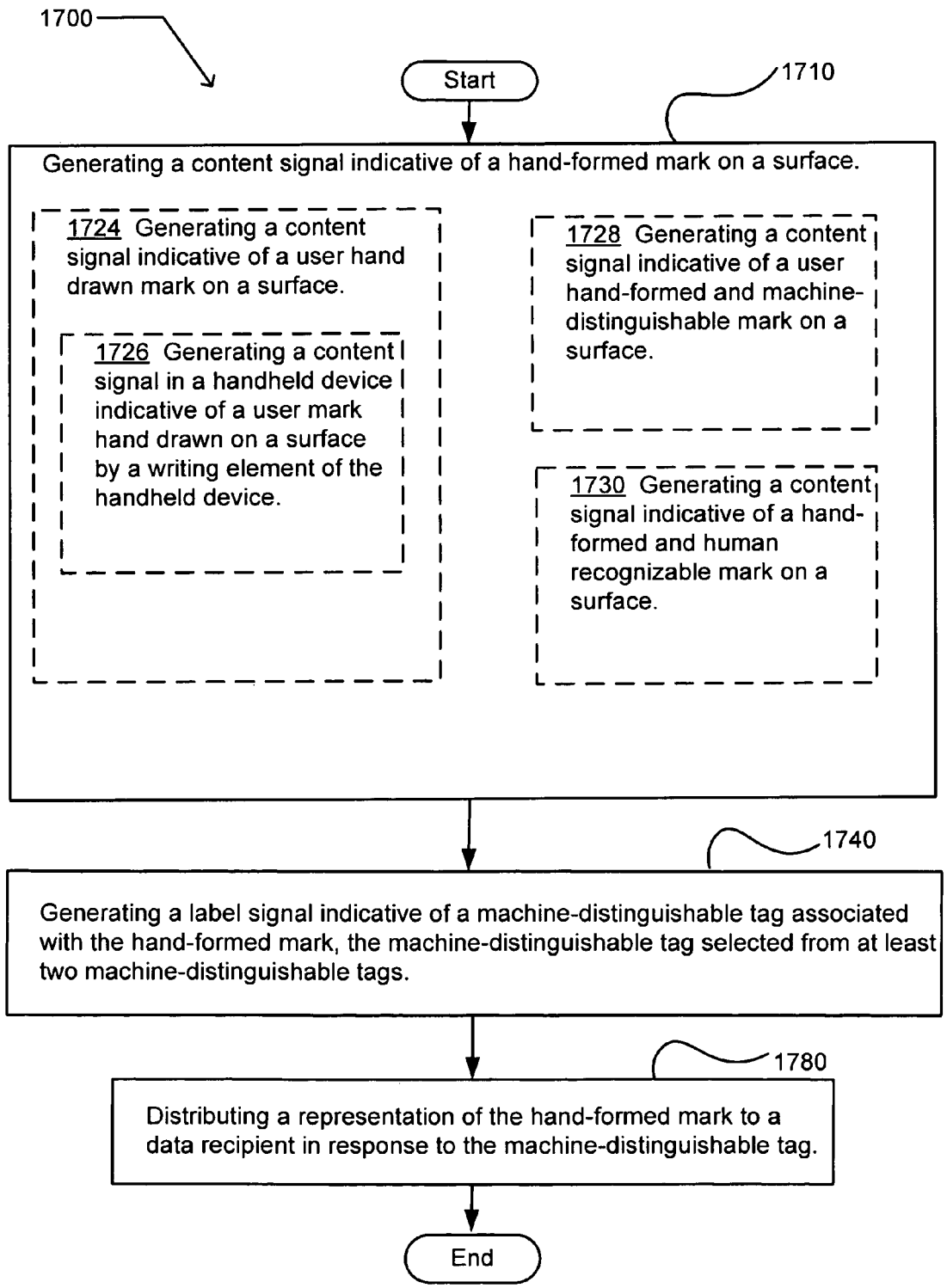
FIG. 32 illustrates a further alternative embodiment of the exemplary operational flow of FIG. 29.

FIG. 32 illustrates a further alternative embodiment of the exemplary operational flow 1700 of FIG. 29. The mark operation 1710 may include at least one additional operation. An additional operation may include an operation 1724, an operation 1728, and/or an operation 1730. The operation 1724 generates a content signal indicative of a user hand drawn mark on a surface. The operation 1724 may include at least one additional operation, such as an operation 1726. The operation 1726 generates a content signal in a handheld device indicative of a user mark hand drawn on a surface by a writing element of the handheld device. The operation 1728 generates a content signal indicative of a user hand-formed and machine-distinguishable mark on a surface. The operation 1730 generates a content signal indicative of a hand-formed and human recognizable mark on a surface.

Figure 33:
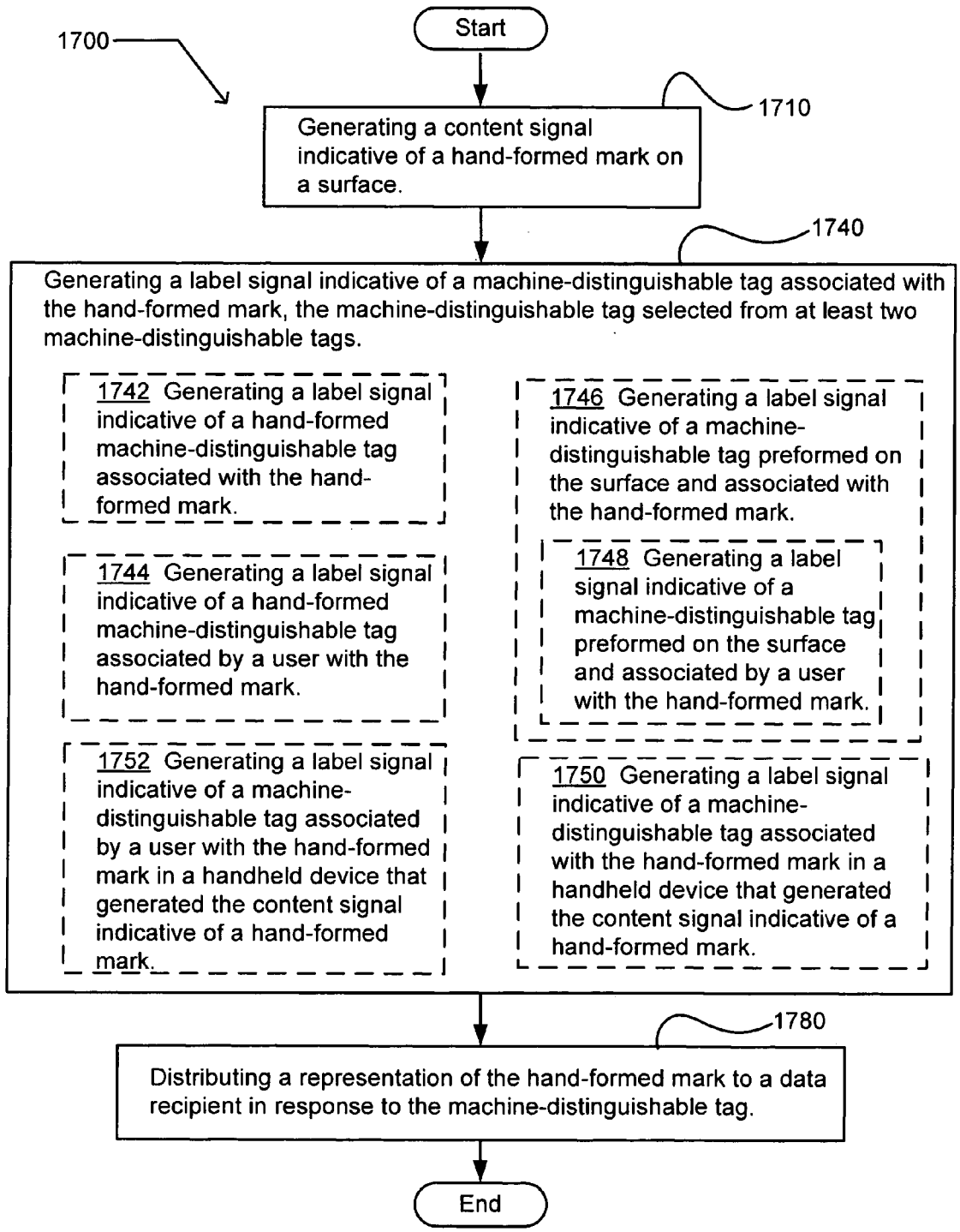
FIG. 33 illustrates an alternative embodiment of the exemplary operation flow of FIG. 29.

FIG. 33 illustrates an alternative embodiment of the exemplary operational flow 1700 of FIG. 29. The description operation 1740 may include at least one additional operation. Additional operations may include an operation 1742, an operation 1744, an operation 1746, an operation 1750, and/or an operation 1752. The operation 1742 generates a label signal indicative of a hand-formed machine-distinguishable tag associated with the hand-formed mark. The operation 1744 generates a label signal indicative of a hand-formed machine-distinguishable tag associated by a user with the hand-formed mark. The operation 1746 generates a label signal indicative of a machine-distinguishable tag preformed on the surface and associated with the hand-formed mark. The operation 1746 may include at least one additional operation, such as an operation 1748. The operation 1748 generates a label signal indicative of a machine-distinguishable tag preformed on the surface and associated by a user with the hand-formed mark. The operation 1750 generates a label signal indicative of a machine-distinguishable tag associated with the hand-formed mark in a handheld device that generated the content signal indicative of a hand-formed mark. The operation 1752 generates a label signal indicative of a machine-distinguishable tag associated by a user with the hand-formed mark in a handheld device that generated the content signal indicative of a hand-formed mark.

Figure 34:
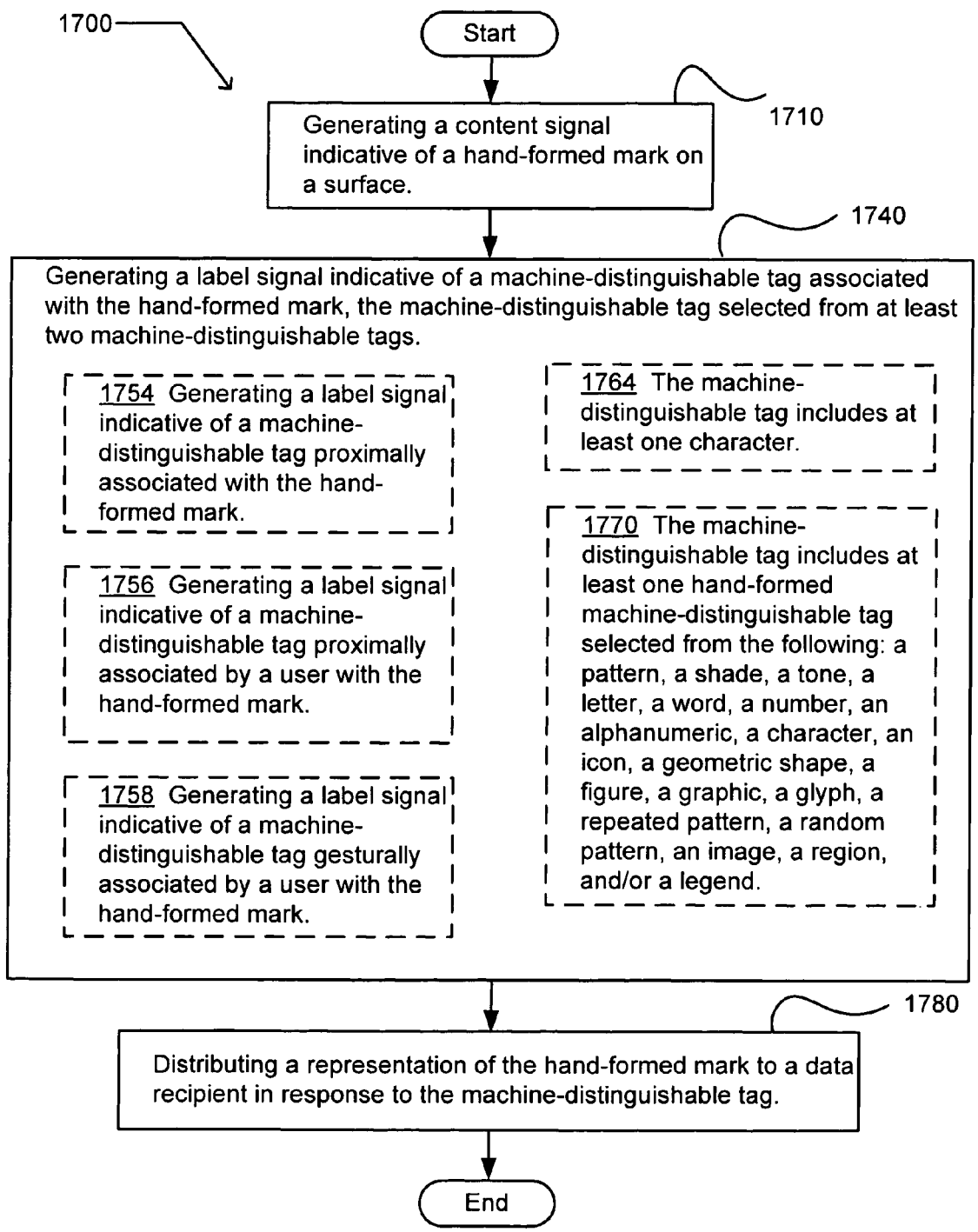
FIG. 34 illustrates another alternative embodiment of the exemplary operational flow of FIG. 29.

FIG. 34 illustrates another alternative embodiment of the exemplary operational flow 1700 of FIG. 29. The description operation 1740 may include at least one additional operation. Additional operations may include an operation 1754, an operation 1756, an operation 1758, an operation 1764, and/or an operation 1770. The operation 1754 generates a label signal indicative of a machine-distinguishable tag proximally associated with the hand-formed mark. The operation 1756 generates a label signal indicative of a machine-distinguishable tag proximally associated by a user with the hand-formed mark. The operation 1758 generates a label signal indicative of a machine-distinguishable tag gesturally associated by a user with the hand-formed mark. In an embodiment, a gestural association may include a movement of a writing element of a handheld writing device in contact with a surface, such as a movement across a surface by the writing element 220 of the handheld writing device 210 of FIG. 3. In another embodiment, a gestural association may include a movement away from a surface by a writing element of a handheld writing device, such as an air movement of the writing element 220 of the handheld writing device 210 of FIG. 3. In a further embodiment, a gestural association may include a movement of one or more body parts, such as a tapping movement of the finger 710 of FIG. 16 with respect to a machine-recognizable tag and/or with respect to a hand-formed mark. In another embodiment, a machine-recognizable tag may include a gesture by at least one body part.

At the operation 1764, the machine-distinguishable tag includes at least one character. At the operation 1770, the machine-distinguishable tag includes at least one hand-formed machine-distinguishable tag selected from the following: a pattern, a shade, a tone, a letter, a word, a number, an alphanumeric, a character, an icon, a geometric shape, a figure, a graphic, a glyph, a repeated pattern, a random pattern, an image, a region, and/or a legend.

Figure 35:
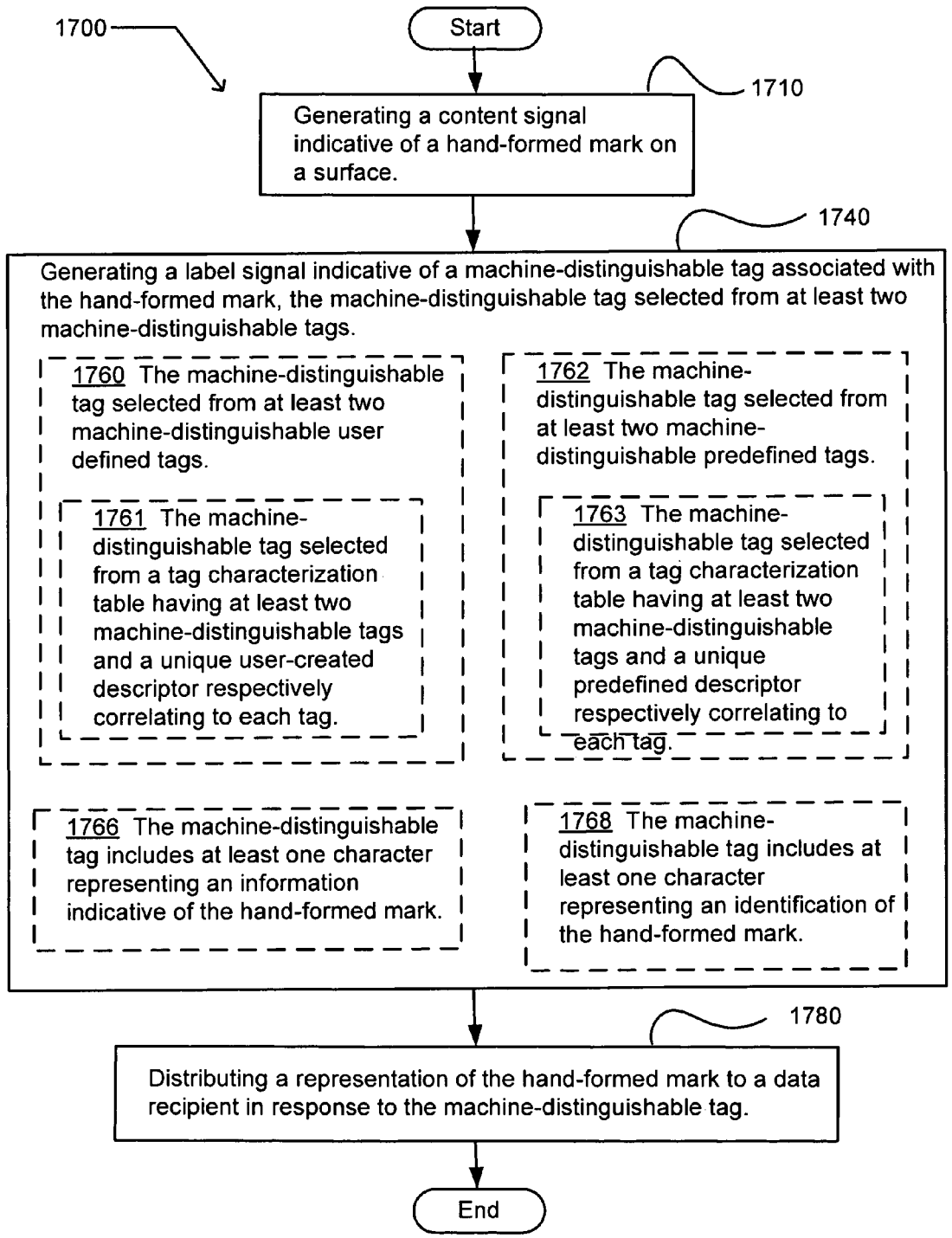
FIG. 35 illustrates a further alternative embodiment of the exemplary operational flow of FIG. 29.

FIG. 35 illustrates a further alternative embodiment of the exemplary operational flow 1700 of FIG. 29. The description operation 1740 may include at least one additional operation. Additional operations may include an operation 1760, an operation 1762, an operation 1766, and/or an operation 1768. At the operation 1760, the machine-distinguishable tag is selected from at least two machine-distinguishable user defined tags. The operation 1760 may include at least one additional operation, such as an operation 1761. At the operation 1761, the machine-distinguishable tag is selected from a tag characterization table having at least two machine-distinguishable tags and a unique user-created descriptor respectively correlating to each tag. At the operation 1762, the machine-distinguishable tag is selected from at least two machine-distinguishable predefined tags. The operation 1762 may include at least one additional operation, such as an operation 1763. At the operation 1763, the machine-distinguishable tag is selected from a tag characterization table having at least two machine-distinguishable tags and a unique predefined descriptor respectively correlating to each tag. At the operation 1766, the machine-distinguishable tag includes at least one character representing an information indicative of the hand-formed mark. At the operation 1768, the machine-distinguishable tag includes at least one character representing an identification of the hand-formed mark.

Figure 36:
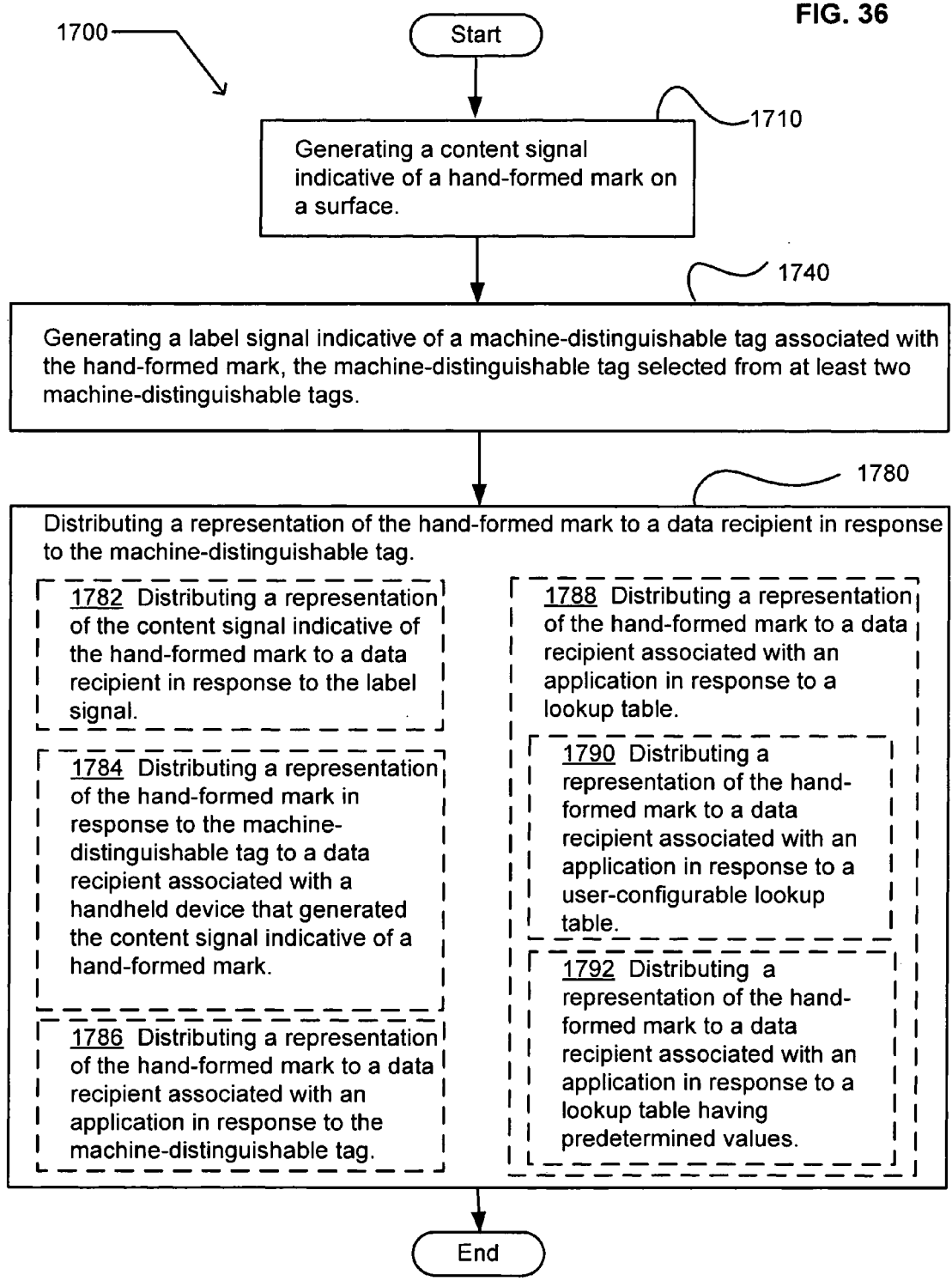
FIG. 36 illustrates a further alternative embodiment of the exemplary operational flow of FIG. 29.

FIG. 36 illustrates a further alternative embodiment of the exemplary operational flow 1700 of FIG. 29. The dissemination operation 1780 may include at least one additional operation. Additional operations may include an operation 1782, an operation 1784, an operation 1786, and/or an operation 1788. The operation 1782 distributes a representation of the content signal indicative of the hand-formed mark to a data recipient in response to the label signal. The operation 1784 distributes a representation of the hand-formed mark in response to the machine-distinguishable tag to a data recipient associated with a handheld device that generated the content signal indicative of a hand-formed mark. The operation 1786 distributes a representation of the hand-formed mark to a data recipient associated with an application in response to the machine-distinguishable tag. The operation 1788 distributes a representation of the hand-formed mark to a data recipient associated with an application in response to a lookup table.

In an embodiment, the distributes a representation of the hand-formed mark to a data recipient associated with an application in response to a lookup table may include a distributes a representation of the hand-formed mark to a data recipient associated with an application by employing a lookup table. In another embodiment, the distributes a representation of the hand-formed mark to a data recipient associated with an application in response to a lookup table may include a distributes a representation of the hand-formed mark to a data recipient associated with an application guided by a lookup table. In a further embodiment, the distributes a representation of the hand-formed mark to a data recipient associated with an application in response to a lookup table may include a distributes a representation of the hand-formed mark to a data recipient associated with an application directed by a lookup table.

The operation 1788 may include at least one additional operation. An additional operation may include an operation 1790, and/or an operation 1792. The operation 1790 distributes a representation of the hand-formed mark to a data recipient associated with an application in response to a user-configurable lookup table. The operation 1792 distributes a representation of the hand-formed mark to a data recipient associated with an application in response to a lookup table including predetermined values.

Figure 37:
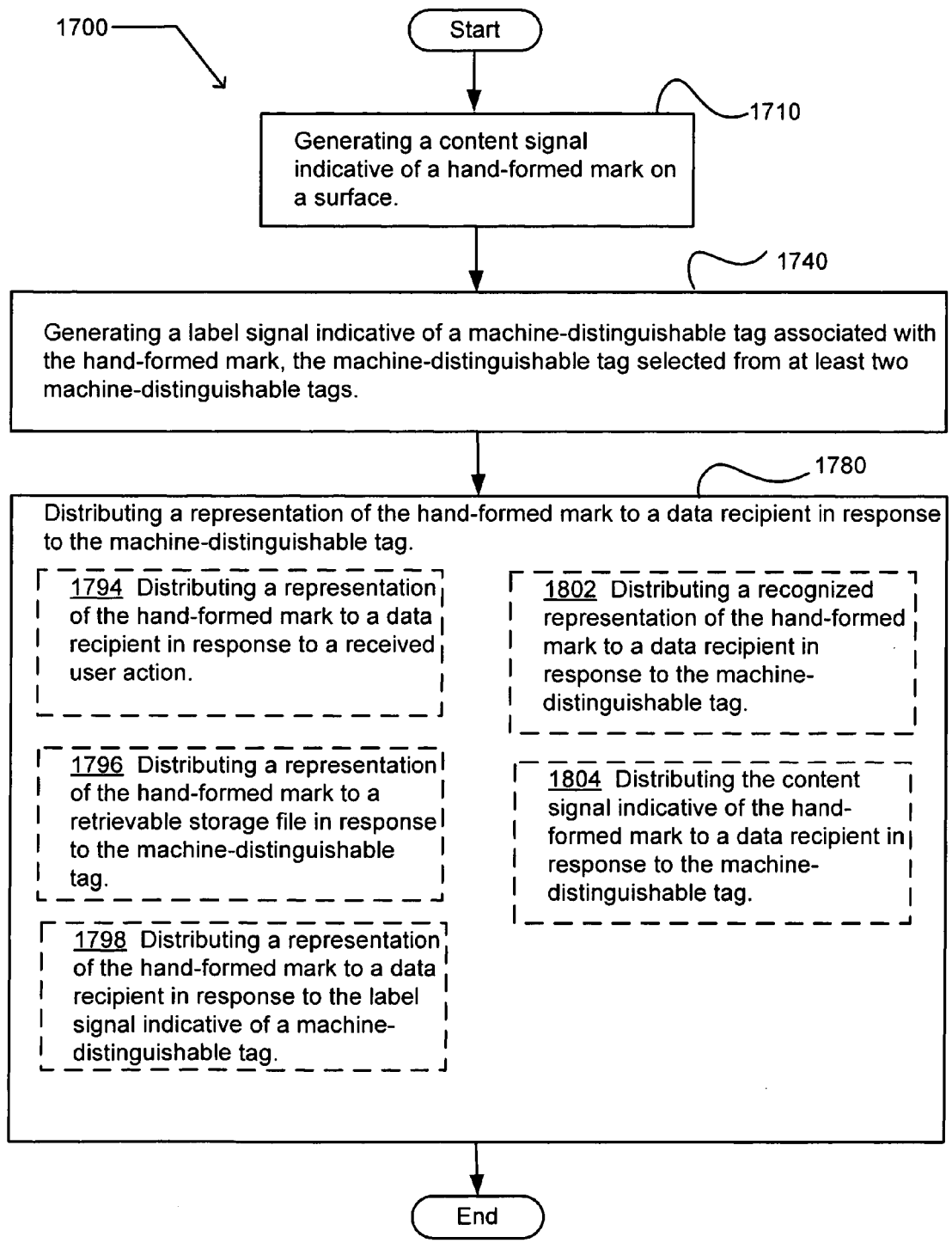
FIG. 37 illustrates an alternative embodiment of the exemplary operational flow of FIG. 29.

FIG. 37 illustrates an alternative embodiment of the exemplary operational flow 1700 of FIG. 29. The dissemination operation 1780 may include at least one additional operation. Additional operations may include an operation 1794, an operation 1796, an operation 1798, an operation 1802, and/or an operation 1804. The operation 1794 distributes a representation of the hand-formed mark to a data recipient in response to a received user action. The operation 1796 distributes a representation of the hand-formed mark to a retrievable storage file in response to the machine-distinguishable tag. The operation 1798 distributes a representation of the hand-formed mark to a data recipient in response to the label signal indicative of a machine-distinguishable tag. The operation 1802 distributes a recognized representation of the hand-formed mark to a data recipient in response to the machine-distinguishable tag. The operation 1804 distributes the content signal indicative of the hand-formed mark to a data recipient in response to the machine-distinguishable tag.

Figure 38:
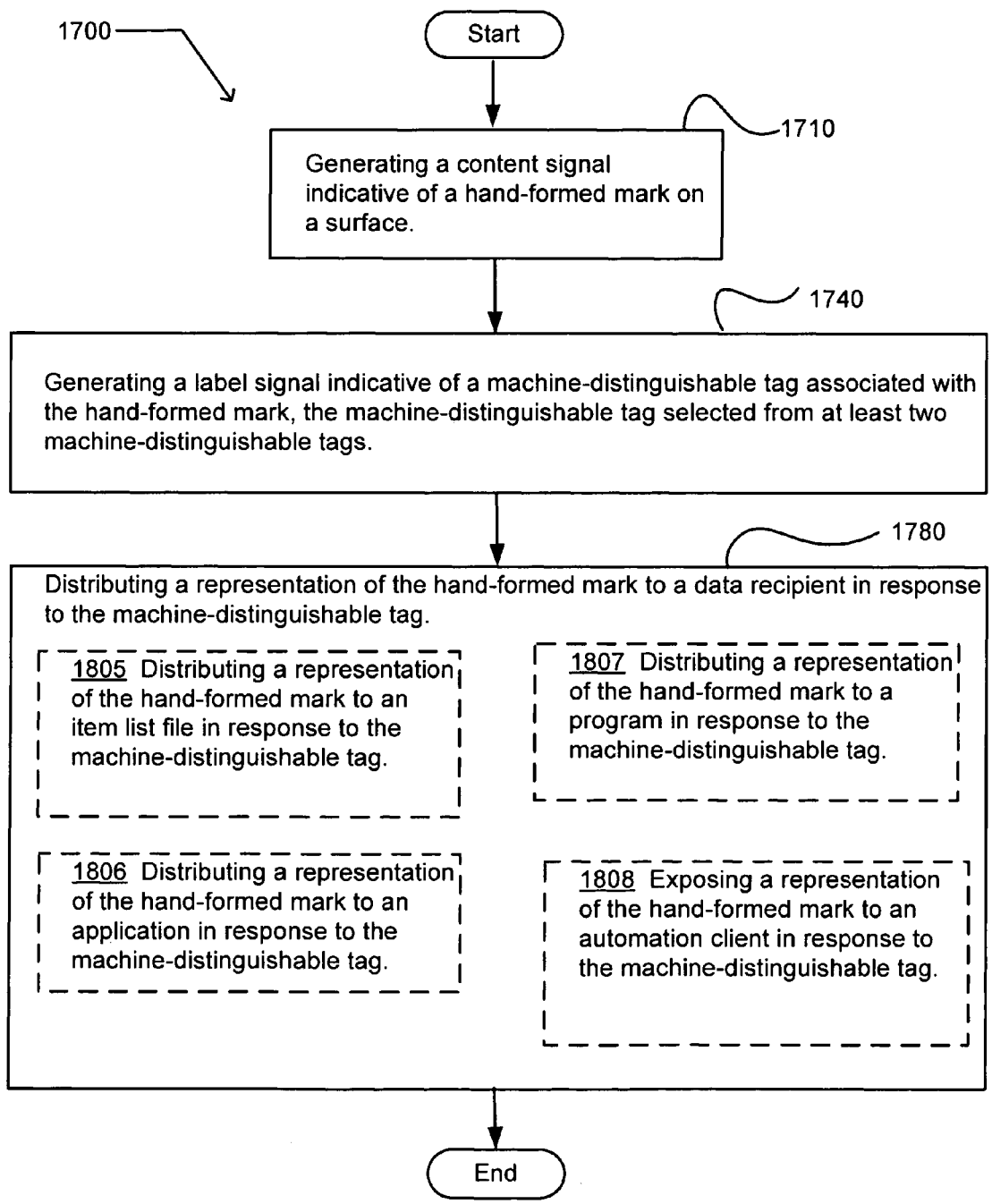
FIG. 38 illustrates another alternative embodiment of the exemplary operational flow of FIG. 29.

FIG. 38 illustrates another alternative embodiment of the exemplary operational flow 1700 of FIG. 29. The dissemination operation 1780 may include at least one additional operation. Additional operations may include an operation 1805, an operation 1806, an operation 1807, and/or an operation 1808. The operation 1805 distributes a representation of the hand-formed mark to an item list file in response to the machine-distinguishable tag. The operation 1806 distributes a representation of the hand-formed mark to an application in response to the machine-distinguishable tag. The operation 1807 distributes a representation of the hand-formed mark to a program in response to the machine-distinguishable tag. The operation 1808 exposes a representation of the hand-formed mark to an automation client in response to the machine-distinguishable tag. In an embodiment, an automation may include a particular usage of a component software architecture that lets applications expose their internal functions as objects to other applications. "Automation" includes "OLE automation."

Figure 39:
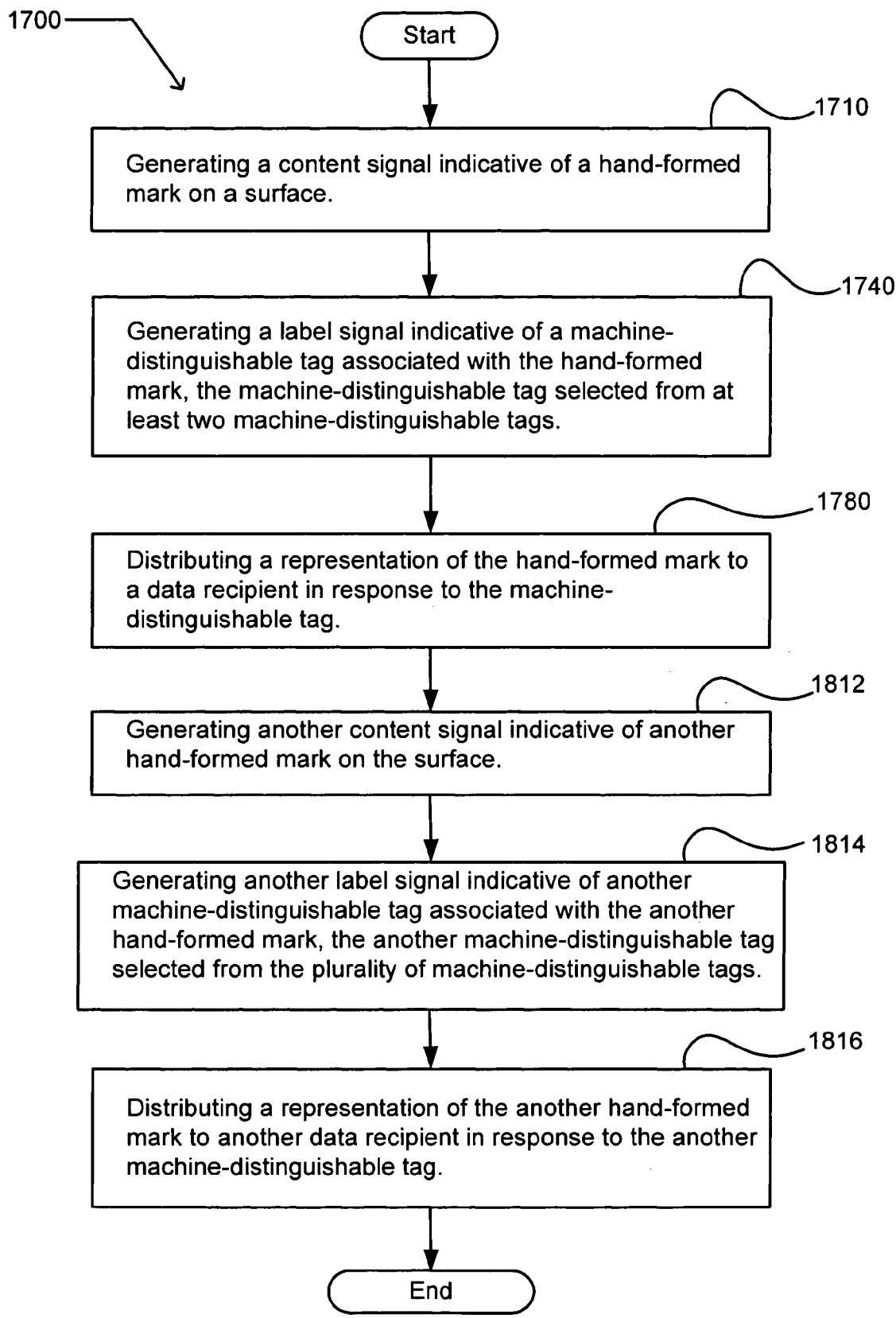
FIG. 39 illustrates a further alternative embodiment of the exemplary operational flow of FIG. 29, which includes additional operations.

FIG. 39 illustrates a further alternative embodiment of the exemplary operational flow 1700 of FIG. 29, which includes additional operations. Another mark representation operation 1812 generates another content signal indicative of another hand-formed mark on the surface. Another description operation 1814 generates another label signal indicative of another machine-distinguishable tag associated with the another hand-formed mark. The another machine-distinguishable tag is selected from the plurality of machine-distinguishable tags. Another dissemination operation 1816 distributes a representation of the another hand-formed mark to another data recipient in response to the another machine-distinguishable tag.

Figure 40:
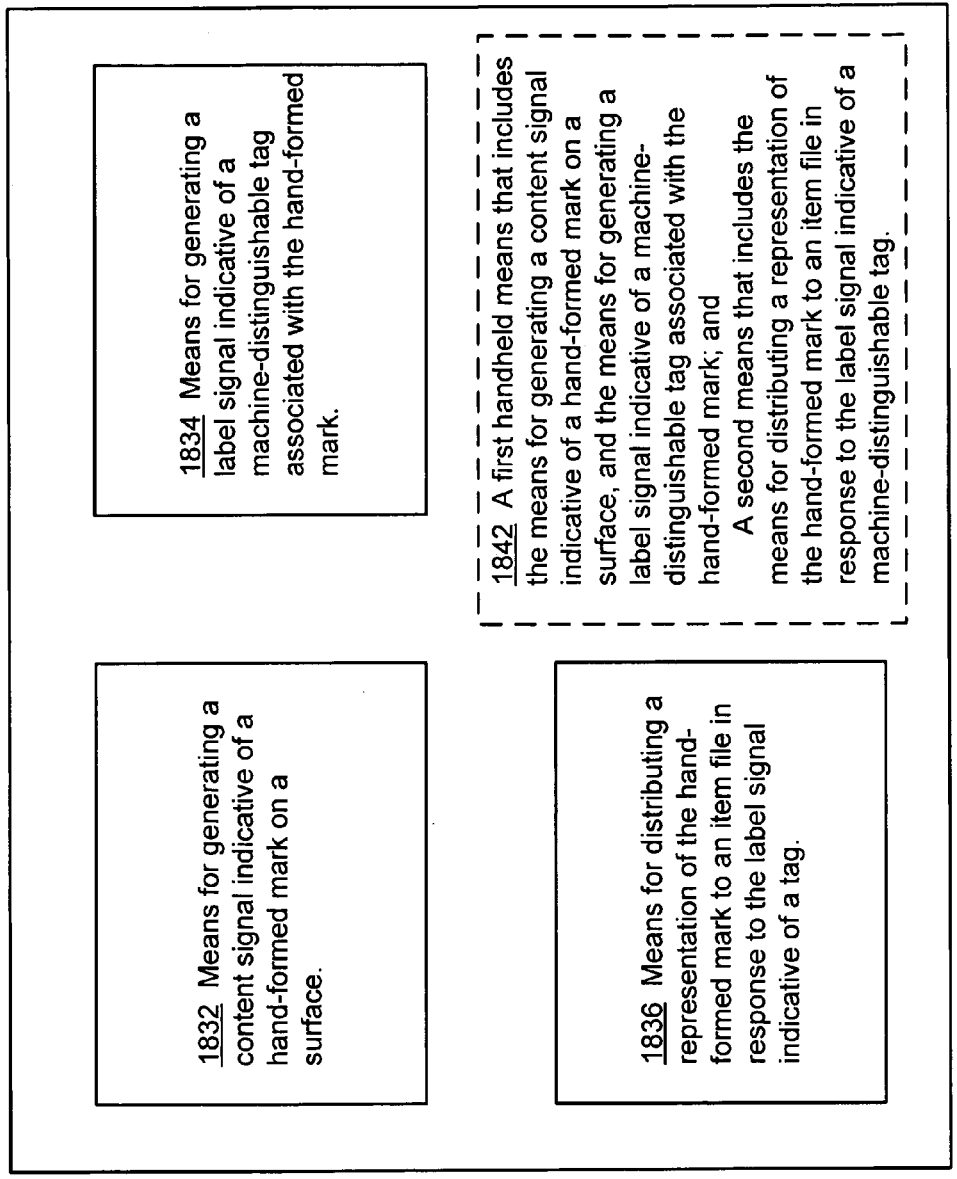
FIG. 40 illustrates a partial view of an exemplary apparatus.

FIG. 40 illustrates a partial view of an exemplary apparatus 1820. The apparatus includes a means 1832 for generating a content signal indicative of a hand-formed mark on a surface. The apparatus also includes a means 1834 for generating a label signal indicative of a machine-distinguishable tag associated with the hand-formed mark. The apparatus further includes a means 1836 for distributing a representation of the hand-formed mark to an item file in response to the label signal indicative of a machine-distinguishable tag. An alternative embodiment may provide at least one additional means, such as a means 1842. The means 1842 includes a first handheld means that includes the means 1832 for generating a content signal indicative of a hand-formed mark on a surface, and the means 1834 for generating a label signal indicative of a machine-distinguishable tag associated with the hand-formed mark. The means 1842 also includes a second means that includes the means 1836 for distributing a representation of the hand-formed mark to an item file in response to the label signal indicative of a machine-distinguishable tag.

Figure 41:
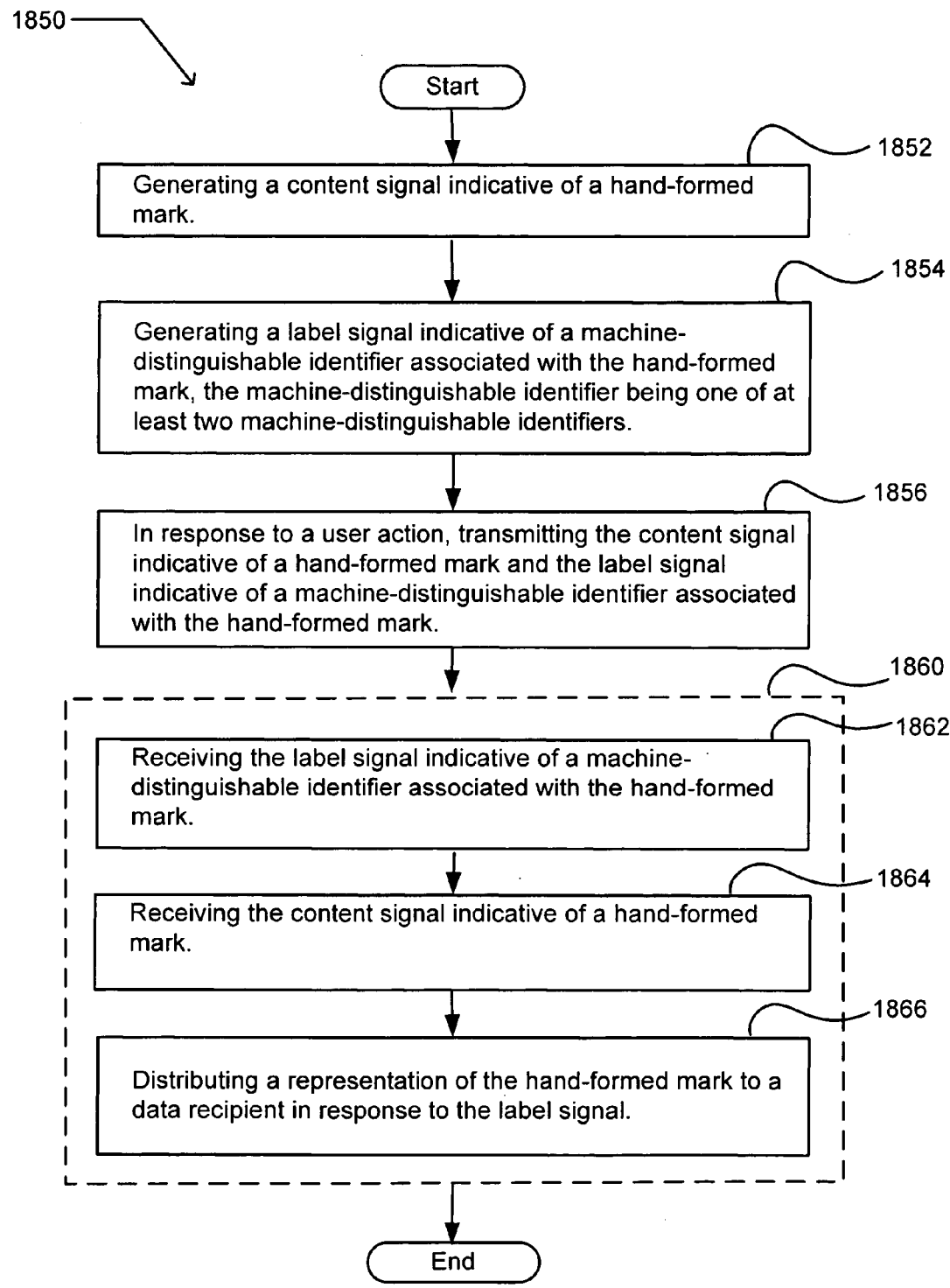
FIG. 41 illustrates an exemplary operational flow.

FIG. 41 illustrates an exemplary operational flow 1850. After a start operation, the operation flow moves to a mark representation operation 1852. The operation 1852 generates a content signal indicative of a hand-formed mark. The operation 1854 generates a label signal indicative of a machine-distinguishable identifier associated with the hand-formed mark. The machine-distinguishable identifier is one of at least two machine-distinguishable identifiers. The operation 1856, in response to a user action, transmits the content signal indicative of a hand-formed mark and the label signal indicative of a machine-distinguishable identifier associated with the hand-formed mark. The operational flow then proceeds to an end operation.

In an alternative embodiment, the operational flow 1850 may include an additional operation, such as an operation 1860. The operation 1860 includes an operation 1862, an operation 1864, and an operation 1866. The operation 1862 receives the label signal indicative of a machine-distinguishable identifier associated with the hand-formed mark. The operation 1864 receives the content signal indicative of a hand-formed mark. The operation 1866 distributes a representation of the hand-formed mark to a data recipient in response to the label signal.

This description returns to FIG. 27 and the environment 1900 in which embodiment may be implemented. The environment includes an article of manufacture, illustrated as the document 1910 including a surface 1912. The document includes a handwritten mark 1916 on the surface 1912 formed by a pen. The document includes a machine-distinguishable tag 1914 associated by a user with the handwritten mark. The machine-distinguishable tag being selected by the user from at least two machine-distinguishable tags 1928.

The environment includes a pen, an embodiment of which is illustrated as the handheld writing device 210 of FIG. 3. The pen includes a writing element, illustrated in an embodiment as the writing element 220. The pen also includes a writing detector module operable to generate a signal indicative of the handwritten mark by the writing element on the surface. The writing detector module is illustrated in an embodiment as the writing detector module 230. The pen includes a tag detector module operable to generate a signal indicative of the machine-distinguishable tag associated with the handwritten mark. The tag detector module is illustrated as the context detector module 240. In another embodiment, the writing detector module includes the context detector module. In a further embodiment, the machine-distinguishable tag associated with the handwritten mark includes a machine-distinguishable tag hand marked on the surface and associated with the handwritten mark.

In an embodiment, the environment 1900 includes a computer program product, such as the computer program product 2150 of FIG. 47. The computer program product includes program instructions operable to perform a process in a computer system. The process includes receiving a signal indicative of the handwritten mark. The process also includes receiving a signal indicative of the machine-distinguishable tag associated by the user with the handwritten mark, the machine-distinguishable tag being selected from at least two machine-distinguishable tags. The process further includes distributing a representation of the handwritten mark to a data recipient in response to the machine-distinguishable tag. The computer program product includes a computer-readable signal-bearing medium bearing the program instructions.

Figure 42:
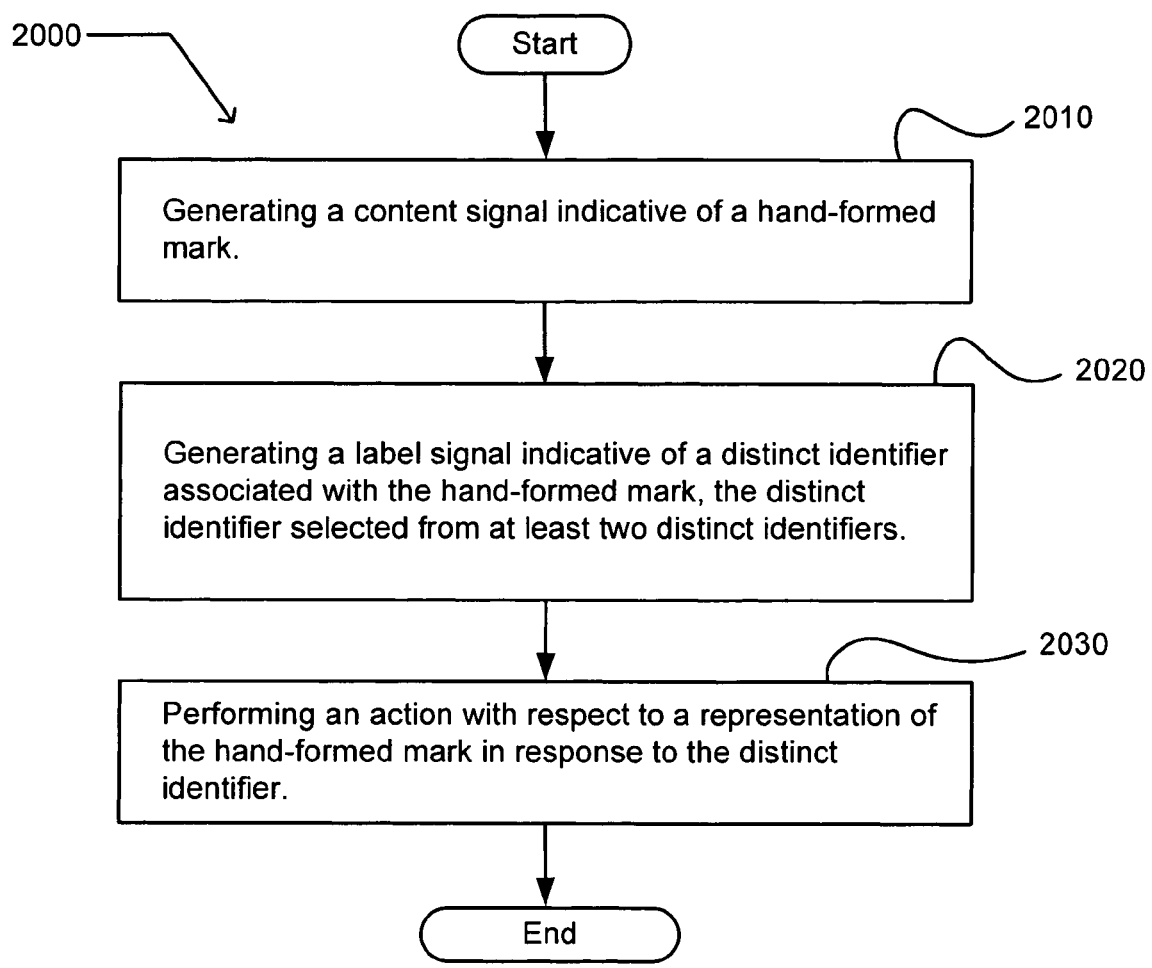
FIG. 42 illustrates an exemplary operational flow.

FIG. 42 illustrates an exemplary operational flow 2000. After a start operation, the operation flow moves to a mark representation operation 2010. The mark representation operation 2010 generates a content signal indicative of a hand-formed mark. The description operation 2020 generates a label signal indicative of a distinct identifier associated with the hand-formed mark. The distinct identifier includes one of at least two distinct identifiers. The distribution operation 2030 performs an action with respect to a representation of the hand-formed mark in response to the distinct identifier. The operational flow then proceeds to an end operation.

Figure 43:
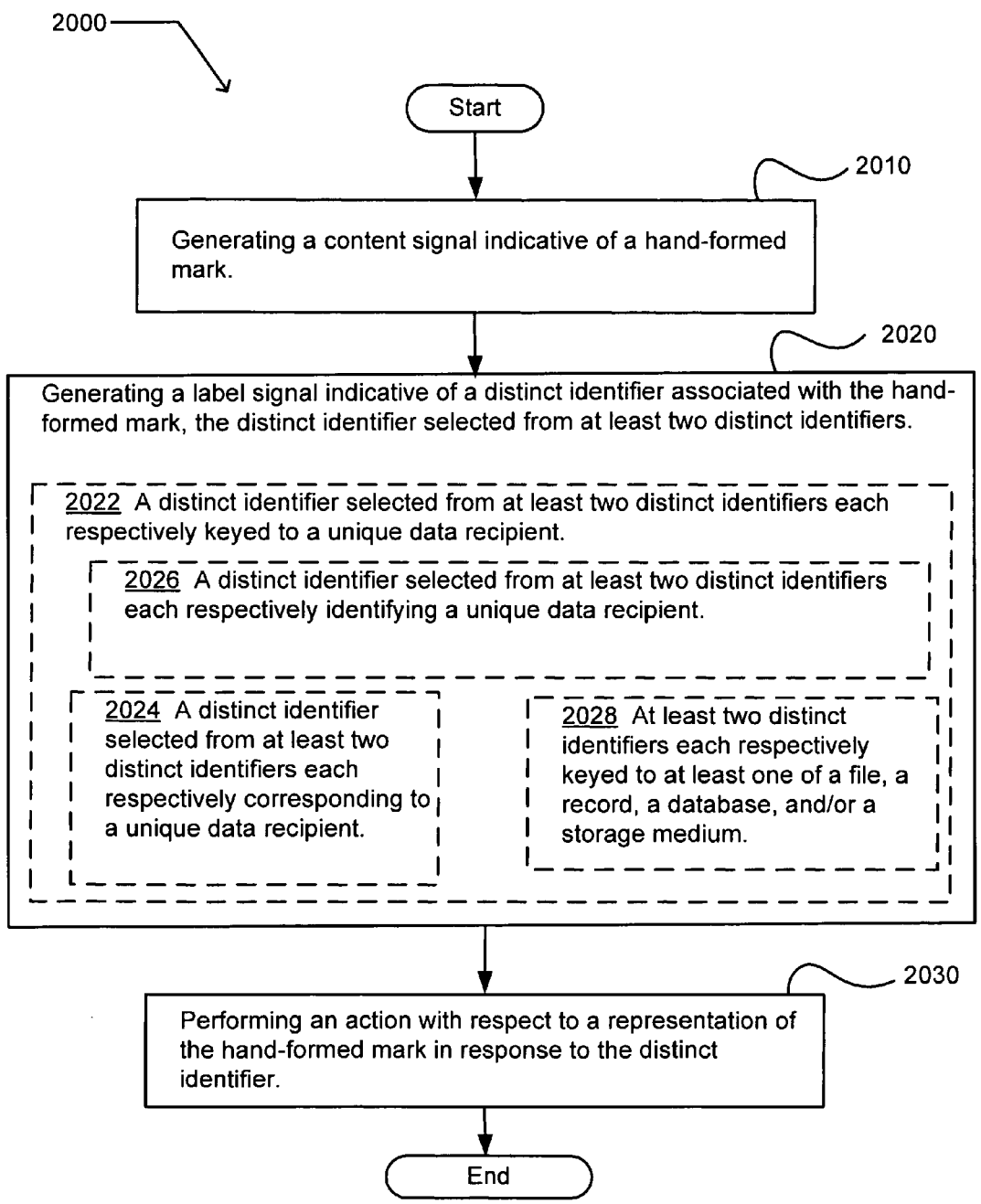
FIG. 43 illustrates an alternative embodiment of the operational flow of FIG. 42.

FIG. 43 illustrates an alternative embodiment of the operational flow 2000 of FIG. 42. The description operation 2020 may include at least one additional operation, such as an operation 2022. At the operation 2022, a distinct identifier is selected from at least two distinct identifiers each respectively keyed to a unique data recipient. The operation 2022 may include at least one additional operation. An additional operation may include an operation 2024, an operation 2026, and/or an operation 2028. At the operation 2024, a distinct identifier is selected from at least two distinct identifiers each respectively corresponding to a unique data recipient. At the operation 2026, a distinct identifier is selected from at least two distinct identifiers each respectively identifying a unique data recipient. At the operation 2028, a distinct identifier is keyed to at least one of a file, a record, a database, and/or a storage medium.

Figure 44:
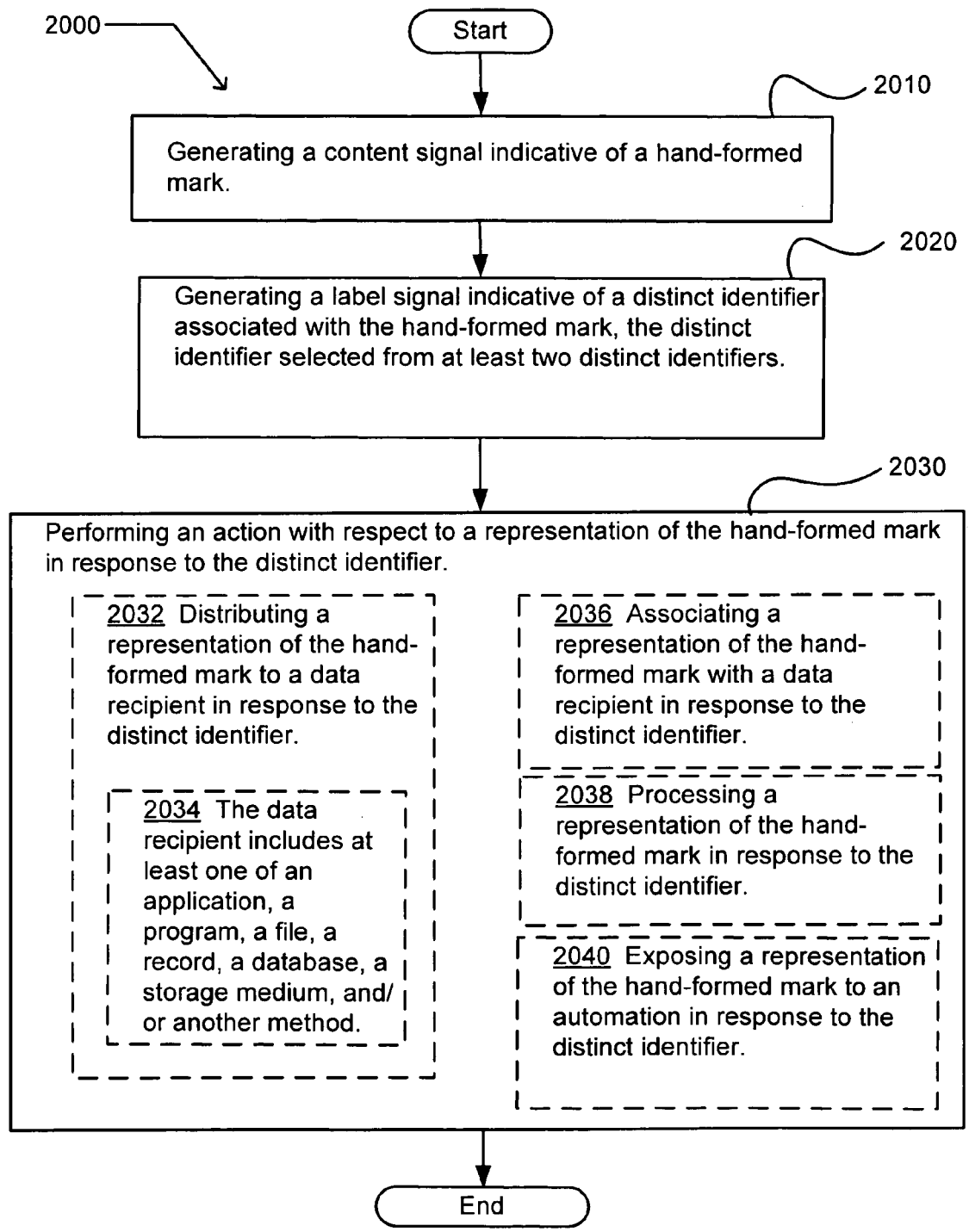
FIG. 44 illustrates an alternative embodiment of the operational flow of FIG. 42.

FIG. 44 illustrates an alternative embodiment of the operational flow 2000 of FIG. 42. The distribution operation 2030 may include at least one additional operation. An additional operation may include an operation 2032, an operation 2036, an operation 2038, and/or an operation 2040. The operation 2032 distributes a representation of the hand-formed mark to a data recipient in response to the distinct identifier. The operation 2032 may include at least one additional operation, such as an operation 2034. At the operation 2034, the data recipient includes at least one of an application, a program, a file, a record, a database, a storage medium, and/or another method. The operation 2036 associates a representation of the hand-formed mark with a data recipient in response to the distinct identifier. The operation 2038 processes a representation of the hand-formed mark in response to the distinct identifier. The operation 2040 exposes a representation of the hand-formed mark to an automation in response to the distinct identifier.

Figure 45:
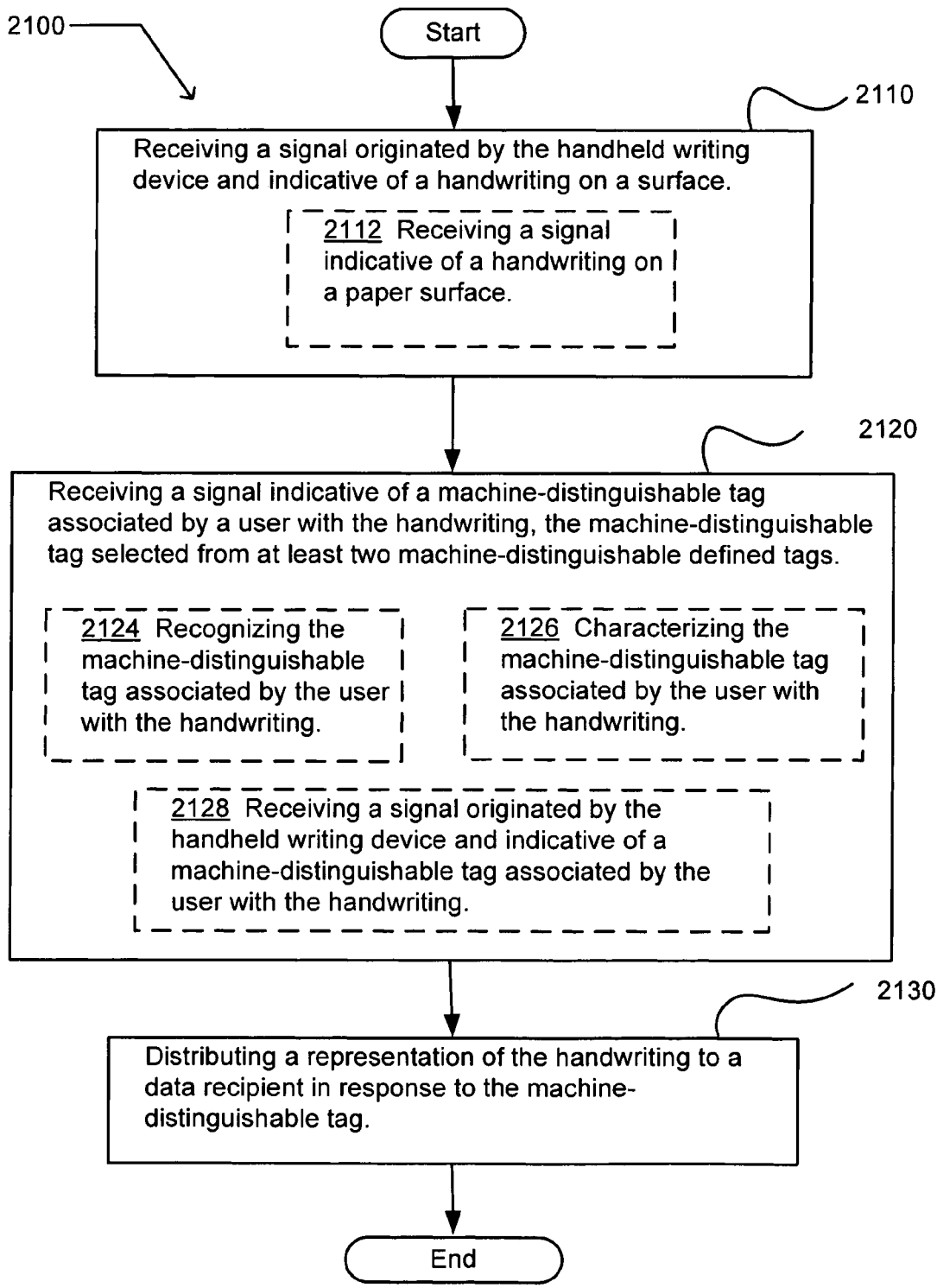
FIG. 45 illustrates an exemplary operational flow.

FIG. 45 illustrates an exemplary operational flow 2100. After a start operation, the operation flow moves to a mark reception operation 2110. The mark reception operation 2110 receives from a handheld writing device a signal indicative of a handwriting on a surface. The descriptor reception operation 2120 receives a signal indicative of a machine-distinguishable tag associated by a user with the handwriting. The machine-distinguishable tag is selected from at least two machine-distinguishable defined tags. The delivery operation 2130 distributes a representation of the handwriting to a data recipient in response to the machine-distinguishable tag. The operational flow then moves to an end operation.

In an embodiment, the mark reception operation 2110 may include at least one additional operation, such as an operation 2112. The operation 2112 receives a signal indicative of a handwriting on a paper surface. In another embodiment, the descriptor reception operation 2120 may include at least one additional operation. An additional operation may include an operation 2124, an operation 2126, and/or an operation 2128. The operation 2124 recognizes the machine-distinguishable tag associated by the user with the handwriting. The operation 2126 characterizes the machine-distinguishable tag associated by the user with the handwriting. The operation 2128 receives a signal originated by the handheld writing device and indicative of a machine-distinguishable tag associated by the user with the handwriting.

Figure 46:
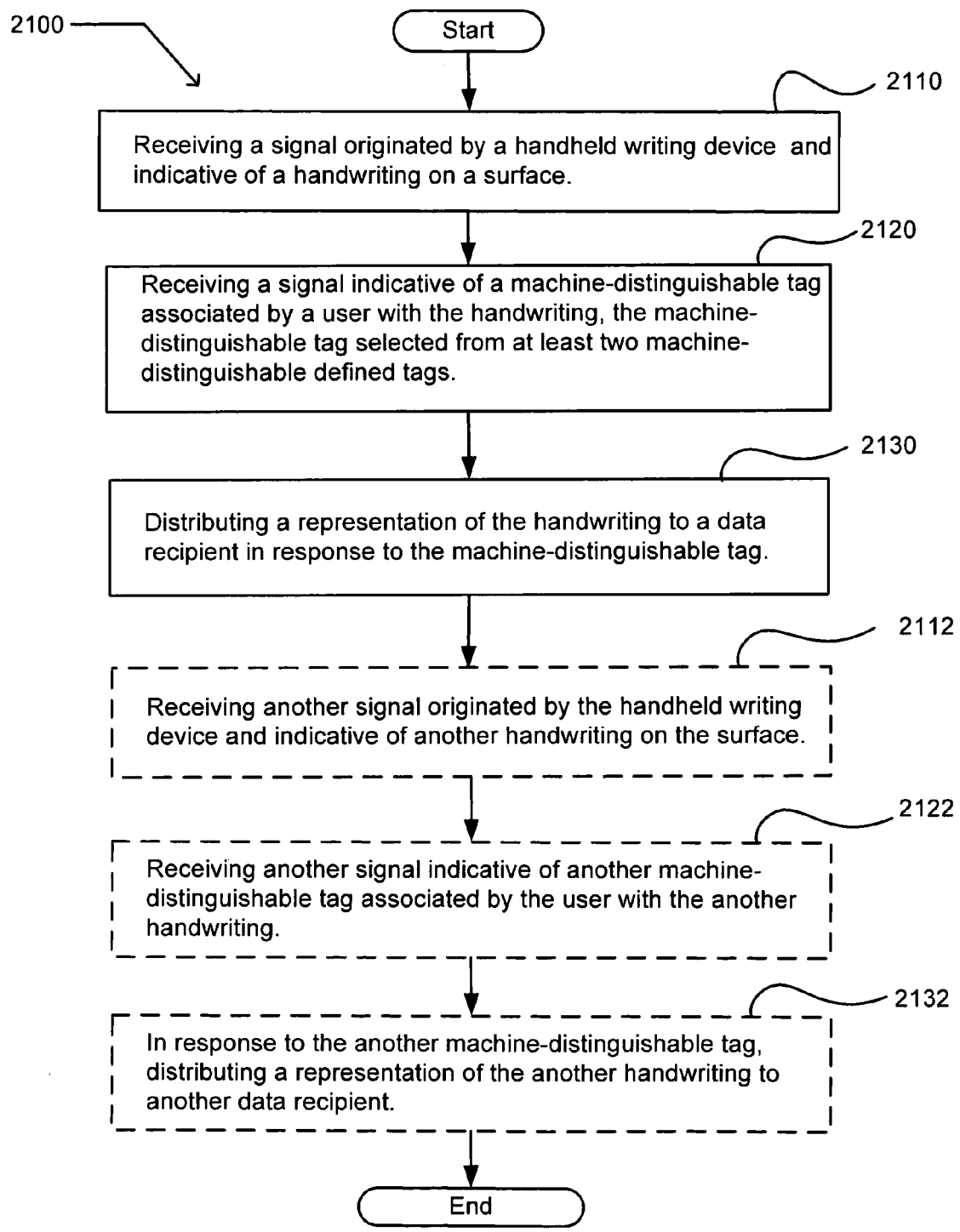
FIG. 46 illustrates an alternative embodiment of the exemplary operational flow.

FIG. 46 illustrates an alternative embodiment of the exemplary operational flow 2100. The operational flow includes another mark reception operation 2112 that receives another signal originated by the handheld writing device and indicative of another handwriting on the surface. The operational flow includes another description reception operation 2122 that receives another signal indicative of another machine-distinguishable tag associated by the user with the another handwriting. The machine-distinguishable tag being selected from at least two machine-distinguishable defined tags. The operational flow includes another delivery operation 2132 distributes a representation of the another handwriting to another data recipient associated with the computing device in response to the another machine-distinguishable tag.

FIG. 47 illustrates a partial view of an exemplary computer program product 2150 that includes a computer program 2154 and a computer-readable signal bearing medium 2152 bearing the computer program. The computer program product encodes the computer program as computer executable instructions for executing a computer process on a computing device. The computer program includes a computer process that receives a signal indicative of a handwriting. The computer process also receives a signal indicative of a machine-distinguishable tag associated by a user with the handwriting, the machine-distinguishable tag being selected from at least two machine-distinguishable tags. The computer process further distributes a representation of the handwriting to a data recipient in response to the machine-distinguishable tag.

In an alternative embodiment, the computer process 2154 may further include an additional process, such as a process 2156, and/or a process 2158. The process 2156 distributes a representation of the handwriting to a data recipient saved in a computer-readable storage medium associated with the computing system in response to the machine-distinguishable tag. The process 2158 distributes a representation of the signal indicative of a handwriting to a data recipient saved in a computer-readable storage medium associated with the computing system in response to the signal indicative of a machine-distinguishable tag.

In another embodiment, the computer-readable signal-bearing medium 2152 may include a computer storage medium 2160, which may be carried by a computer-readable carrier (not shown). The computer-readable signal-bearing medium may include a communications medium 2162. In a further alternative embodiment, the computer-program 2154 may be implemented in hardware, software, and/or firmware.

Figure 48:
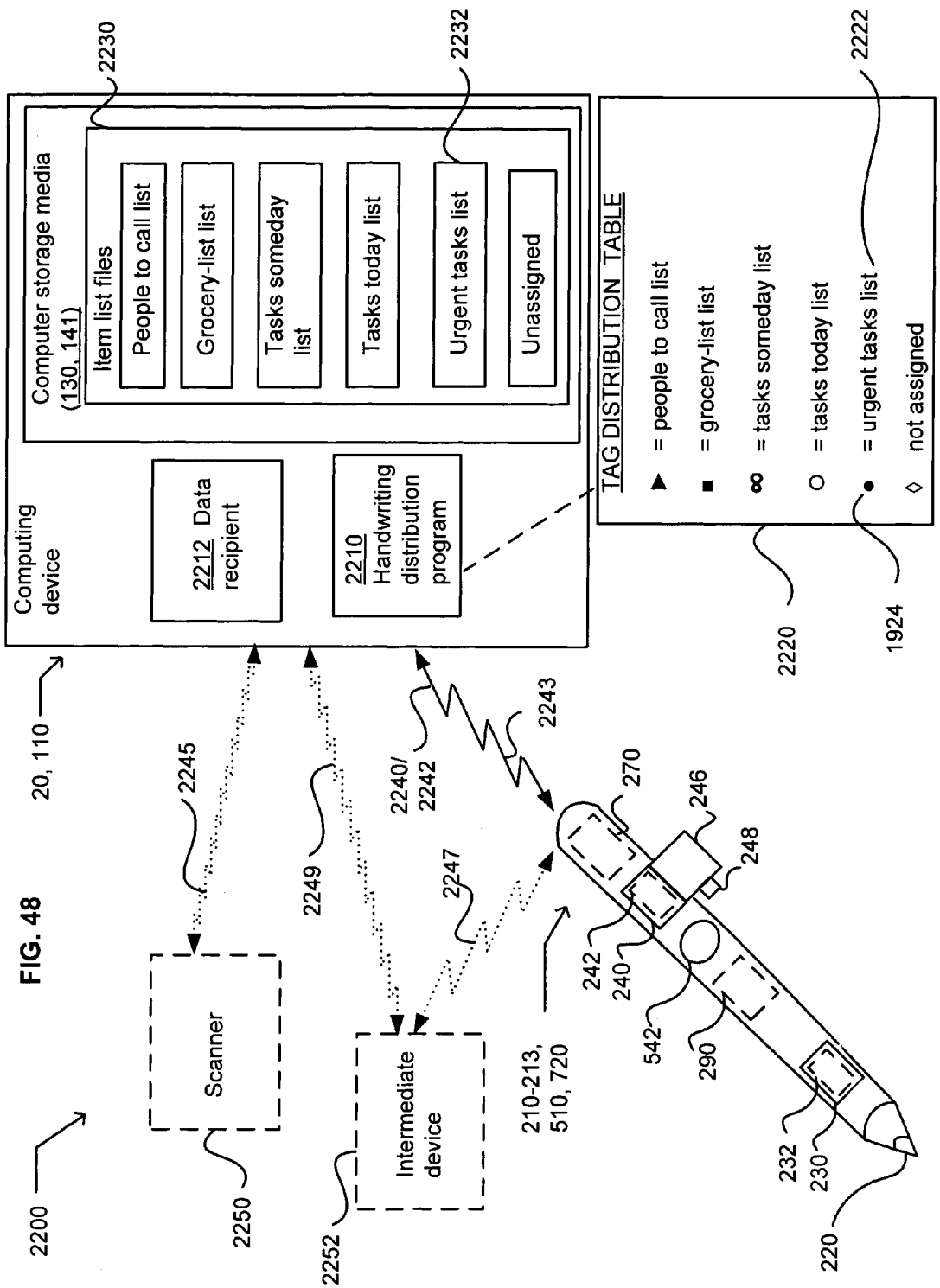
FIG. 48 illustrates an exemplary system in which embodiments may be implemented.

FIG. 48 illustrates an exemplary system 2200 in which embodiments may be implemented. The system includes an exemplary handheld marking device, illustrated in an embodiment as the exemplary handheld marking device described in conjunction with FIG. 27. The system includes an exemplary computing device, illustrated in an embodiment as the thin computing device 20 described in conjunction with FIG. 1, and/or the general-purpose computing device 110 described in conjunction with FIG. 2. The system further includes a handwriting distribution program 2210 that includes a tag distribution table 2220. The distribution program 2210 is at least substantially similar to the computer program 2154 of the computer-program product 2150 described in conjunction with FIG. 47. In an embodiment, the handwriting distribution program is saved in the non-removable non-volatile memory hard disk drive 141 of the general-purpose computing device.

FIG. 48 further illustrates an embodiment where a data recipient includes an item list file 2230 saved in a computer storage media, such as the system memory 130 and/or a computer storage media product associated with the computing device, such as the non-removable non-volatile memory hard drive 141. The item list file includes at least two list subfiles, one of which is illustrated as an "Urgent task list" subfile 2232. FIG. 48 further illustrates an embodiment where the tag distribution table correlates a machine-distinguishable tag with a list file of at least two item list files. For example, the tag distribution table correlates the machine-distinguishable tag "●" 1924 and an indicated subfile 2222, illustrated as the "Urgent task list" subfile. In another embodiment, a data recipient may include a file associated with application programs 145 and/or program data 147 saved on the general-purpose computing device 110. For example, the machine-distinguishable tag "●" may be correlated with a subfile associated with Microsoft's Outlook program, such as its Tasks folder.

In operation of an embodiment, a content signal indicative of a hand-formed mark by a writing element of a handheld marking device is communicated between the computing device 110 and the handheld marking device, such as the handheld marking device of FIG. 27. In an embodiment, the content signal includes the content signal 1710 indicative of a hand-formed mark on a surface as described in conjunction with FIG. 29. The content signal may be communicated over a communications link 2243 that may include a wired coupler (not shown) or over a wireless coupling. Further, a label signal 2242 indicative of a machine-distinguishable tag associated with the hand-formed mark is communicated between the computing device 110 and the handheld marking device, such as the handheld marking device of FIG. 27. In an embodiment, the label signal includes the label signal indicative of a machine-distinguishable tag associated with the hand-formed mark 1740 described in conjunction with FIG. 29. The label signal may be communicated over the communication link 2243 as illustrated in FIG. 48.

In an alternative embodiment, a scanner 2250 may be acquire and communicate the content signal 2240 and/or the label signal 2242 to the computing device 110. The communication link 2245 between the scanner and the computing device may include a wireless coupling and/or a wired coupling (not shown). In another embodiment, a communication path of the content signal and/or the label signal between the handheld marking device and the computing device may include an intermediate device 2252. The intermediate device may include a portable computing device, such as a personal digital assistant (PDA), a cell phone, and/or a laptop computing device. The intermediate device receives the content signal 2240 and/or the label signal 2242 from the handheld marking device over a communications link 2247. The communication link 2247 between the intermediate device and the handheld marking device may include a wireless coupling and/or a wired coupling (not shown). The intermediate device transmits the content signal 2240 and/or the label signal 2242 to the computing device over a communications link 2249. The intermediate device may perform at least one processing step on the content signal 2240 and/or the label signal 2242 before communicating those signals to the computing device.

Continuing with the operation of an embodiment illustrated in FIG. 48, the handwriting distribution program 2210 receives the content signal 2240 indicative of a hand-formed mark on a surface and the label signal 2242 indicative of a machine-distinguishable tag associated with the hand-formed mark. In response to the machine-distinguishable tag, the handwriting distribution program 2210 distributes a representation of the handwriting to a data recipient. For example, the content signal 2240 indicative of a hand-formed mark on a surface may include a content signal indicative of the hand-formed mark "Buy welcome home card" 1916 on the surface 1912 of the document 1910 of FIG. 27. The label signal 2242 indicative of a machine-distinguishable tag associated with the hand-formed mark may include a label signal indicative of the machine-distinguishable tag "●" 1924 a associated with the hand-formed mark. In response to the tag distribution table 2220, the handwriting distribution program distributes the hand-formed mark "Buy welcome home card" to the "Urgent tasks list" 2232.

Figure 49:
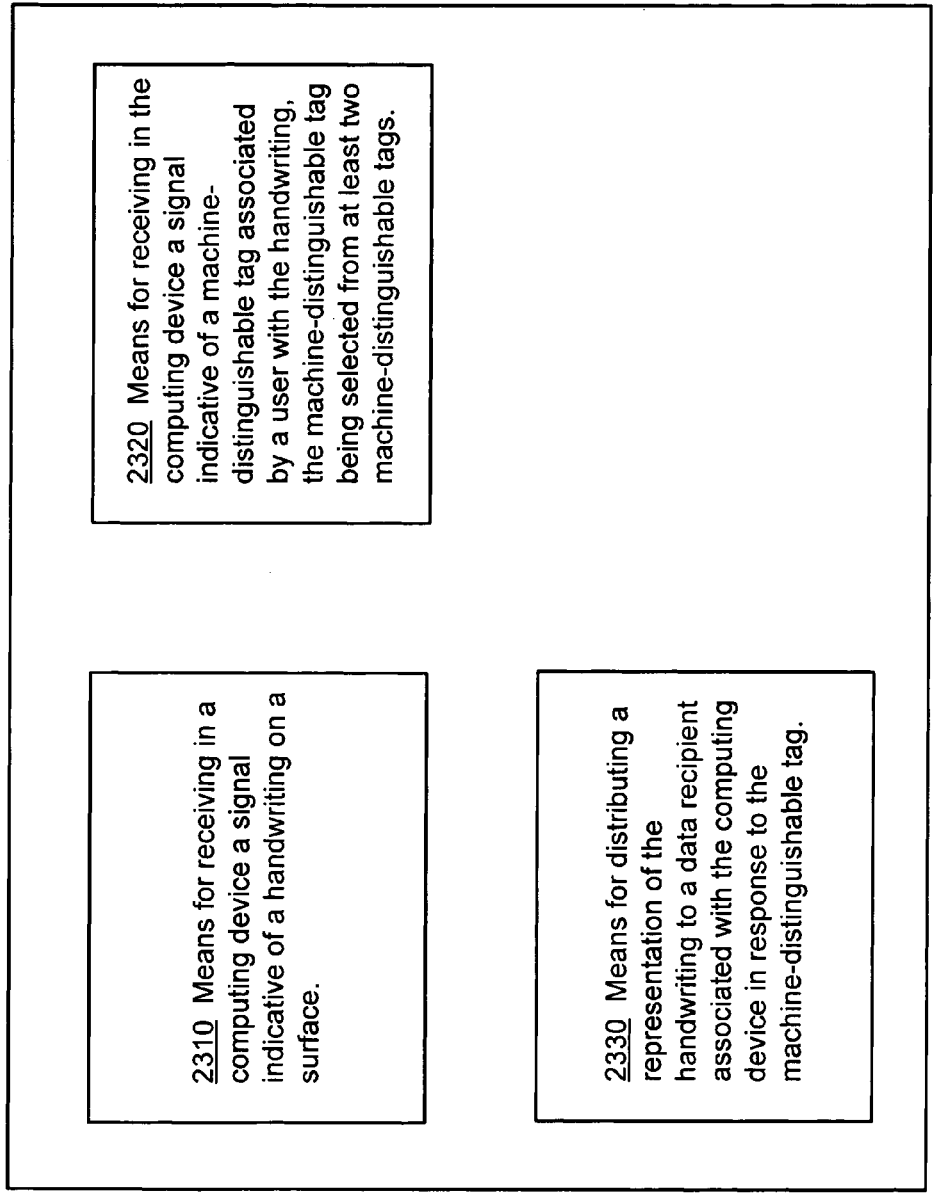
FIG. 49 illustrates a partial view of an exemplary apparatus.

FIG. 49 illustrates a partial view of an exemplary apparatus 2300. The apparatus includes a means 2310 for receiving in a computing device a signal indicative of a handwriting on a surface. The apparatus includes a means 2320 for receiving in the computing device a signal indicative of a machine-distinguishable tag associated by a user with the handwriting, the machine-distinguishable tag being selected from at least two machine-distinguishable tags. The apparatus also includes a means 2330 for distributing a representation of the handwriting to a data recipient associated with the computing device in response to the machine-distinguishable tag.

Figure 50:
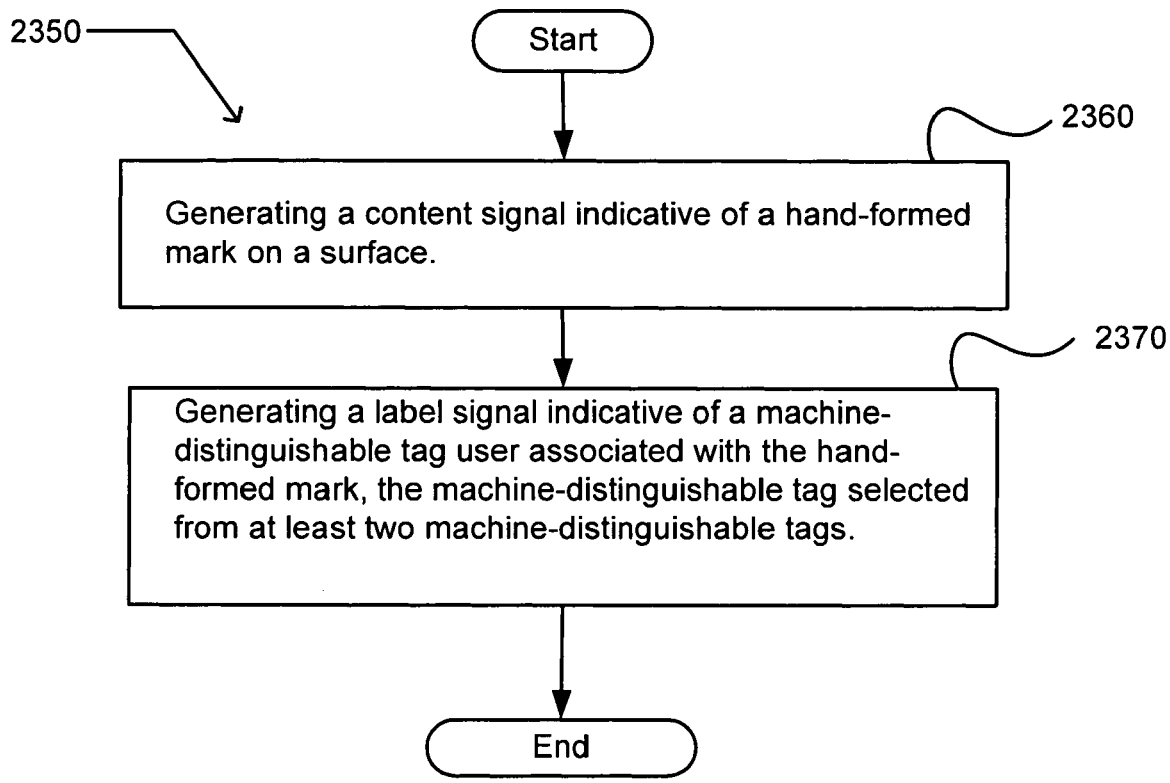
FIG. 50 illustrates an exemplary operational flow.

FIG. 50 illustrates an exemplary operational flow 2350. After a start operation, the operational flow moves to a mark description operation 2360. The mark description operation 2360 generates a content signal indicative of a hand-formed mark on a surface. A description operation 2370 generates a label signal indicative of a machine-distinguishable tag user associated with the hand-formed mark. The machine-distinguishable tag is selected from at least two machine-distinguishable tags. The operational flow then moves to an end operation.

Figure 51:
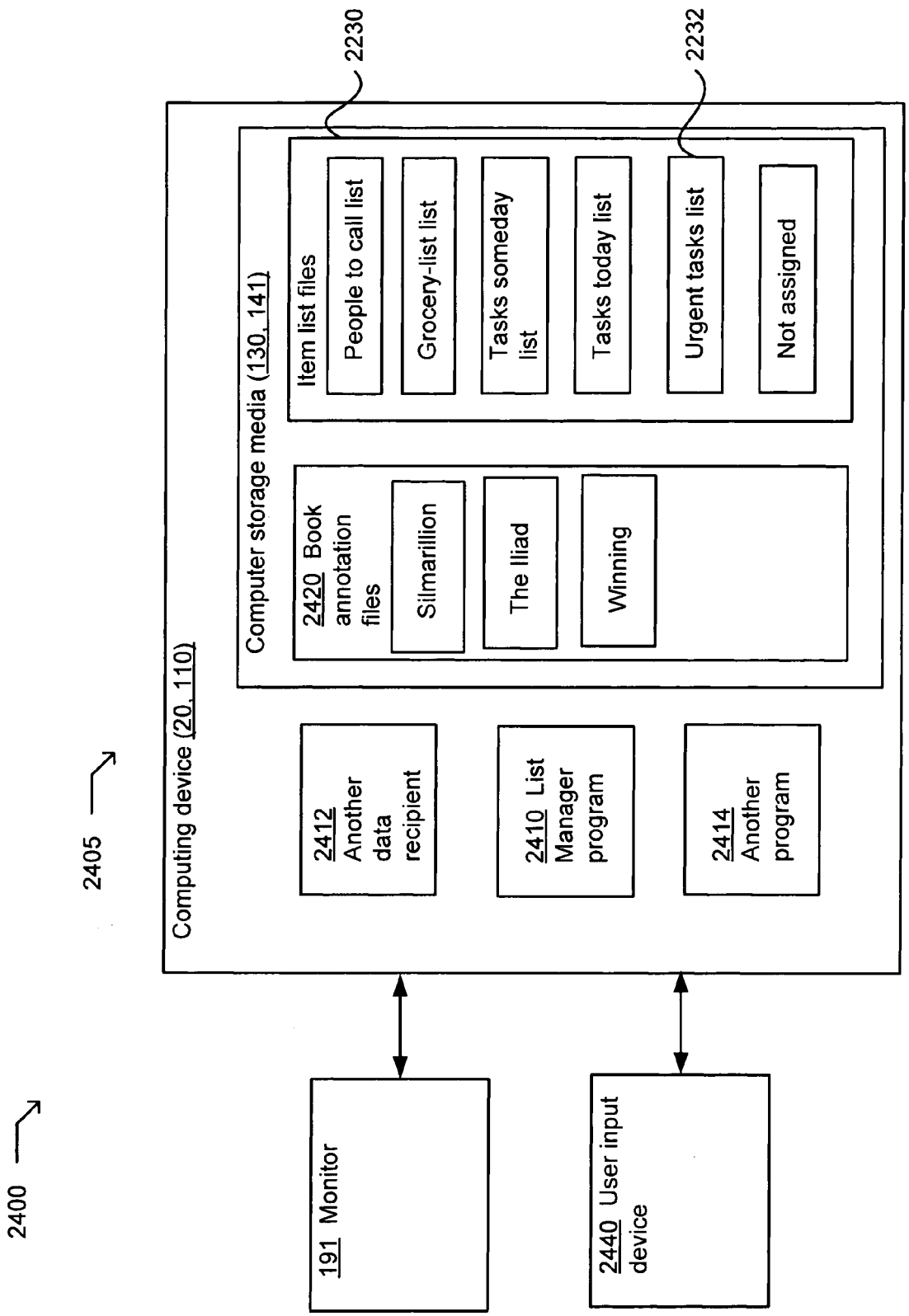
FIG. 51 illustrates a partial view of an environment in which embodiments may be implemented.

FIG. 51 illustrates a partial view of an environment 2400 in which embodiments may be implemented. The environment includes a computing device 2405. In an embodiment, the computing device may include the thin computing device 20 described in conjunction with FIG. 1, a handheld computing device, a portable computing device, a desktop computing device, and/or the general-purpose computing device 110 described in conjunction with FIG. 2. The computing device includes a computer storage media. In an embodiment, the computer storage media may include a system memory, such as the system memory 130, and/or a non-removable non-volatile computer storage product, such as the disk drive 141, both of which are described in conjunction with FIG. 2. The computing device may include a data recipient file saved in the computer storage media. In an embodiment, the saved data recipient file may include the item list files 2230, book annotation files 2420, and/or another data recipient 2412. In an embodiment illustrated in FIG. 51, the item list files include an operability to receive data. The item list files may be a member of a data recipient file class associated or associatable with any feature of the computing device, such as an operating system, an application, and/or a program. For example, the item list files may be associated with Microsoft's OUTLOOK™ program.

In an embodiment, at least one file of the item list files includes at least one representation of a hand-formed mark received by the file in response to a machine-distinguishable tag associated with a hand-formed mark, the machine-distinguishable tag selected from at least two machine-distinguishable tags. For example, the at least one representation of a hand-formed mark may include a representation of the hand-formed mark "Buy welcome home card" 1916 of the document 1910 of FIG. 27. The machine-distinguishable tag associated with the hand-formed mark may include the machine-distinguishable tag "●" 1924 also of FIG. 27. The hand-formed mark "Buy welcome home card" having been distributed to and received by the "Urgent tasks list" 2232 in response to the machine-distinguishable tag "●".

The computing device may also include at least one program saved in the computer storage media. In an embodiment, the at least one program includes a list manager program 2410, and/or another program 2414.

The list manager program 2410 includes instructions operable to perform a process in the computing device 2405. The process includes receiving a request for a content of a file, such as the item list file 2230, and searching a computer storage medium, such as the computer storage media (130, 141), for the requested content of the file. The process also includes outputting the at least one representation of a hand-formed mark. In an embodiment, the outputting the at least one representation of a hand-formed mark may include outputting the at least one representation of a hand-formed mark to at least one of a display, and/or another program.

The environment 2400 also may include a display, illustrated as the monitor 191 described in conjunction with FIG. 2. The environment may also include a user input device 2440, which may include any user input device. For example, the user input device may include any or all of the user input devices described in conjunction with FIG. 2, such as the mouse 161, the keyboard 162, the microphone 163, and/or a touch-sensitive device (not shown) associated with the monitor 191.

In operation of an embodiment, a user inputs a request for a content of a computer-readable file using the user input device 2440. In an embodiment, the request for a content of a computer-readable file may include a general request for a content of a high-level file, such as "show me a content related to the Iliad saved on the computer," i.e., the storage medium disk drive 141 associated with the computing device 2405. In another embodiment, the request for a content of a computer-readable file may include a low-level request, such as "show me a content of my urgent tasks list 2232." The list manager program 2410 receives the user originated request for content of a computer-readable file. The list manager program 2410 searches the computer-readable file or files for the requested content. The computer-readable file or files includes at least one representation of a hand-formed mark distributed to the computer-readable file in response to a machine-distinguishable tag associated with the hand-formed mark, the machine-distinguishable tag selected from at least two machine-distinguishable tags. For example, if the user originated request pertained to the urgent tasks list 2232, the list manager program may cause the urgent task list to be searched for the requested content. The list manager program outputs a content corresponding to the request, the outputted content including at least one representation of a hand formed mark. Continuing with the above example of a request for content of the urgent task list, the list manager program would output at least the representation of the hand-formed mark 1916 "Buy welcome home card." In an embodiment, the output may be provided to the monitor 191 for display to the user. In another embodiment, the output may be exposed to the another program 2414, and/or the another data recipient 2412.

Figure 52:
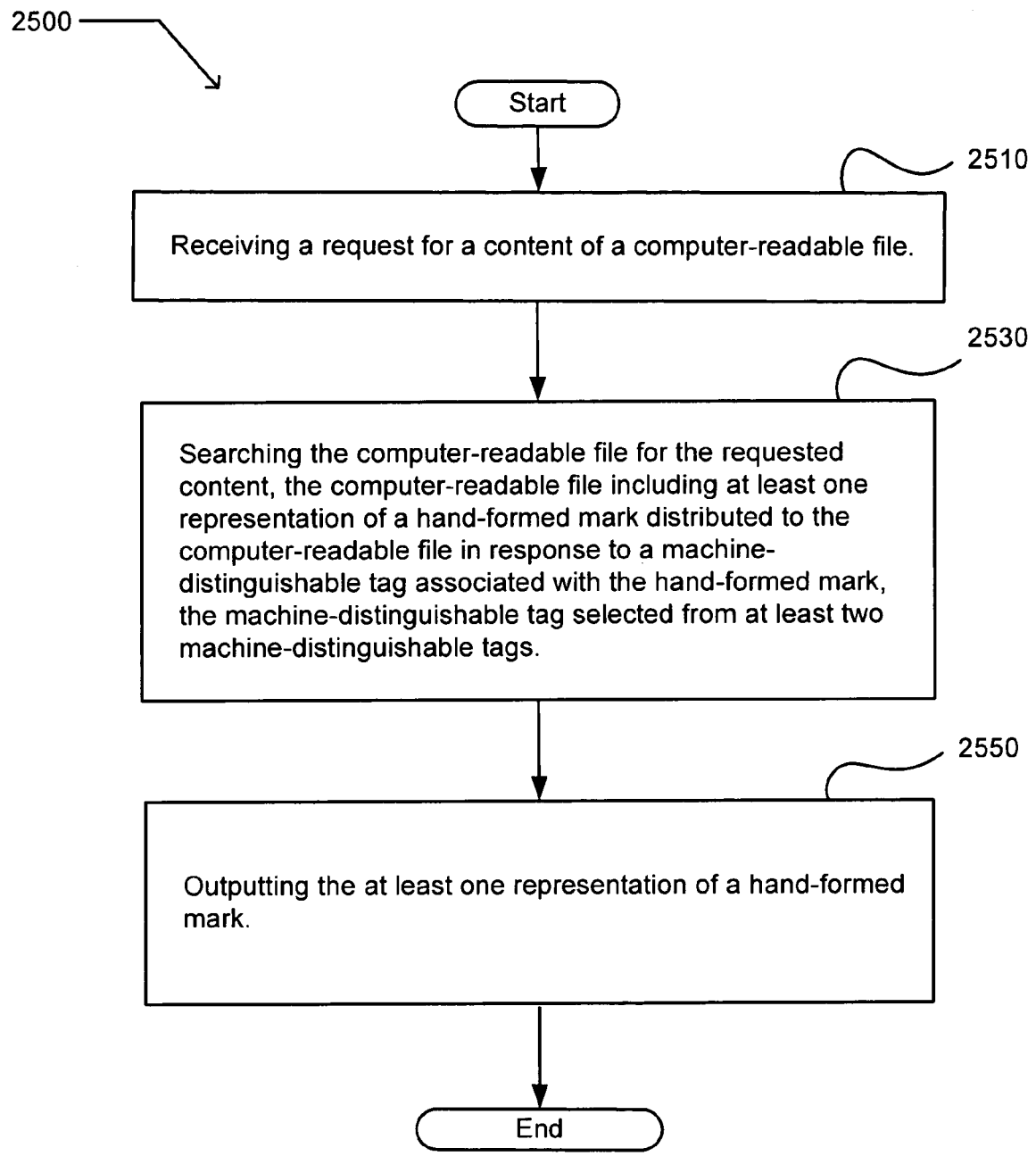
FIG. 52 illustrates an exemplary operation flow.

FIG. 52 illustrates an exemplary operation flow 2500. After a start operation, the operational flow moves to an accepting operation 2510. The accepting operation receives a request for a content of a computer-readable file. A locate operation 2530 searches the computer-readable file for the requested content. The computer-readable file including at least one representation of a hand-formed mark distributed to the computer-readable file in response to a machine-distinguishable tag associated with the hand-formed mark, the machine-distinguishable tag selected from at least two machine-distinguishable tags. A presenting operation 2550 outputs the at least one representation of a hand-formed mark. The operational flow then moves to an end operation.

Figure 53:
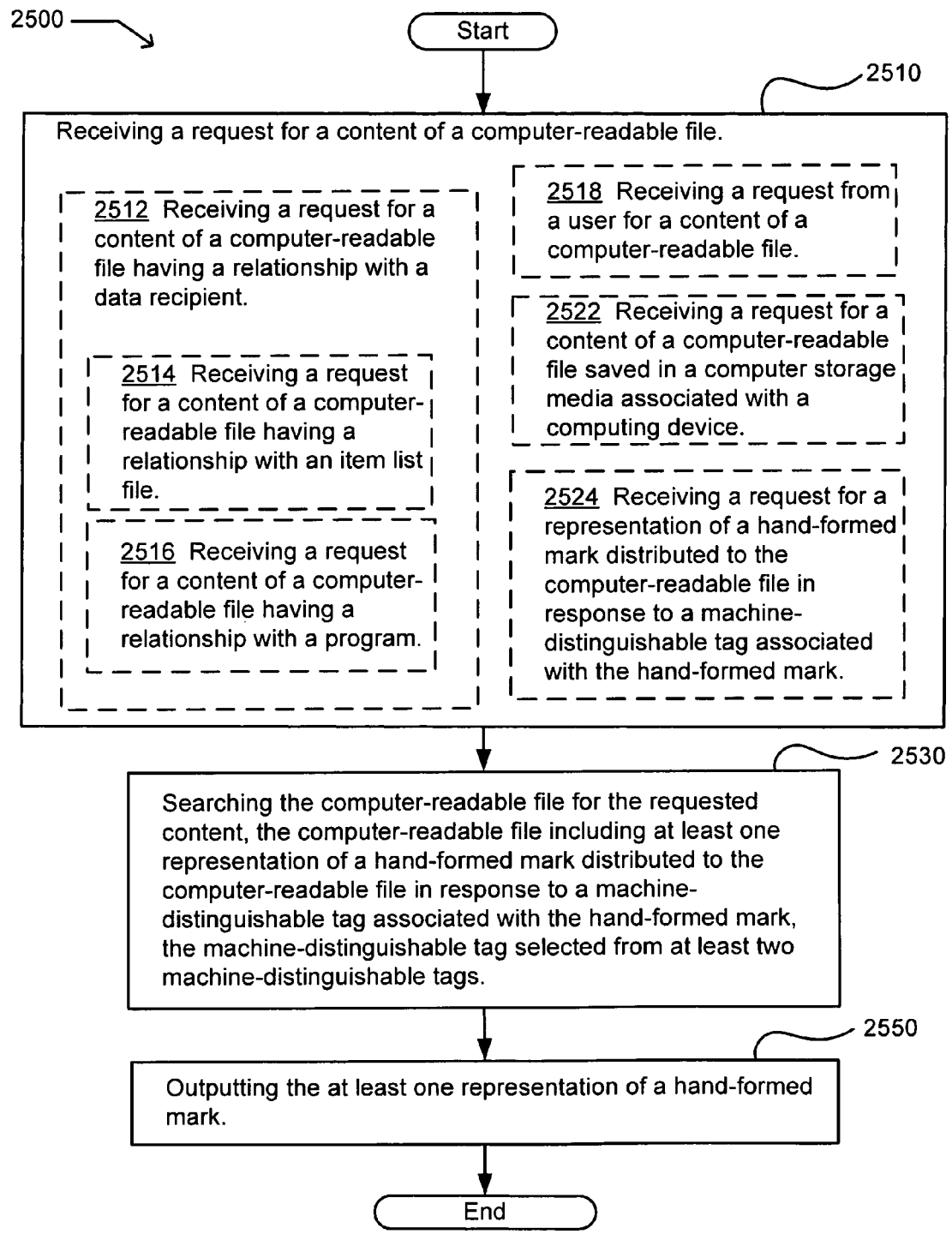
FIG. 53 illustrates an alternative embodiment of the exemplary operation flow of FIG. 52.

FIG. 53 illustrates an alternative embodiment of the exemplary operation flow 2500 of FIG. 52. The accepting operation 2510 may include at least one additional operation. An additional operation may include an operation 2512, an operation 2518, an operation 2522, and/or an operation 2524. The operation 2512 receives a request for a content of a computer-readable file having a relationship with a data recipient. The operation 2512 may include at least one additional operation. An additional operation may include an operation 2514, and/or an operation 2516. The operation 2514 receives a request for a content of a computer-readable file having a relationship with an item list file. The operation 2516 receives a request for a content of a computer-readable file having a relationship with a program. The operation 2518 receives a request from a user for a content of a computer-readable file. The operation 2522 receives a request for a content of a computer-readable file saved in a computer storage media associated with a computing device. The operation 2524 receives a request for a representation of a hand-formed mark distributed to the computer-readable file in response to a machine-distinguishable tag associated with the hand-formed mark.

Figure 54:
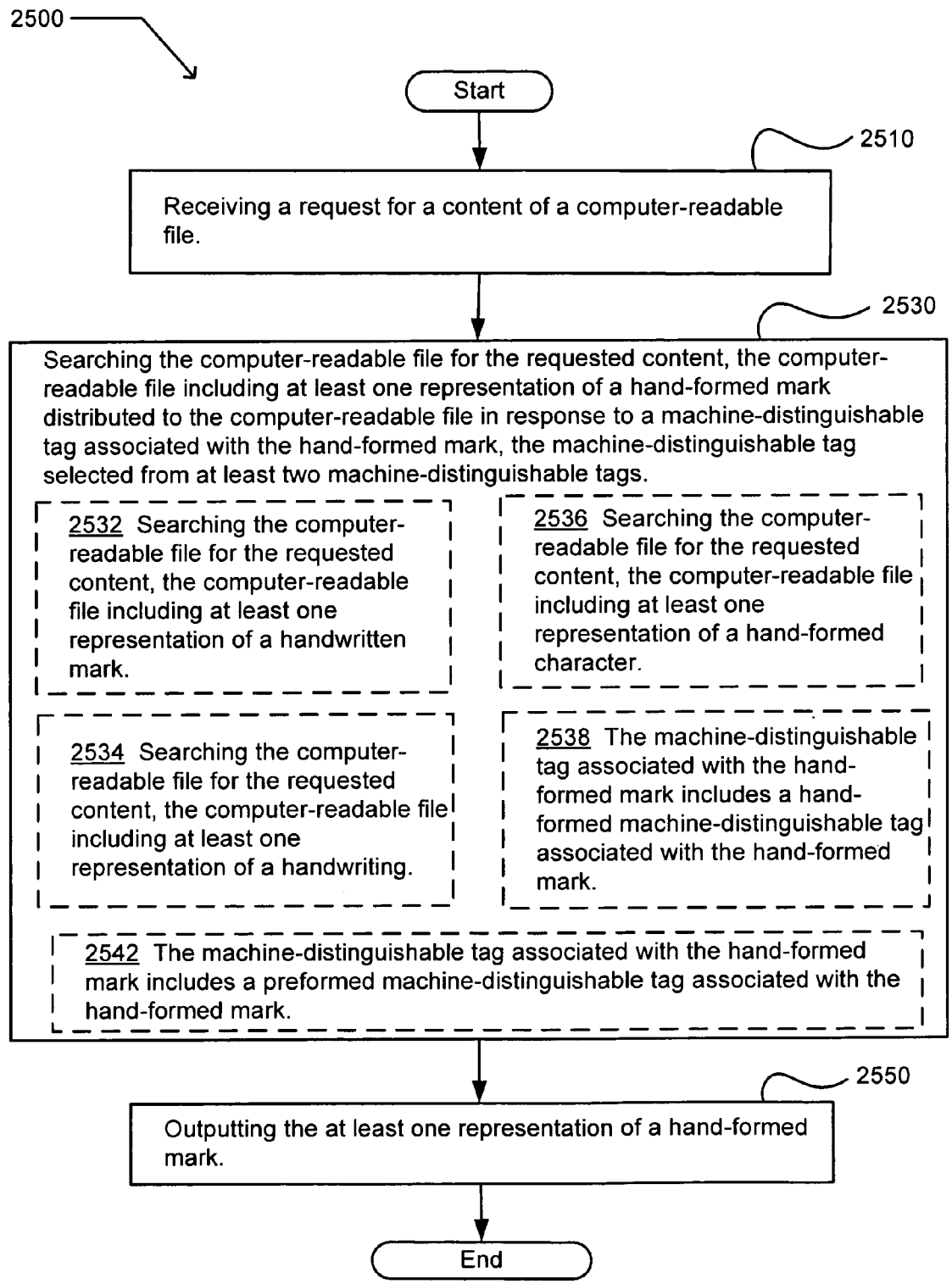
FIG. 54 illustrates another alternative embodiment of the exemplary operation flow of FIG. 52.

FIG. 54 illustrates another alternative embodiment of the exemplary operation flow 2500 of FIG. 52. The locating operation 2530 may include at least one additional operation. An additional operation may include an operation 2532, an operation 2534, an operation 2536, an operation 2538, and/or an operation 2542. The operation 2532 searches the computer-readable file for the requested content, the computer-readable file including at least one representation of a hand-written mark. The operation 2534 searches the computer-readable file for the requested content, the computer-readable file including at least one representation of a handwriting. The operation 2536 searches the computer-readable file for the requested content, the computer-readable file including at least one representation of a hand-formed character. At the operation 2538, the machine-distinguishable tag associated with the hand-formed mark includes a hand-formed machine-distinguishable tag associated with the hand-formed mark. At the operation 2542, the machine-distinguishable tag associated with the hand-formed mark includes a preformed machine-distinguishable tag associated with the hand-formed mark.

Figure 55:
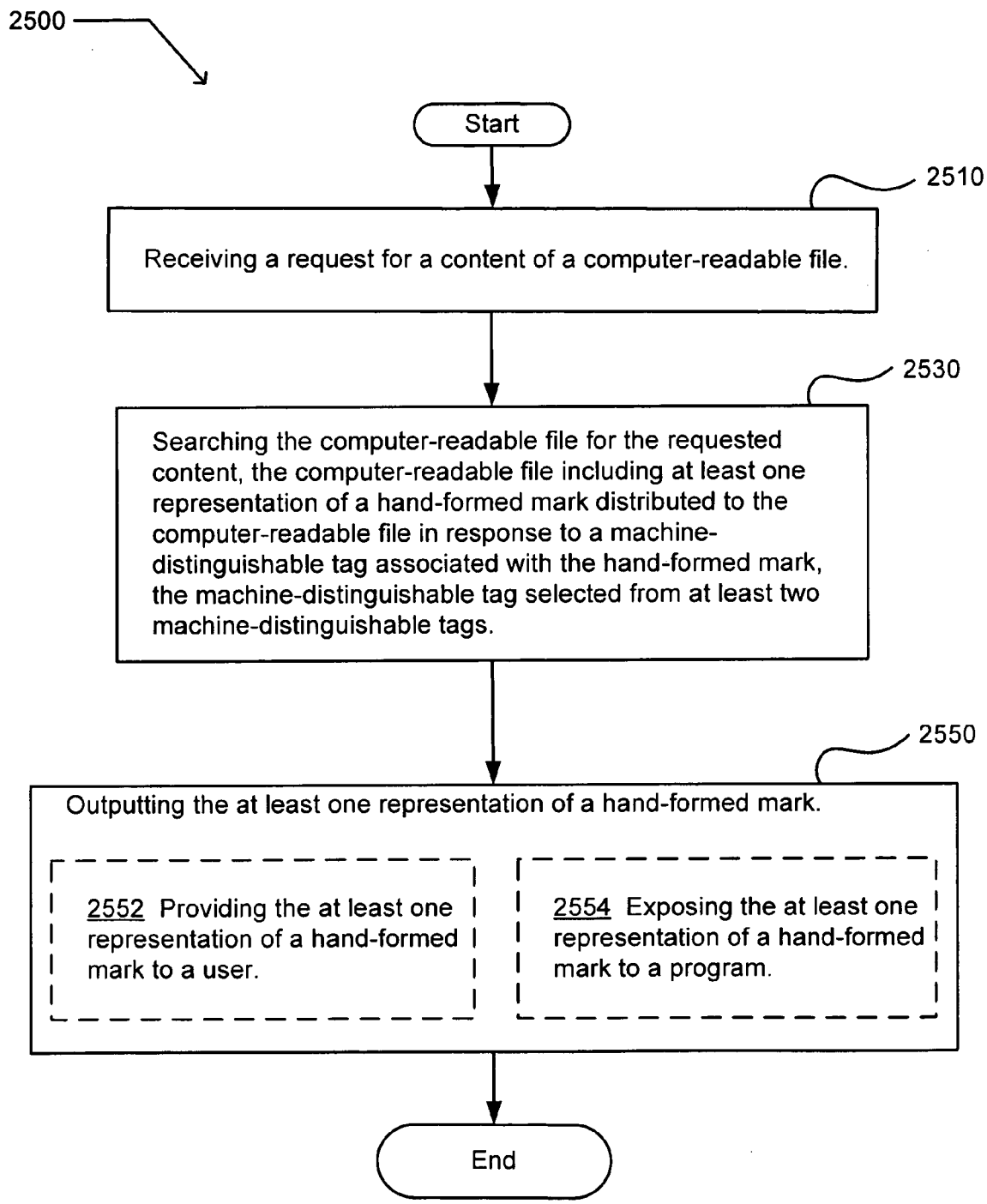
FIG. 55 illustrates a further alternative embodiment of the exemplary operation flow of FIG. 52.

FIG. 55 illustrates a further alternative embodiment of the exemplary operation flow 2500 of FIG. 52. The presenting operation 2550 may include at least one additional operation. An additional operation may include an operation 2552, and/or 2554. The operation 2552 provides the at least one representation of a hand-formed mark to a user. The operation 2554 exposes the at least one representation of a hand-formed mark to a program.

FIG. 56 illustrates a partial view of an exemplary computer program 2560 product. The computer program product includes a computer program 2580 and a computer-readable signal-bearing medium 2570 bearing the computer program. The computer program product encodes the computer program as computer executable instructions for executing a computer process on a computing device. The computer process receives a request for information saved in a computer-readable file. The computer-readable file including at least one representation of a hand-formed mark distributed to the computer-readable file in response to a machine-distinguishable tag associated with the hand-formed mark The machine-distinguishable tag being selected from at least two machine-distinguishable tags. The computer process searches the computer-readable file for the requested information, and outputs the at least one representation of a hand-formed mark In an embodiment, the computer-readable signal-bearing medium 2570 may include a computer storage medium 2572, which may be carried by a computer-readable carrier (not shown). The computer-readable signal-bearing medium may include a communications medium 2574. In a further alternative embodiment, the computer-program 2570 may be implemented in hardware, software, and/or firmware.

FIG. 57 illustrates a partial view of an exemplary device 2600. The exemplary device includes a means 2610, a means 2620, and a means 2630. The means 2610 includes a means for receiving a request for a content of a computer-readable file. The means 2620 includes a means for searching the computer-readable file for the requested content. The computer-readable file including at least one representation of a hand-formed mark distributed to the computer-readable file in response to a machine-distinguishable tag associated with the hand-formed mark, and the machine-distinguishable tag being selected from at least two machine-distinguishable tags. The means 2630 includes a means for providing the at least one representation of a hand-formed mark.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims.

What is claimed is:

1. A method performed in a computing device, the method comprising:
   generating by a writing detector of a writing element of a pen a signal indicative of a handwriting on an initially blank surface, the writing detector agnostic to the initially blank surface;
   generating by a tag detector a signal indicative of a hand-formed machine-distinguishable tag associated by a user with the handwriting on the initially blank surface, the hand-formed machine-distinguishable tag drawn by the user selected from at least two predetermined hand-formed machine-distinguishable tags, the at least two hand-formed machine-distinguishable tags representative of at least two predetermined labels;
   receiving the signal indicative of the hand-formed machine-distinguishable tag associated with the handwriting on the initially blank surface; and
   distributing a representation of the handwriting to a data recipient in response to the hand-formed machine-distinguishable tag via a writing detector module coupled to a hand-held writing device agnostic to the initially blank surface, the data recipient associated with an application employing a lookup table for distributing the representation of the handwriting, the at least two predetermined labels enabling organization of the handwriting into categories via the hand-formed machine-distinguishable tag.

2. The method of claim 1, wherein the receiving the signal indicative of the hand-formed machine-distinguishable tag associated with the handwriting on the initially blank surface includes receiving a signal indicative of a handwriting on a paper surface.

3. The method of claim 1, wherein the receiving the signal indicative of the hand-formed machine-distinguishable tag associated with the handwriting on the initially blank surface includes recognizing the machine-distinguishable tag associated with the handwriting.

4. The method of claim 1, wherein the receiving the signal indicative of the hand-formed machine-distinguishable tag associated with the handwriting on the initially blank surface includes characterizing the machine-distinguishable tag associated by the user with the handwriting.

5. The method of claim 1, wherein the receiving the signal indicative of the hand-formed machine-distinguishable tag associated with the handwriting on the initially blank surface includes receiving a signal originated by the handheld writing device and indicative of a machine-distinguishable tag associated with the handwriting.

6. The method of claim 1, further comprising:
   receiving another signal originated by the handheld writing device and indicative of another handwriting on the initially blank surface;
   receiving another signal indicative of another machine-distinguishable tag associated by the user with the another handwriting, the machine-distinguishable tag selected from the at least two machine-distinguishable defined tags; and in response to the another machine-distinguishable tag, distributing a representation of the another handwriting to another data recipient associated with the computing device.

7. A computer program product comprising:
a processor;
a memory coupled to the processor, the memory including:
(a) program instructions operable to perform a process in a computer system, the process comprising:
generating by a writing detector of a writing element of a pen a signal indicative of a handwriting on an initially blank surface, the writing detector agnostic to the initially blank surface;
generating by a tag detector a signal indicative of a hand-formed machine-distinguishable tag associated by a user with the handwriting on the initially blank surface, the hand-formed machine-distinguishable tag drawn by the user selected from at least two predetermined hand-formed machine-distinguishable tags, the at least two hand-formed machine-distinguishable tags representative of at least two predetermined labels;
receiving the signal indicative of the hand-formed machine-distinguishable tag associated with the handwriting on the initially blank surface; and
distributing a representation of the handwriting to a data recipient in response to the hand-formed machine-distinguishable tag via a writing detector module coupled to a hand held writing device agnostic to the initially blank surface, the data recipient associated with an application employing a lookup table for distributing the representation of the handwriting, the at least two predetermined labels enabling organization of the handwriting into categories via the hand-formed machine-distinguishable tag; and
(b) a computer-readable signal-bearing storage medium bearing the program instructions.

8. The computer program product of claim 7, wherein the distributing a representation of the handwriting to the data recipient in response to the machine-distinguishable tag includes distributing a representation of the handwriting to the data recipient saved in a computer-readable storage medium associated with the computing system in response to the hand-formed machine-distinguishable tag associated with the handwriting on the initially blank surface.

9. The computer program product of claim 8, wherein the distributing a representation of the handwriting to the data recipient saved in a computer-readable storage medium associated with the computing system in response to the machine-distinguishable tag associated with the handwriting on the initially blank surface includes distributing a representation of the signal indicative of the handwriting to the data recipient saved in a computer-readable storage medium associated with the computing system in response to the signal indicative of the machine-distinguishable tag associated with the handwriting on the initially blank surface.

10. The computer program product of claim 7, wherein the computer-readable signal-bearing storage medium includes a computer storage media.

11. The computer program product of claim 7, wherein the computer-readable signal-bearing medium includes a communications media.

12. A system comprising:
a pen comprising:
a writing element;
a writing detector module operable to generate a signal indicative of a handwriting by the writing element on an initially blank surface, the writing detector module agnostic to the initially blank surface; and
a tag detector module operable to generate a signal indicative of a hand-formed machine-distinguishable tag associated by a user with the handwriting, the hand-formed machine-distinguishable tag being selected from at least two hand-formed machine-distinguishable tags; and
a computer program product, comprising:
a processor;
a memory coupled to the processor, the memory including:
(a) program instructions operable to perform a process in a computer system, the process comprising:
receiving the signal indicative of a hand-formed machine-distinguishable tag associated with the handwriting, the hand-formed machine-distinguishable tag drawn by the user and selected from at least two predetermined hand-formed machine-distinguishable defined tags, the at least two hand-formed machine distinguishable tags representative of at least two predetermined labels; and
distributing a representation of the handwriting to a data recipient in response to the hand-formed machine-distinguishable tag, the data recipient associated with an application employing a lookup table for distributing a representation of the handwriting, the at least two predetermined labels enabling organization of the handwriting into categories via the hand-formed machine-distinguishable tag; and
(b) a computer-readable signal-bearing storage medium bearing the program instructions.

13. The system of claim 12, wherein the tag detector module is at least substantially similar to the writing detector module.

14. A device comprising:
means for generating a signal indicative of a handwriting on an initially blank surface, said means being agnostic to the initially blank surface;
means for generating a signal indicative of a hand-formed machine-distinguishable tag associated by a user with the handwriting on the initially blank surface, the hand-formed machine-distinguishable tag drawn by the user selected from at least two predetermined hand-formed machine-distinguishable tags, the at least two hand-formed machine-distinguishable tags representative of at least two predetermined labels;
means for receiving in the computing device a signal indicative of the hand-formed machine-distinguishable tag associated with the handwriting on the initially blank surface; and
means for distributing a representation of the handwriting to a data recipient associated with the computing device in response to the hand-formed machine-distinguishable tag via a writing detector module coupled to a hand-held writing device agnostic to the initially blank surface, the data recipient associated with an application employing a lookup table for distributing the representation of the handwriting, the at least two predetermined labels enabling organization of the handwriting into categories via the hand-formed machine-distinguishable tag.

* * * * *